United States Patent
Brocke et al.

(10) Patent No.: US 12,534,669 B2
(45) Date of Patent: Jan. 27, 2026

(54) ISOTHIOCYANATOETHYNYLBENZENE DERIVATIVES

(71) Applicant: MERCK PATENT GmbH, Darmstadt (DE)

(72) Inventors: Constanze Brocke, Darmstadt (DE); Andreas Taugerbeck, Darmstadt (DE)

(73) Assignee: Merck Patent GmbH (DE)

( * ) Notice: Subject to any disclaimer, the term of this patent is extended or adjusted under 35 U.S.C. 154(b) by 0 days.

(21) Appl. No.: 18/720,363

(22) PCT Filed: Dec. 16, 2022

(86) PCT No.: PCT/EP2022/086256
§ 371 (c)(1),
(2) Date: Jun. 14, 2024

(87) PCT Pub. No.: WO2023/117724
PCT Pub. Date: Jun. 29, 2023

(65) Prior Publication Data
US 2025/0179364 A1 Jun. 5, 2025

(30) Foreign Application Priority Data
Dec. 20, 2021 (EP) .................... 21216177

(51) Int. Cl.
*G02F 1/1333* (2006.01)
*C07C 331/24* (2006.01)
*C09K 19/18* (2006.01)
*C09K 19/04* (2006.01)

(52) U.S. Cl.
CPC ............ *C09K 19/18* (2013.01); *C07C 331/24* (2013.01); *C07C 2601/02* (2017.05); *C07C 2601/04* (2017.05); *C07C 2601/08* (2017.05); *C09K 2019/0444* (2013.01); *C09K 2019/181* (2013.01); *C09K 2219/11* (2013.01)

(58) Field of Classification Search
CPC ....... C09K 19/14; C09K 19/18; G02F 1/1333; C07C 331/16; C07C 331/18; C07C 331/20; C07C 331/22; C07C 331/24
See application file for complete search history.

(56) References Cited

U.S. PATENT DOCUMENTS 7,361,288 B2  4/2008  Lussem et al.
2005/0067605 A1  3/2005  Lussem et al.

FOREIGN PATENT DOCUMENTS

| CN | 105294526 A | 9/2015 |
|---|---|---|
| DE | 102004029429 A1 | 2/2005 |
| EP | 2982730 A1 | 2/2016 |
| JP | 2005120208 A | 5/2005 |
| WO | 2017137145 A1 | 8/2017 |
| WO | WO-2023117724 A1 * | 6/2023 ........... C07C 331/24 |

OTHER PUBLICATIONS

International Search Report (PCT/ISA/210) and Written Opinion (PCT/ISA/237) mailed on Mar. 13, 2023, by the European Patent Office as the International Searching Authority for International Application No. PCT/EP2022/086256 (8 pages).
Li et al., "Studies on the dielectric properties of laterally fluorine-substituted multiphenylacetylene-type liquid crystal compounds at microwave region", Journal of Molecular Liquids, May 2021, 337 (7 pages).
Pytlarczyk et al., "Synthesis and mesomorphic properties of 4,4"-dialkynyl-2',3'-difluoro-p-terphenyls—the influence of C≡C acetylene linking bridge", Liquid Crystals 46(4):618-28 (2019).
Shvartsberg at al., "Reactions of some haloacetylenes with sodium amid", Izvestiya Akademii Nauk SSSR, Seriya Khimicheskaya, Oct. 1976, 10, 2292-2295.
Gaebler et al., "Direct Simulation of Material Permittivities by using an Eigen-Susceptibility Formulation of the Vector Variational Approach", 12MTC 2009—International Instrumentation and Measurement Technology Conference, Singapore, May 5-7, 2009 (IEEE Xplore), 5 pages.
Penirschke et al. "Cavity Perturbation Method for Characterization of Liquid Crystals up to 35 GHz", 34th European Microwave Conference—Amsterdam 2004, pp. 545-548.
Becker, "Merck Liquid Crystals, Physical Properties of Liquid Crystals", Edited Nov. 1997, Revised Aug. 1998, 60 pages, Merck KGaA, Germany.
McManamon, "Agile Nonmechanical Beam Steering," Optics and Photonics News, (Mar. 2006), vol. 17, No. 3, pp. 24-29.

* cited by examiner

*Primary Examiner* — Geraldina Visconti
(74) *Attorney, Agent, or Firm* — Buchanan Ingersoll & Rooney PC

(57) ABSTRACT

Isothiocyanatoethynylbenzene derivatives of formula I

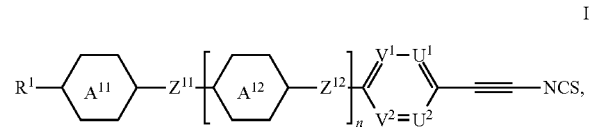

liquid crystal media comprising the isothiocyanatoethynylbenzene derivatives, and high-frequency components comprising these media, especially microwave components for high-frequency devices, such as devices for shifting the phase of microwaves, tunable filters, tunable metamaterial structures, and electronic beam steering antennas (e.g., phased array antennas), and devices comprising said components. Further, an optical component comprising said liquid-crystalline media, operable in the infrared region of the electromagnetic spectrum, the use of said LC medium in the infrared (IR) region, and devices comprising said optical component.

18 Claims, No Drawings

ISOTHIOCYANATOETHYNYLBENZENE DERIVATIVES

CROSS-REFERENCE TO RELATED APPLICATIONS

This application is a U.S. national stage application claiming priority under 35 U.S.C. §§ 120 and 365(c) of and to PCT International Application No. PCT/EP2022/086256, filed Dec. 16, 2022, which claims priority under 35 U.S.C. §§ 119(a) and 365(b) of and to European Application No. 21216177.2, filed Dec. 20, 2021, each of which is incorporated herein in its entirety and for all purposes.

FIELD OF THE INVENTION

The present invention relates to isothiocyanatoethynylbenzene derivatives, to liquid crystal media comprising said isothiocyanatoethynylbenzene derivatives, and to high-frequency components comprising these media, especially microwave components for high-frequency devices, such as devices for shifting the phase of microwaves, tunable filters, tunable metamaterial structures, and electronic beam steering antennas (e.g., phased array antennas), and to devices comprising said components. The invention further relates to an optical component comprising said liquid-crystalline media, operable in the infrared region of the electromagnetic spectrum. The invention further relates to the use of said LC medium in the infrared (IR) region and to devices comprising said optical component.

BACKGROUND OF THE INVENTION

Liquid-crystalline media have been used for many years in electro-optical displays (liquid crystal displays: LCDs) in order to display information. More recently, however, liquid-crystalline media have also been proposed for use in components for microwave technology, such as, for example, in DE 10 2004 029 429 A and in JP 2005-120208 (A).

A. Gaebler, F. Goelden, S. Muller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid-crystal mixture E7 (Merck KGaA, Germany).

DE 10 2004 029 429 A describes the use of liquid-crystal media in microwave technology, inter alia in phase shifters. Therein, liquid-crystalline media with respect to their properties in the corresponding frequency range have been discussed and liquid-crystalline media based on mixtures of mostly aromatic nitriles and isothiocyanates have been shown. In EP 2 982 730 A1, mixtures are described that completely consist of isothiocyanate compounds.

Development in the area of liquid-crystalline materials for the use in microwave applications is far from complete. In order to improve the properties of microwave devices, attempts are constantly being made to develop novel compounds which enable such devices to be optimised. For use in high-frequency technology, liquid-crystalline media having particular, hitherto rather unusual, uncommon properties, or combinations of properties, are required.

Novel compounds with improved properties for use in liquid-crystalline media are thus necessary. In particular, the loss in the microwave range must be reduced or the tunability ($\tau$) enhanced to improve the material quality ($\eta$).

In addition, there is a demand for an improvement in the low-temperature behaviour of the components. An improvement in both the operating properties and also in the shelf life is desirable.

SUMMARY OF THE INVENTION

An object of the present invention is thus to provide compounds having advantageous properties for use in liquid-crystalline media for the use in components for microwave applications. Another object of the present invention is to provide a liquid crystalline medium with improved properties relevant for the application in the microwave range of the electromagnetic spectrum.

The object of the invention is achieved by the compound of the formula I

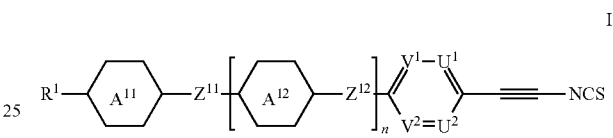

in which
 $R^1$ denotes H, straight chain or branched alkyl having 1 to 12 C atoms or alkenyl having 2 to 12 C atoms, in which one or more $CH_2$-groups may be replaced by

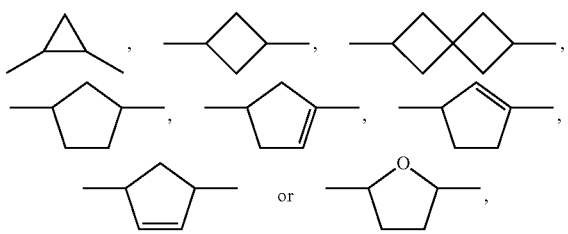

where one or more non-adjacent $CH_2$-groups may be replaced by O and/or S, and where one or more H atoms may be replaced by F; or denotes a group $R^P$,
 $R^P$ denotes halogen, CN, NCS, $R^F$, $R^F$—O— or $R^F$—S—, wherein
  $R^F$ denotes fluorinated alkyl or fluorinated alkenyl having up to 9 C atoms,
 $Z^{11}$, $Z^{12}$ identically or differently, denote —CH=CH—, —CF=CF—, —CH=CF—, —CF=CH—, —C≡C— or a single bond,
 $U^1$, $U^2$, $V^1$ and $V^2$ identically or differently, denote —N= or —CR$^0$=,
 $R^0$ denotes H, Cl, F, $CF_3$, $CHF_2$, or alkyl or alkoxy each having 1 to 6 C atoms,

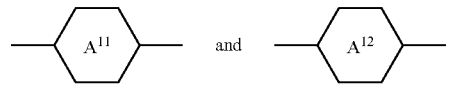

denote a radical selected from the following groups:
a) the group consisting of 1,4-phenylene, 1,4-naphthylene, 2,6-naphthylene, tetralin-5,8-diyl, and tetralin-2,6-diyl, in which one or two CH groups may be replaced by N and in which one or more H atoms may be replaced by $R^L$, b) the group consisting of trans-1,4-cyclohexylene, 1,4-cyclohexenylene, bicyclo[1.1.1]pentane-1,3-diyl, 4,4'-bicyclohexylene, bicyclo[2.2.2]octane-1,4-diyl, and spiro[3.3]heptane-2,6-diyl, in which one or more non-adjacent $CH_2$ groups may be replaced by —O— and/or —S— and in which one or more H atoms may be replaced by F or alkyl having 1 to 6 C atoms, c) the group consisting of thiophene-2,5-diyl, thieno[3,2-b]thiophene-2,5-diyl, selenophene-2,5-diyl, each of which may also be mono- or polysubstituted by $R^L$, $R^L$ on each occurrence, identically or differently, denotes F, C, CN, SCN, $SF_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, and n is 0, 1 or 2.

The invention further relates to a compound of formula N

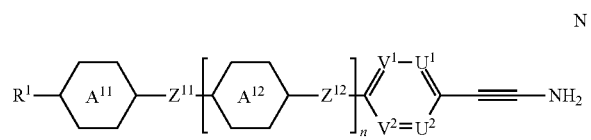

In which the occurring groups have the meanings given above for formula I, and to a process for the production of the compound of formula I from formula N.

Preferred embodiments of the present invention can also be taken from the description.

Surprisingly, the compounds of formula I are distinguished by a favourably high tunability and enable liquid-crystalline media having excellent stability and at the same time a high dielectric anisotropy, suitably fast switching times, a suitable, nematic phase range, high tunability and low dielectric loss in the microwave range of the electromagnetic spectrum.

In particular, media comprising a compound according to the invention are distinguished by an improved figure-of-merit η due to a higher tunability τ.

The media according to the present invention are distinguished by a high clearing temperature, a broad nematic phase range and excellent low-temperature stability (LTS). As a result, devices containing the media are operable under extreme temperature conditions.

The media are further distinguished by high values of the dielectric anisotropy and low rotational viscosities. As a result, the threshold voltage, i.e., the minimum voltage at which a device is switchable, is very low. A low operating voltage and low threshold voltage is desired in order to enable a device having improved switching characteristics and high energy efficiency. Low rotational viscosities enable fast switching of the devices according to the invention.

These properties as a whole make the media comprising the compound of formula I particularly suitable for use in components and devices for high-frequency technology and applications in the microwave range, in particular devices for shifting the phase of microwaves, tunable filters, tunable metamaterial structures, and electronic beam steering antennas (e.g., phased array antennas).

According to another aspect of the present invention there is thus provided a component and a device comprising said component, both operable in the microwave region of the electromagnetic spectrum. Preferred components are phase shifters, varactors, wireless and radio wave antenna arrays, matching circuits and adaptive filters.

The medium according to the invention is likewise suitable for use in the visible or infrared region of the electromagnetic spectrum.

The invention thus further relates to the use of the compound of formula I and the medium comprising one or more compounds of formula I in the visible or infrared region of the electromagnetic spectrum, preferably in the VIS, A-band, and/or B-band and/or C-band, for phase modulation of said visible light or infrared light.

According to another aspect of the present invention there is provided an optical component comprising the liquid crystal medium according to the invention sandwiched between a pair of substrates.

The invention further relates to a device comprising the optical component according to the invention. Preferred devices are infrared imagers, wavelength selective switches, LCoS-SLM, LIDAR systems, wavelength-division multiplexing (WDM) systems, reconfigurable optical add-drop multiplexer (ROADM), and nonmechanical beam steering, e.g., steerable Electro Evanescent Optical Refraction (SEEOR) prism as published in the article P. McManamon, 2006, "Agile Nonmechanical Beam Steering," Opt. Photon. News 17(3): 24-29.

According to another aspect of the present invention there is provided a method of spatially modulating visible or infrared light, the method comprising, i) providing an optical component comprising first and second substrates facing each other and each having a surface, the first substrate comprising at least one first electrode, the second substrate comprising at least one second electrode, the component further comprising a liquid crystal layer sandwiched between the first and second substrates wherein the liquid crystal comprises one or more compounds of the formula I above;

ii) receiving incident infrared light at a surface of said optical component;

iii) applying a predetermined voltage to each of the individual electrodes formed on the first substrate in order to modulate a refractive index of the liquid crystal layer.

According to another aspect of the present invention there is provided a method of manufacturing an optical phase modulator, comprising at least the steps of a) providing a first substrate with a first electrode, optionally having a two-dimensional array of individually electrically drivable cells;

b) depositing a liquid crystal medium comprising one or more compounds of formula I over the first substrate; and c) mounting a second substrate with a second electrode onto the liquid crystal material.

The optical component according to the invention is distinguished by excellent operational stability when exposed to the environment because of high clearing temperature, broad nematic phase range and excellent low-temperature stability (LTS) of the liquid crystal medium used therein. As a result, the component and devices containing the component are operable under extreme temperature conditions.

DETAILED DESCRIPTION OF THE INVENTION

Herein, "high-frequency technology" means applications of electromagnetic radiation having frequencies in the range of from 1 MHz to 1 THz, preferably from 1 GHz to 500 GHz, more preferably 2 GHz to 300 GHz, particularly preferably from about 5 GHz to 150 GHz.

As used herein, infrared region of the electromagnetic spectrum is taken to mean the spectral region of electromagnetic radiation having a wavelength in the range of from 0.75 µm to 1000 µm.

As used herein, visible light (VIS) is taken to mean the spectral region of electromagnetic radiation having a wavelength in the range of from 380 nm to 750 nm.

As used herein, infrared A (IR-A) is taken to mean the spectral region of electromagnetic radiation having a wavelength in the range of from 0.75 µm to 1.4 µm.

As used herein, infrared B (IR-B) is taken to mean the spectral region of electromagnetic radiation having a wavelength in the range of from 1.4 µm to 3 µm.

As used herein, infrared C (IR-C) is taken to mean the spectral region of electromagnetic radiation having a wavelength in the range of from 3 µm to 1000 µm.

Preferably, the optical component according to the invention operates at a wavelength in the range of from 750 nm to 2500 nm, in particular from 1530 nm to 1565 nm.

A very preferred light source for applications according to the invention is an IR laser emitting light with a wavelength of 1.55 µm or an IR laser emitting light with a wavelength of 905 nm.

As used herein, halogen is F, Cl, Br, or I, preferably F or Cl, particularly preferably F.

Herein, alkyl is straight-chain or branched or cyclic and has 1 to 15 C atoms, is preferably straight-chain and has, unless indicated otherwise, 1, 2, 3, 4, 5, 6 or 7 C atoms and is accordingly preferably methyl, ethyl, n-propyl, n-butyl, n-pentyl, n-hexyl or n-heptyl.

Herein, branched alkyl is preferably isopropyl, s-butyl, isobutyl, isopentyl, 2-methylbutyl, 2-methylhexyl or 2-ethylhexyl.

As used herein, cyclic alkyl is taken to mean straight-chain or branched alkyl or alkenyl having up to 12 C atoms, preferably alkyl having 1 to 7 C atoms, in which a group $CH_2$ is replaced with a carbocyclic ring having 3 to 5 C atoms, very preferably selected from the group consisting of cyclopropylalkyl, cyclobutylalkyl, cyclopentylalkyl and cyclopentenylalkyl.

Herein, an alkoxy radical is straight-chain or branched and contains 1 to 15 C atoms. It is preferably straight-chain and has, unless indicated otherwise, 1, 2, 3, 4, 5, 6 or 7 C atoms and is accordingly preferably methoxy, ethoxy, n-propoxy, n-butoxy, n-pentoxy, n-hexoxy or n-heptoxy.

Herein, an alkenyl radical is preferably an alkenyl radical having 2 to 15 C atoms, which is straight-chain or branched and contains at least one C—C double bond. It is preferably straight-chain and has 2 to 7 C atoms. Accordingly, it is preferably vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl. If the two C atoms of the C—C double bond are substituted, the alkenyl radical can be in the form of E and/or Z isomer (trans/cis). In general, the respective E isomers are preferred. Of the alkenyl radicals, prop-2-enyl, but-2- and -3-enyl, and pent-3- and -4-enyl are particularly preferred.

Herein, alkynyl is taken to mean an alkynyl radical having 2 to 15 C atoms, which is straight-chain or branched and contains at least one C—C triple bond. 1- and 2-propynyl and 1-, 2- and 3-butynyl are preferred.

In case $R^F$ denotes a halogenated alkyl-, alkoxy-, alkenyl or alkenyloxy it can be branched or unbranched. Preferably it is unbranched, mono-poly or perfluorinated, preferably perfluorinated and has 1, 2, 3, 4, 5, 6 or 7 C atoms, in case of alkenyl 2, 3, 4, 5, 6 or 7 C atoms.

$R^P$ preferably denotes CN, NCS, Cl, F, —$(CH_2)_n$—CH=$CF_2$, —$(CH_2)_n$—CH=CHF, —$(CH_2)_n$—CH=$Cl_2$, —$C_nF_{2n+1}$, —$(CF_2)_n$—$CF_2H$, —$(CH_2)_n$—$CF_3$, —$(CH_2)_n$—$CHF_2$, —$(CH_2)_nCH_2F$, —CH=$CF_2$, —$O(CH_2)_n$—CH=$CF_2$, —$O(CH_2)_nCHCl_2$, —$OC_nF_{2n+1}$, —$O(CF_2)_n$—$CF_2H$, —$O(CH_2)_nCF_3$, —$O(CH_2)_n$—$CHF_2$, —$O(CF)_nCH_2F$, —OCF=$CF_2$, —$SC_nF_{2n+1}$, —$S(CF)_n$—$CF_3$, wherein n is an integer from 0 to 7.

A structurally related compound with a trifluorovinyl substituent is shown in CN105294526 A for use as a co-component in a medium for a display device.

The compounds of the general formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and are suitable for said reactions. Use can be made here of variants which are known per se but are not mentioned here in greater detail.

If desired, the starting materials can also be formed in situ by not isolating them from the reaction mixture, but instead by immediately reacting them further into the compounds of the general formula I.

A preferred synthetic pathway towards compounds of formula I is shown in scheme 1. The terminal arylalkynes (1) are obtained by standard processes as described for example in the article: Marta Pytlarczyk & Przemyslaw Kula (2019) Synthesis and mesomorphic properties of 4,4"-dialkynyl-2', 3'-difluoro-p-terphenyls—the influence of C≡C acetylene linking bridge, Liquid Crystals, 46:4, 618-628, DOI: 10.1080/02678292.2018.1515376.

In accordance with a process described M. S. Shvartsberg at al., Izvestiya Akademii Nauk SSSR, Seriya Khimicheskaya (1976), (10), 2292-5, the acetylenes 1 can be transferred into chlorides 2 by deprotonation and chlorination with N-chlorosuccinimide (NCS), which can be reacted with sodium amide to give the amines of formula N, from which the compounds of formula I are obtainable using known reagents. Preferred reagents for the process according to the invention for the transformation of compounds of the formula N into compounds of the formula I are carbon disulfide, thiophosgene, thiocarbonyl diimidazole, di-2-pyridyl thionocarbonate, bis(dimethylthiocarbamoyl) disulfide, dimethylthiocarbamoyl chloride and phenyl chlorothionoformate, very preferably thiophosgene.

Scheme 1

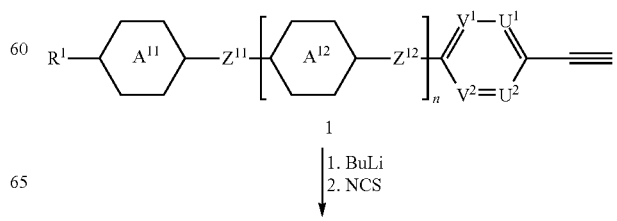

-continued

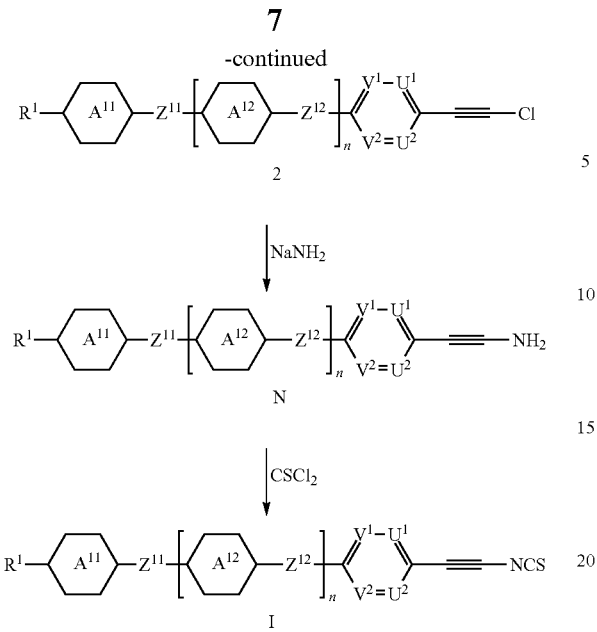

In a preferred embodiment, in the compounds of the formula I and its sub-formulae $R^1$ denotes H, non-fluorinated alkyl having 1 to 12 C atoms, or non-fluorinated alkenyl having 2 to 12 C atoms, in which one or more $CH_2$-groups may be replaced by

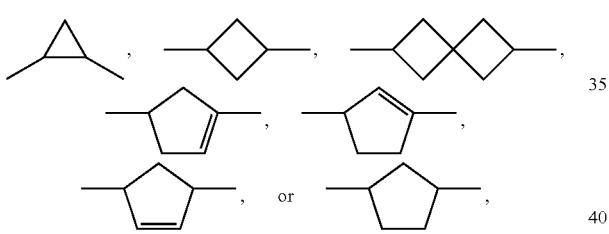

where one or more non-adjacent $CH_2$-groups may be replaced by O, very preferably alkyl having 1 to 7 C atoms,

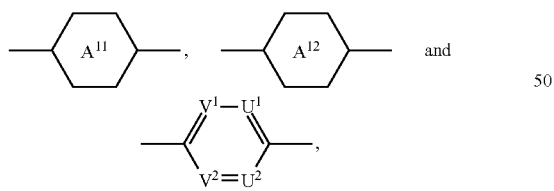

on each occurrence, independently of one another, denote

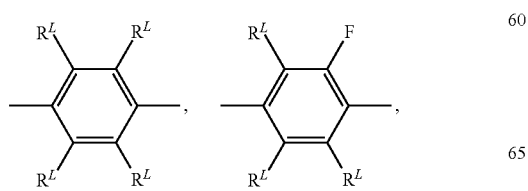

-continued

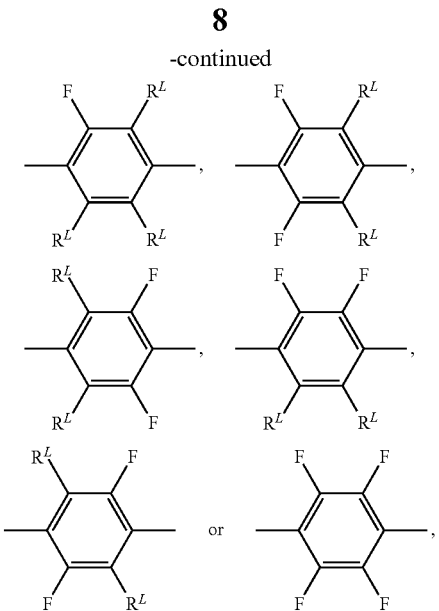

in which $R^L$, on each occurrence, identically or differently, denotes H, Cl or alkyl having 1 to 6 C atoms, preferably H, Cl, methyl or ethyl, very preferably H, Cl or methyl, and in particular H, or denote

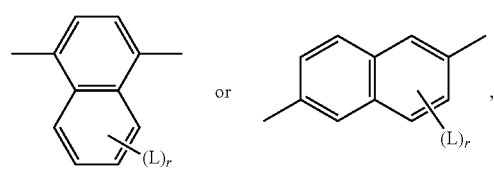

very preferably

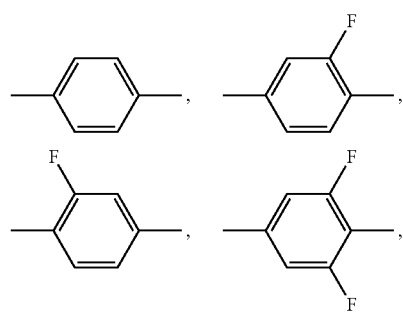

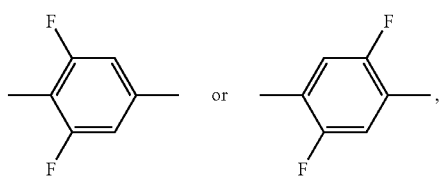

L denotes F or alkyl having 1 to 6 C atoms, and
r is 0, 1, 2, 3, 4, 5 or 6, preferably 0 or 1,
and wherein

alternatively denotes

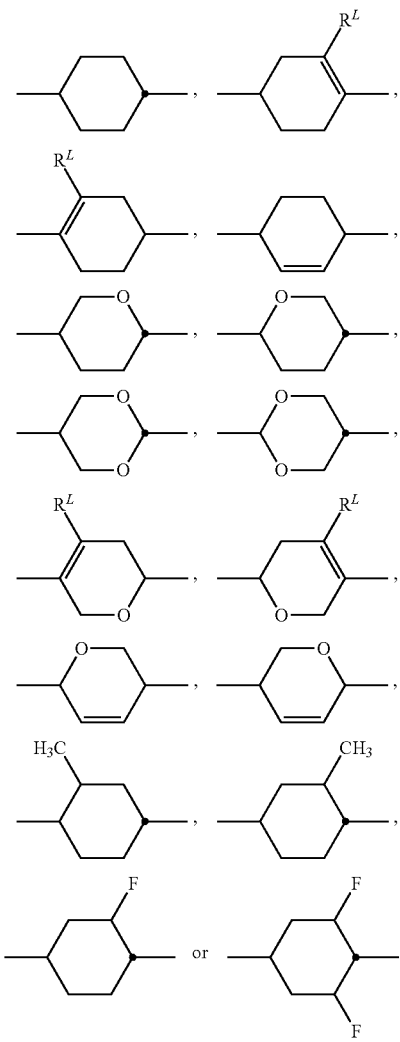

in which $R^L$ denotes H or methyl, preferably H; preferably

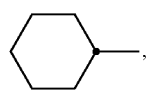

and
n is 0, 1 or 2, preferably 0 or 1.

Preferably, the compounds of the formula I are selected from the compounds of the formulae Ia, Ib, Ic and Id:

Ia $R^1$—A$^{11}$—⟨V$^1$—U$^1$ / V$^2$=U$^2$⟩—≡—NCS

Ib $R^1$—A$^{11}$—Z$^{11}$—⟨V$^1$—U$^1$ / V$^2$=U$^2$⟩—≡—NCS

Ic $R^1$—A$^{11}$—[A$^{12}$]$_n$—⟨V$^1$—U$^1$ / V$^2$=U$^2$⟩—≡—NCS

Id $R^1$—A$^{11}$—Z$^{11}$—A$^{12}$—Z$^{12}$—⟨V$^1$—U$^1$ / V$^2$=U$^2$⟩—≡—NCS in which the occurring groups and parameters have the meanings defined above.

The compounds of the formula Ia are preferably selected from the compounds of the following sub-formulae:

Ia-1

$R^1$—⟨cyclohexyl⟩—⟨V$^1$—U$^1$ / V$^2$=U$^2$⟩—≡—NCS

Ia-2

$R^1$—⟨phenyl-L$^1$⟩—⟨V$^1$—U$^1$ / V$^2$=U$^2$⟩—≡—NCS in which the occurring groups have the meanings given above for formula I and $L^1$ independently denote H, F, Cl, methyl, or ethyl, preferably H.

Preferred compounds of the formula Ia-2 are selected from the group consisting of the formulae Ia-2-1 to Ia-2-7

Ia-2-1

$R^1$—⟨biphenyl⟩—≡—NCS

Ia-2-2

$R^1$—⟨biphenyl-F⟩—≡—NCS

Ia-2-3

$R^1$—⟨biphenyl-F,F⟩—≡—NCS

-continued

Ia-2-4
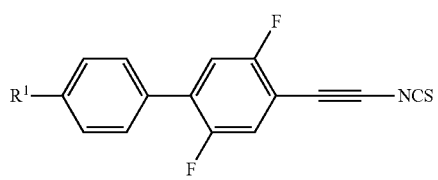

Ia-2-5
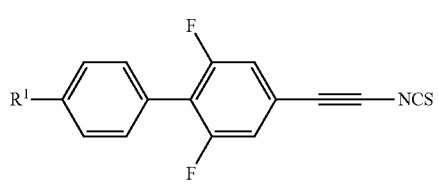

Ia-2-6
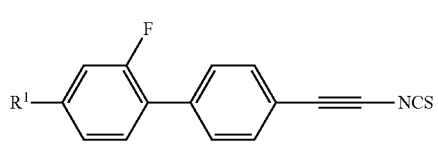

Ia-2-7
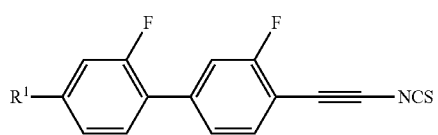

in which $R^1$ has the meaning indicated above for formula I and preferably denotes non-fluorinated alkyl having 1 to 7 C atoms or non-fluorinated alkenyl having 2 to 7 C atoms.

The compounds of the formula Ib are preferably selected from the compounds of the formulae Ib-1 to Ib-3:

Ib-1
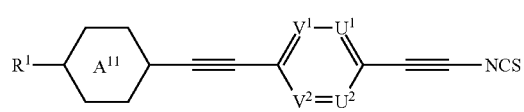

Ib-2
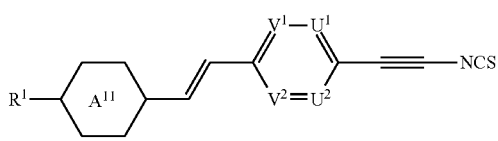

Ib-3
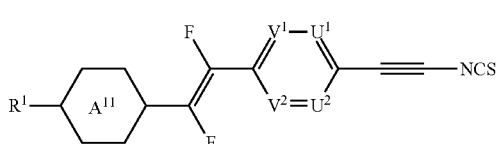

in which the occurring groups have the meanings given above and preferably $R^1$ denotes non-fluorinated alkyl or alkoxy having 1 to 7 C atoms or non-fluorinated alkenyl having 2 to 7 C atoms.

The compounds of formula Ib-1 are preferably selected from the group of the compounds of the formulae Ib-1-1 to Ib-1-8:

Ib-1-1
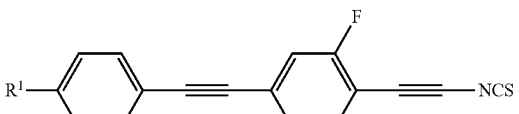

Ib-1-2
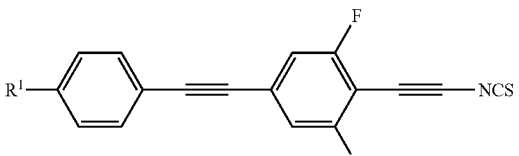

Ib-1-3
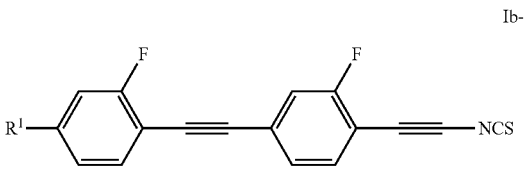

Ib-1-4
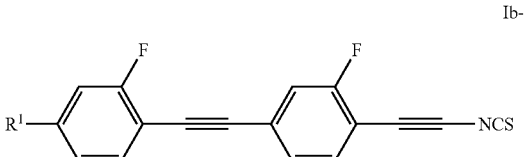

Ib-1-5
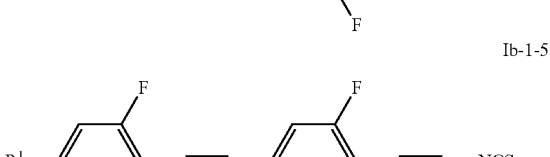

Ib-1-6
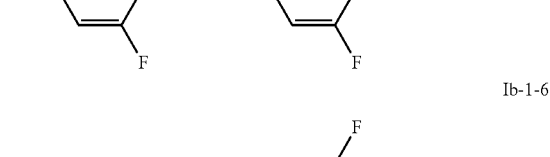

Ib-1-7
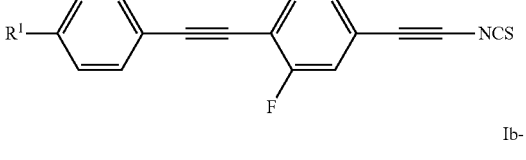

Ib-1-8
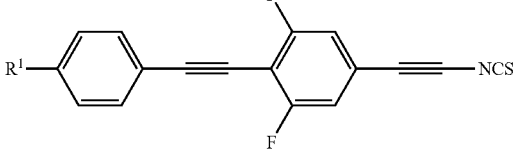

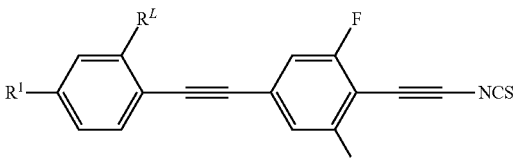

in which $R^1$ has the meaning indicated above for formula I and preferably denotes $C_nH_{2n+1}$ or $CH_2=CH-(CH_2)_z$, $R^L$ denotes straight chain alkyl having 1 to 6 C atoms or branched alkyl having 3 to 6 C atoms, preferably methyl, ethyl or isopropyl, very preferably ethyl, n denotes an integer in the range from 1 to 7, preferably in the range from 2 to 6 and particularly preferably 3 to 5, and z denotes 0, 1, 2, 3 or 4, preferably 2.

The compounds of formula Ib-2 are preferably selected from the group of the compounds of the formulae Ib-2-1 to Ib-2-5

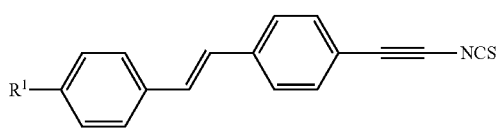

Ib-2-1

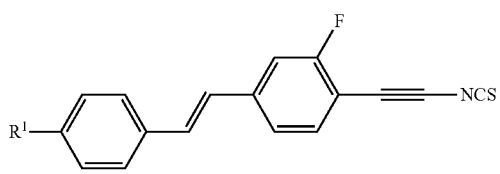

Ib-2-2

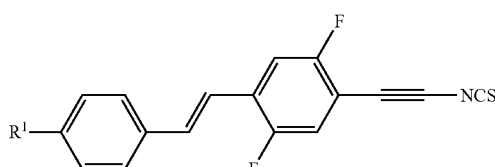

Ib-2-3

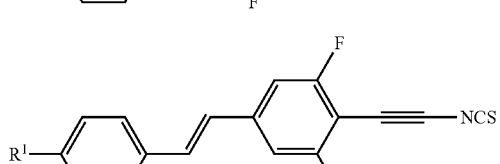

Ib-2-4

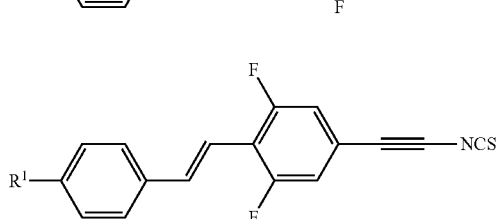

Ib-2-5

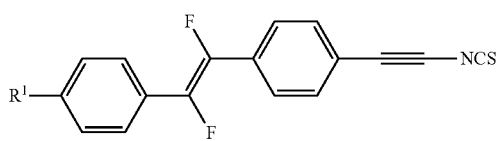

in which $R^1$ has the meaning indicated above and preferably denotes $C_nH_{2n+1}$ or $CH_2$=CH—$(CH_2)_z$, n is an integer in the range from 1 to 7, preferably in the range from 2 to 6 and particularly preferably 3 to 5, and z is 0, 1, 2, 3 or 4, preferably 0 or 2.

The compounds of formula Ib-3 are preferably selected from the group of the compounds of the of formulae Ib-3-1 to Ib-3-5:

Ib-3-1

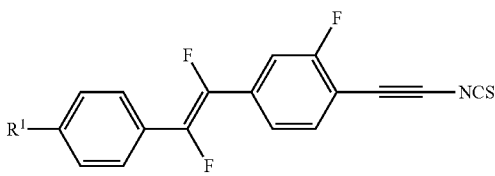

Ib-3-2

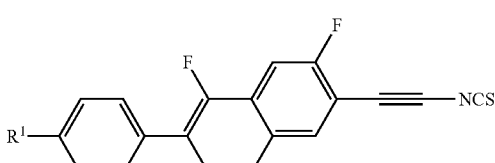

Ib-3-3

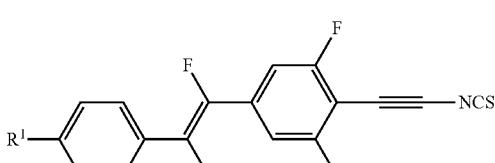

Ib-3-4

Ib-3-5 in which $R^1$ has the meaning indicated above and preferably denotes $C_nH_{2n+1}$ or $CH_2$=CH—$(CH_2)_z$, n denotes an integer in the range from 1 to 7, preferably in the range from 2 to 6 and particularly preferably 3 to 5, and z denotes 0, 1, 2, 3 or 4, preferably 0 or 2.

The compounds or the formula Ic are preferably selected from the compounds of the formulae Ic-1 to Ic-4:

Ic-1

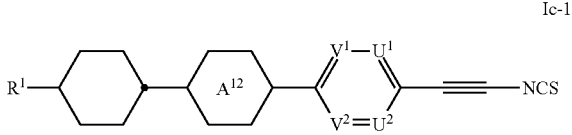

Ic-2

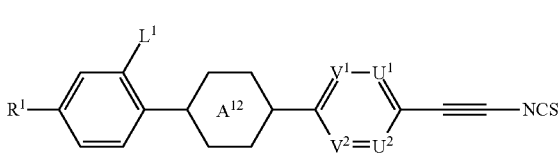

Ic-3

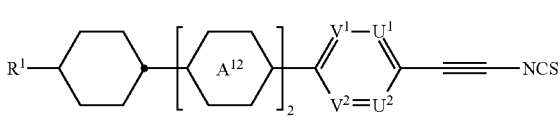

-continued

Ic-4

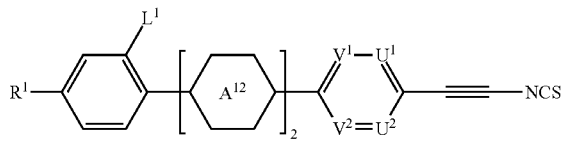

In which the occurring groups have the meanings defined above.

Preferred compounds of the formula Ic-3 are selected from the group consisting of the formulae Ic-1-1 to Ic-1-6:

Ic-1-1

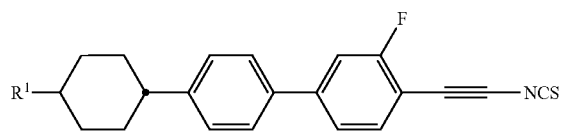

Ic-1-2

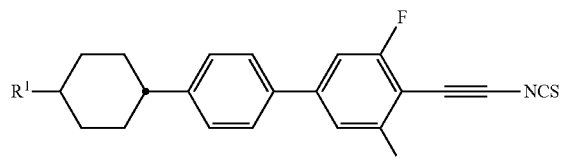

Ic-1-3

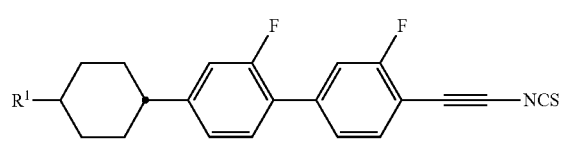

Ic-1-4

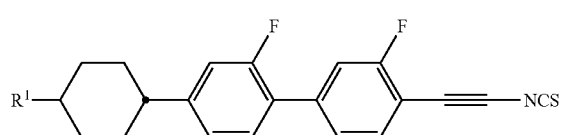

Ic-1-5

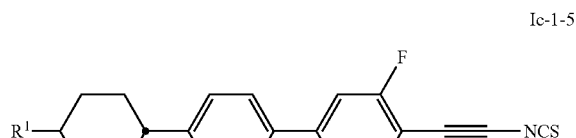

Ic-1-6

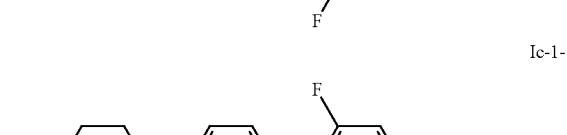

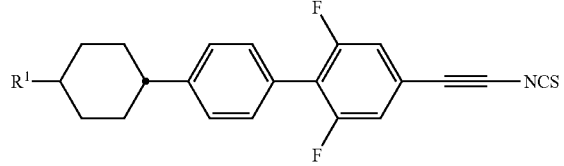

in which $R^1$ has the meaning indicated above for formula I and preferably denotes non-fluorinated alkyl having 1 to 7 C atoms or non-fluorinated alkenyl having 2 to 7 C atoms.

Preferred compounds of the formula Ic-2 are selected from the group consisting of the formulae Ic-2-1 to Ic-2-7

Ic-2-1

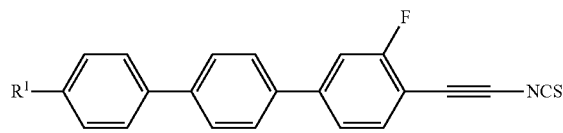

Ic-2-2

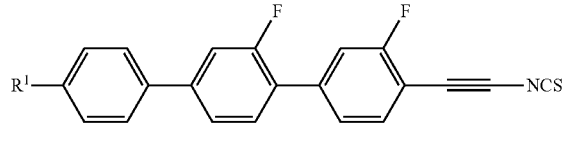

Ic-2-3

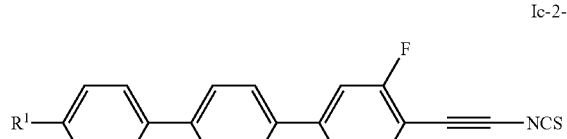

Ic-2-4

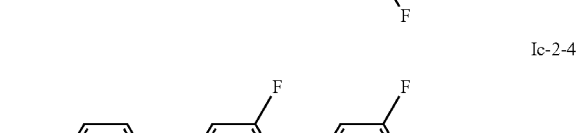

Ic-2-5

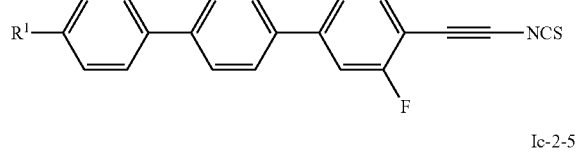

Ic-2-6

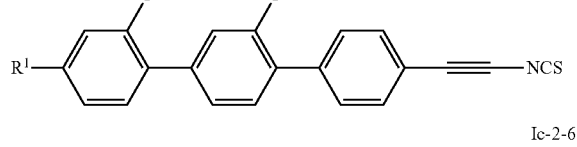

Ic-2-7

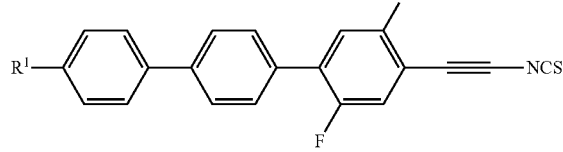

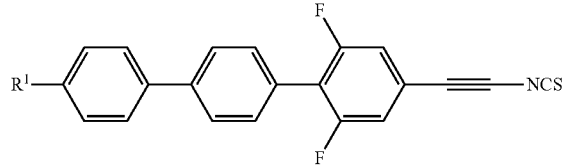

in which $R^1$ has the meaning indicated above for formula I and preferably denotes non-fluorinated alkyl having 1 to 7 C atoms or non-fluorinated alkenyl having 2 to 7 C atoms.

Preferred compounds of the formula Ic-3 are selected from the group consisting of the formulae Ic-3-1 to Ic-3-5:

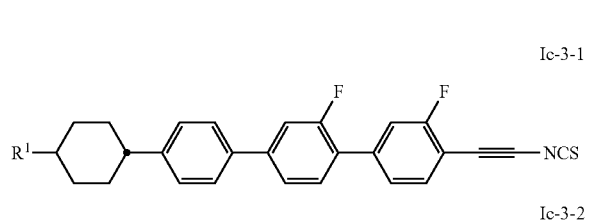

Ic-3-1

Ic-3-2

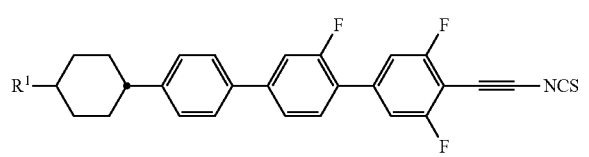

Ic-3-4

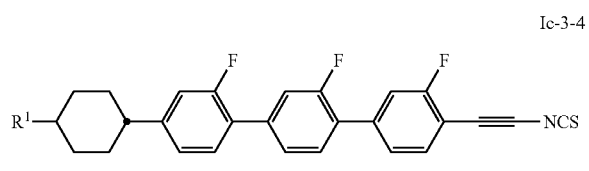

Ic-3-5

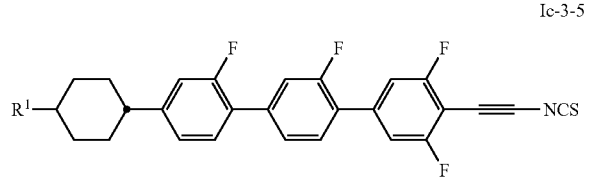

in which $R^1$ has the meaning indicated above for formula I and preferably denotes non-fluorinated alkyl having 1 to 7 C atoms or non-fluorinated alkenyl having 2 to 7 C atoms.

Preferred compounds of the formula Ic-4 are selected from the group consisting of the formulae Ic-4-1 to Ic-4-5

Ic-4-1

Ic-4-2

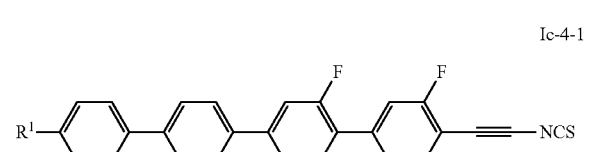

Ic-4-3

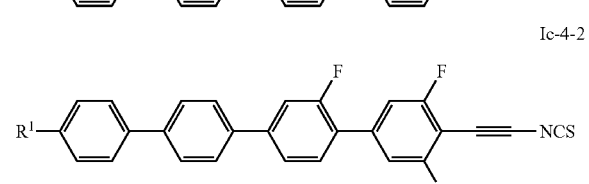

Ic-4-4

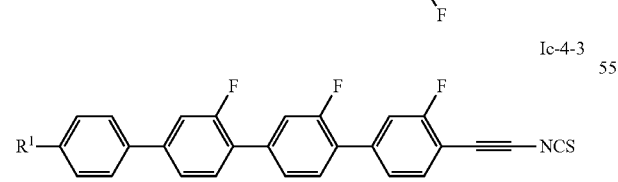

Ic-4-5

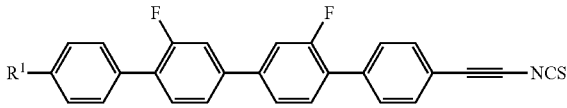

in which $R^1$ has the meaning indicated above for formula I and preferably denotes non-fluorinated alkyl having 1 to 7 C atoms or non-fluorinated alkenyl having 2 to 7 C atoms.

The compounds of formula Id are preferably selected from the group of the compounds of the formulae Id-1 to Id-6

Id-1

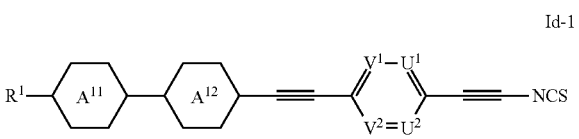

Id-2

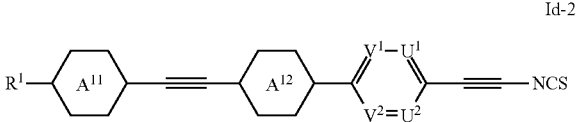

Id-3

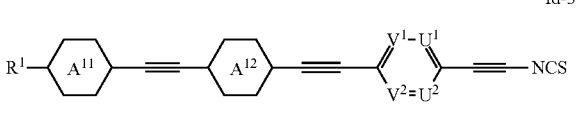

Id-4

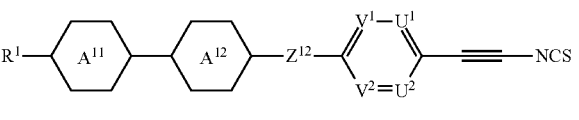

Id-5

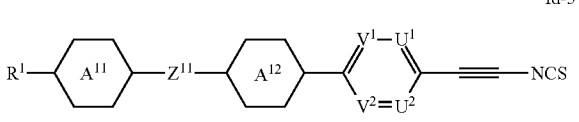

Id-6

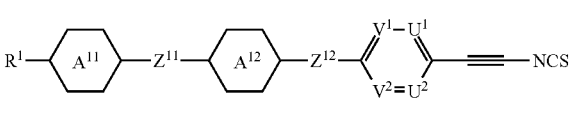

in which $Z^{11}$ and $Z^{12}$ independently of one another denote trans-CH=CH— or trans-CF=CF—, preferably trans-CH=CH—, and in formula Id-6 alternatively one of $Z^{11}$ and $Z^{12}$ may denote —C≡C— and the other groups have the meaning given above under formula I, and preferably $R^1$ denotes non-fluorinated alkyl or alkoxy having 1 to 7 C atoms or non-fluorinated alkenyl having 2 to 7 C atoms The compounds of formula Id-1 are preferably selected from the group of the compounds of the formulae Id-1-1 to Id-1-19:

Id-1-1
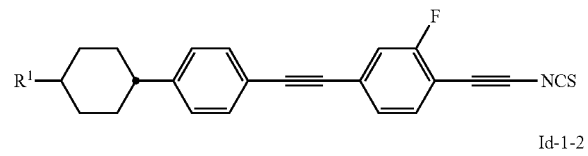
Id-1-2
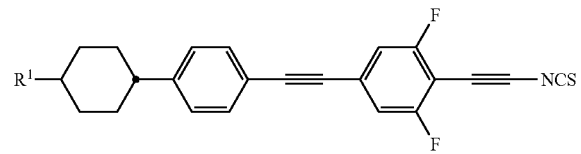
Id-1-3
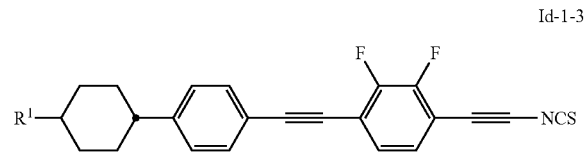
Id-1-4
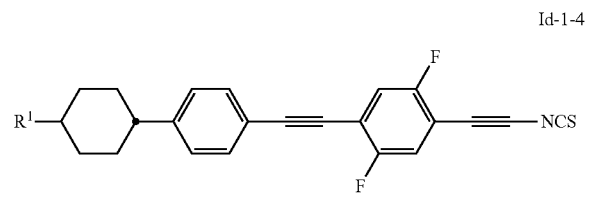
Id-1-5
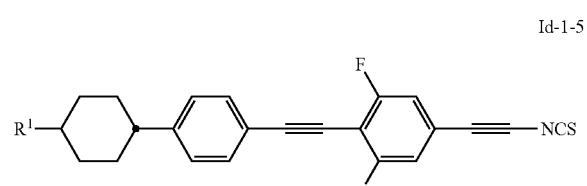
Id-1-6
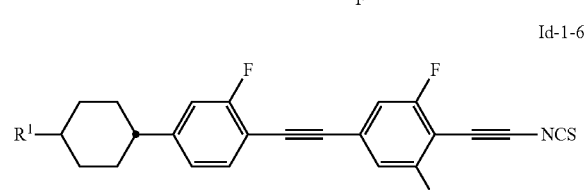
Id-1-7
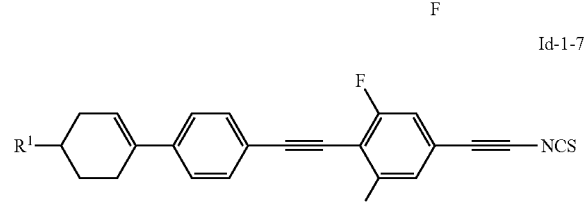
Id-1-8
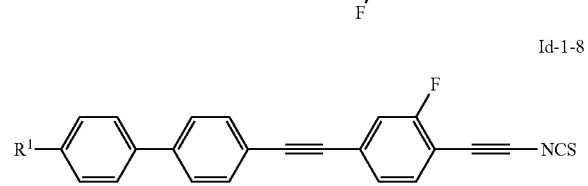
Id-1-9
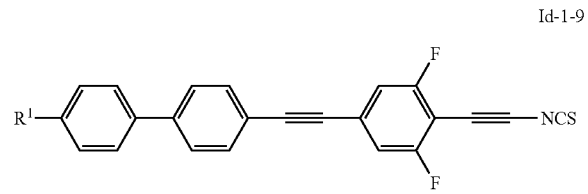
-continued
Id-1-10
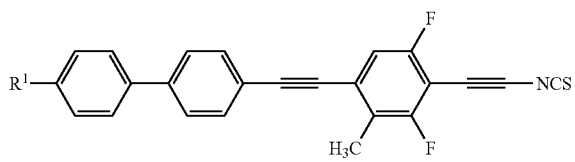
Id-1-11
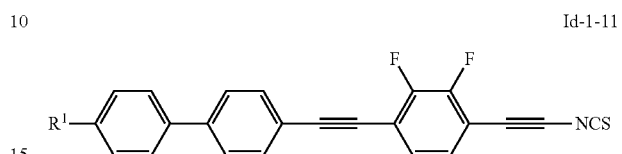
Id-1-12
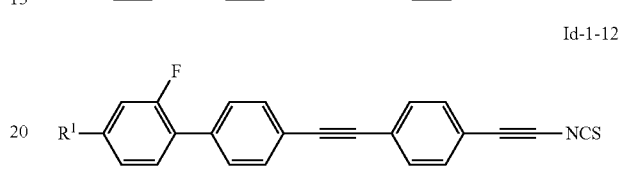
Id-1-13
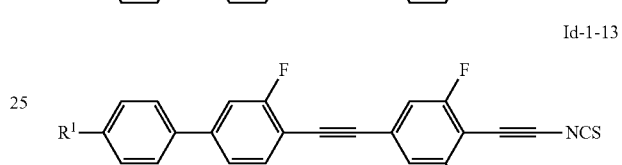
Id-1-14
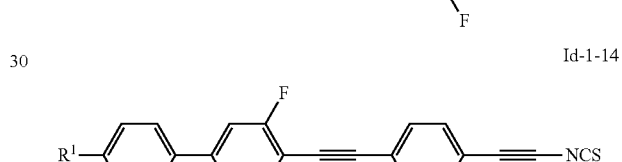
Id-1-15
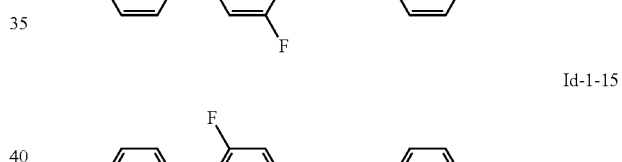
Id-1-16
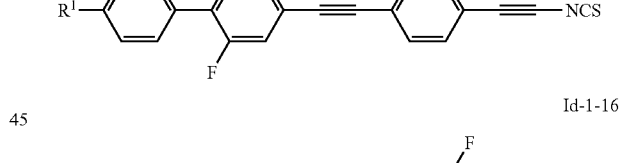
Id-1-17
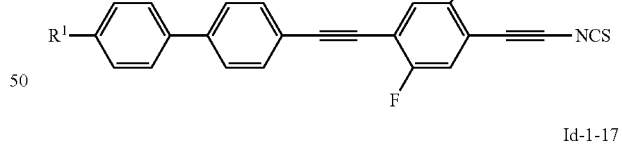
Id-1-18
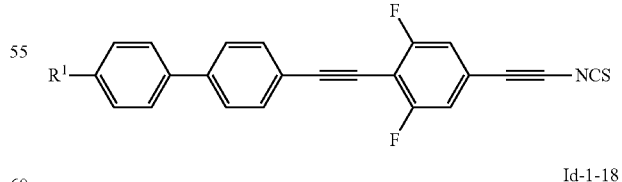
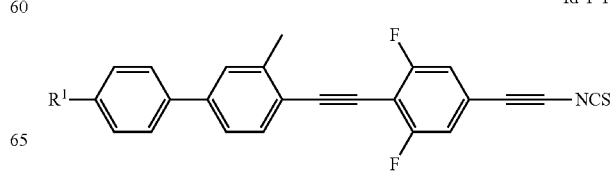

Id-1-19
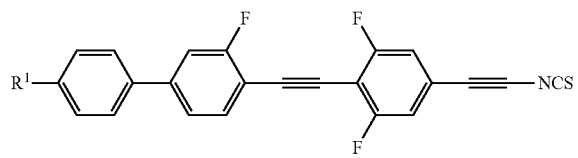
in which
R¹ has the meaning indicated above and preferably denotes $C_nH_{2n+1}$ or $CH_2=CH-(CH_2)_z$,
n is an integer in the range from 1 to 7, preferably in the range from 2 to 6 and particularly preferably 3 to 5, and
z is 0, 1, 2, 3 or 4, preferably 2.
The compounds of formula Id-2 are preferably selected from the group consisting of the formulae Id-2-1 to Id-2-19:
Id-2-1
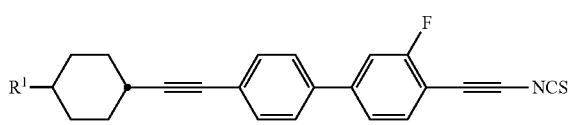
Id-2-2
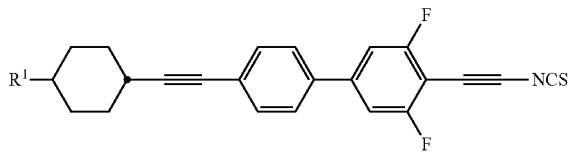
Id-2-3
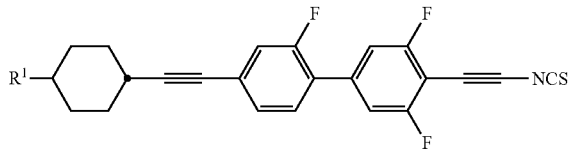
Id-2-4
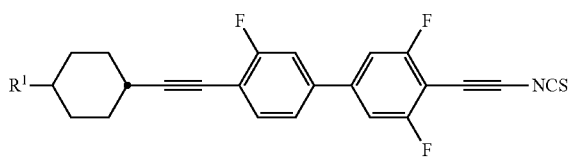
Id-2-5
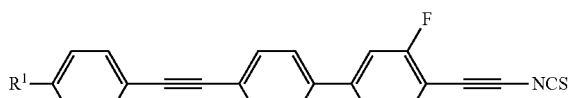
Id-2-6
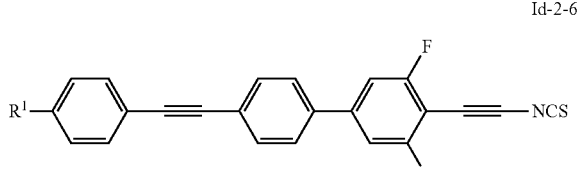
Id-2-7
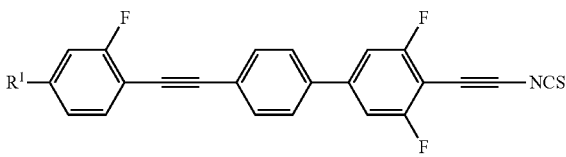
Id-2-8
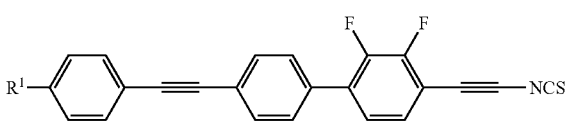
Id-2-9
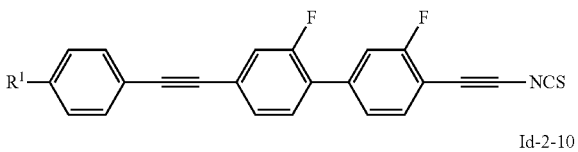
Id-2-10
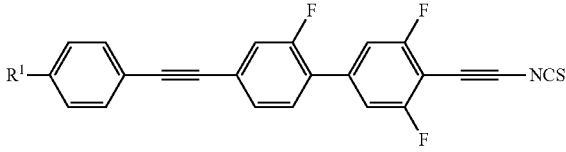
Id-2-11
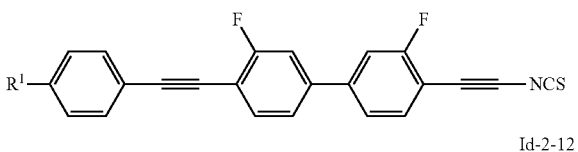
Id-2-12
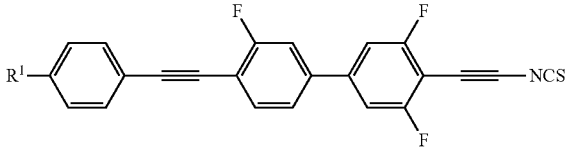
Id-2-13
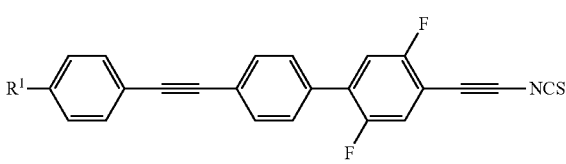
Id-2-14
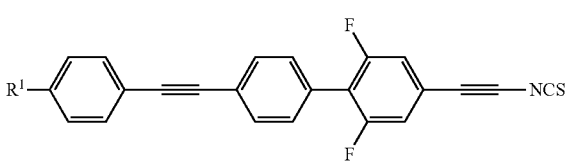
Id-2-15
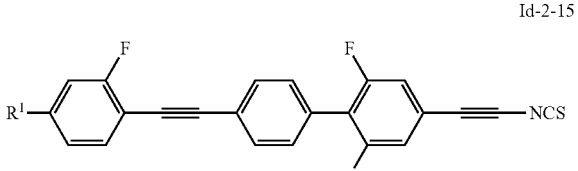

Id-2-16
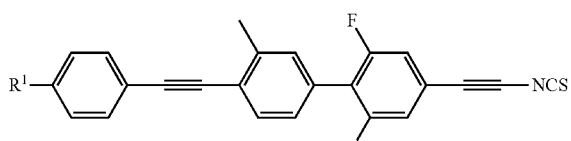

Id-2-17
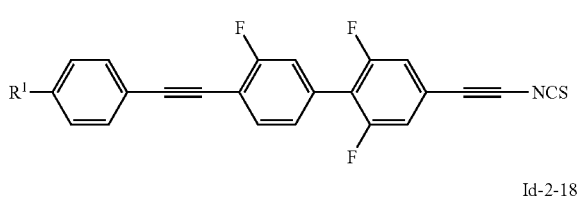

Id-2-18
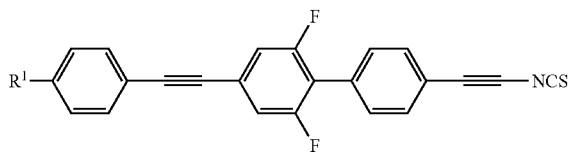

Id-2-19
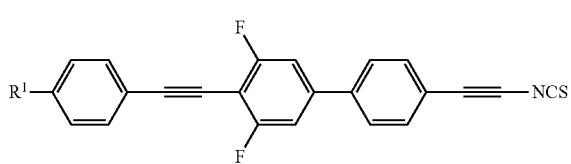

in which
R$^3$ has the meaning indicated above and preferably denotes C$_n$H$_{2n+1}$ or CH$_2$=CH—(CH$_2$)$_z$, n denotes an integer in the range from 1 to 7, preferably in the range from 2 to 6 and particularly preferably 3 to 5, and z denotes 0, 1, 2, 3 or 4, preferably 0 or 2.

The compounds of formula Id-5 are preferably selected from the compounds of formula Id-5-1 and Id-5-2:

Id-5-1
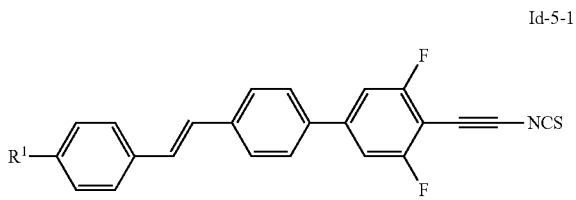

Id-5-2
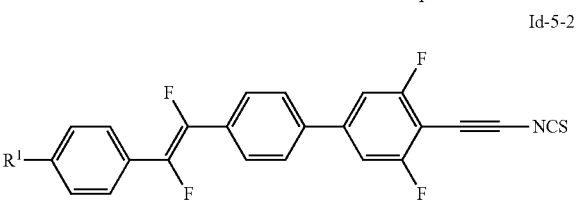

R$^1$ has the meaning indicated above for formula III-5 and preferably denotes C$_n$H$_{2n+1}$, in which n is an integer in the range from 1 to 7, preferably in the range from 2 to 6.

In another preferred embodiment, the compounds of the formula I are selected from the compounds of the formula Ie, Ie
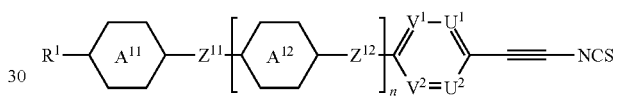

in which
one of the ring elements A$^{11}$ and A$^{12}$ denotes

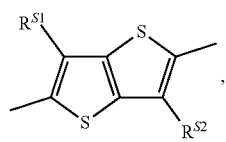

R$^{S1}$ and R$^{S2}$ identically or differently, denote H or alkyl having 1 to 6 C atoms, preferably H, and the other occurring groups and parameters have the meanings defined above for formula I.

Preferably, the compounds of formula Ie are selected from the group of compounds of the formulae Ie-1 to Ie-24:

Ie-1
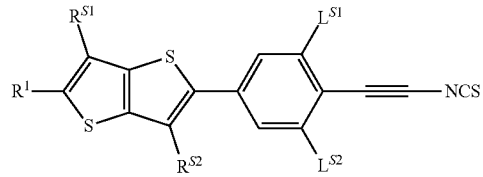

Ie-2
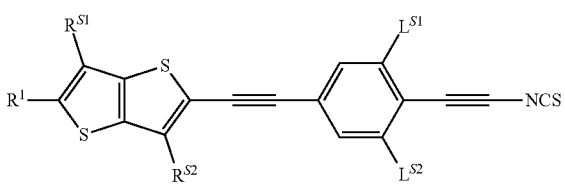

Ie-3
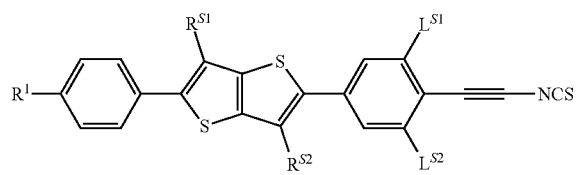

Ie-4
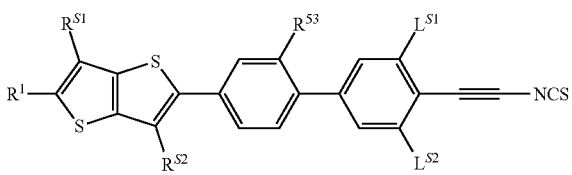

-continued
Ie-5
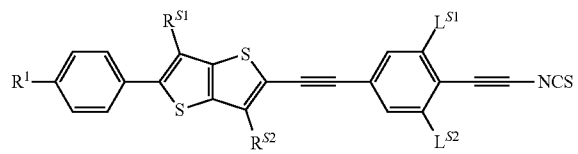
Ie-6
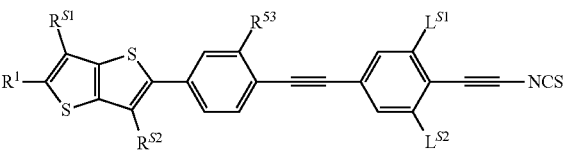
Ie-7
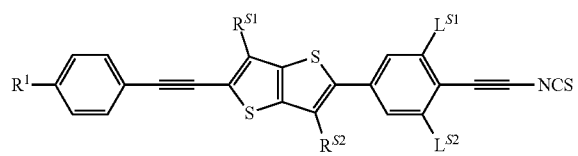
Ie-8
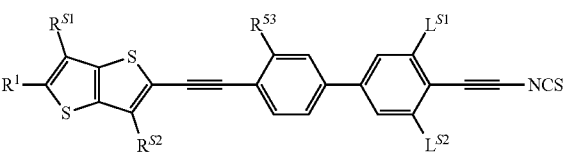
Ie-9
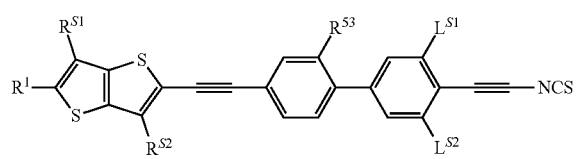
Ie-10
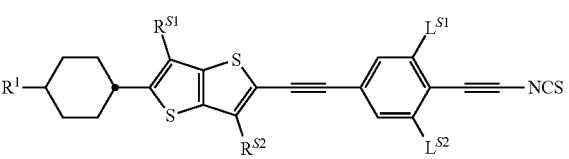
Ie-11
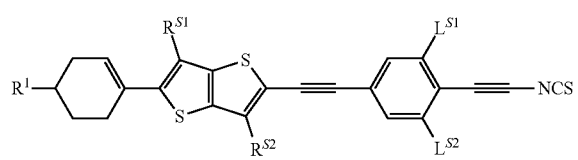
Ie-12
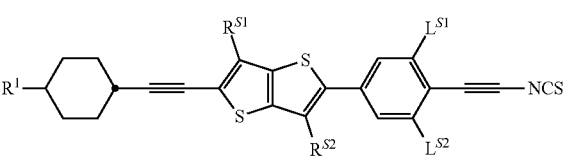
Ie-13
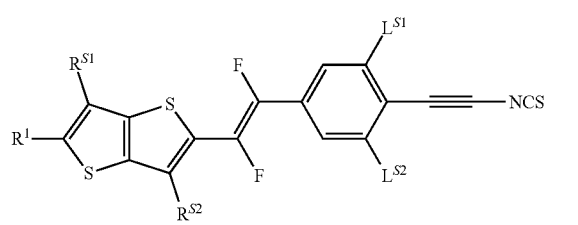
Ie-14
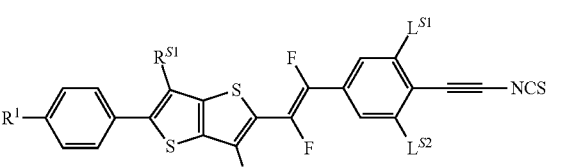
Ie-15
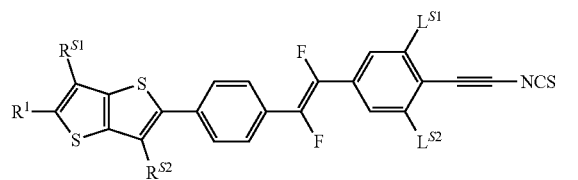
Ie-16
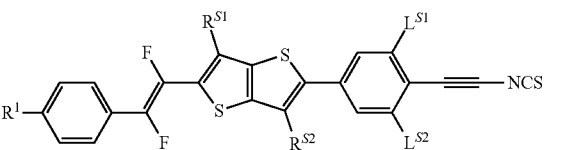
Ie-17
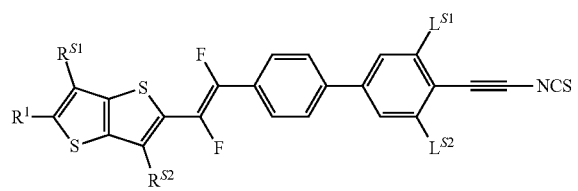
Ie-18
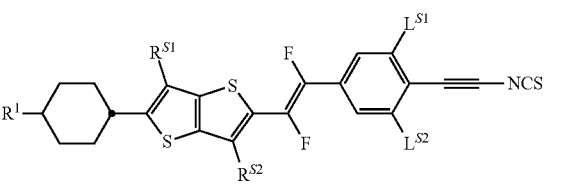
Ie-19
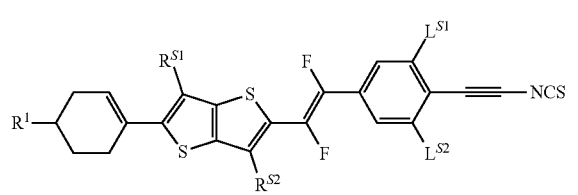
Ie-20
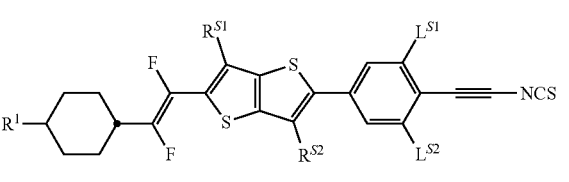

-continued

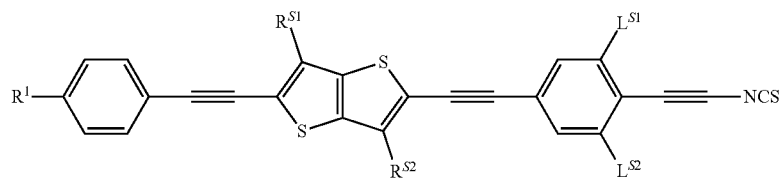

Ie-21

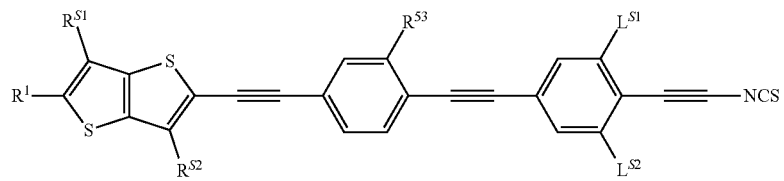

Ie-22

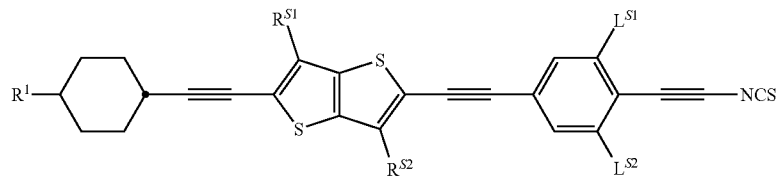

Ie-23

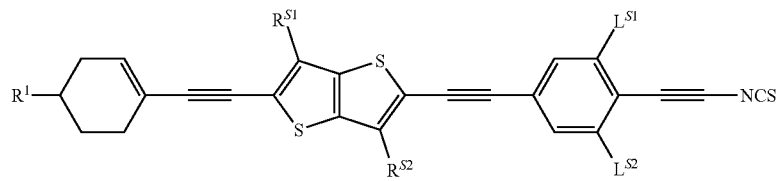

Ie-24 in which the occurring groups have the meanings given above for formula Ie and $L^{S1}$ and $L^{S2}$ independently denote H, F, Cl or CH$_3$, and preferably R$^1$ denotes alkyl or alkenyl having 2 to 6 C atoms, in which one or more CH$_2$-groups may be replaced by

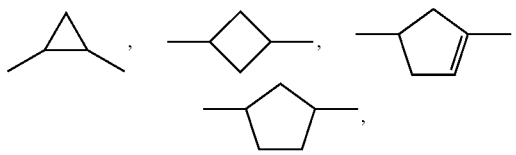

$R^{S1}$ and $R^{S2}$ identically or differently, denote H or alkyl having 1 to 6 C atoms, preferably H, $R^{S3}$ denotes H, F or alkyl, having up to 6 C atoms, or cyclopropyl, preferably H, F or ethyl, very preferably H, $L^{S1}$ and $L^{S2}$ identically or differently, denote H or F, preferably F.

In another preferred embodiment, the compounds of the formula I are selected from the compounds of the formula If,

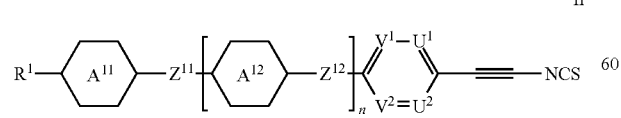

If in which $U^1$, $U^2$, $V^1$ and $V^2$ denote —CR$^0$=, in which R$^0$ denotes Cl or F, preferably F and the remaining groups and parameter have the meanings defined for formula I.

The compounds of formula If are preferably selected from the compounds of the formulae If-1 to If-11:

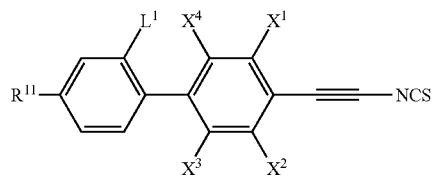

If-1

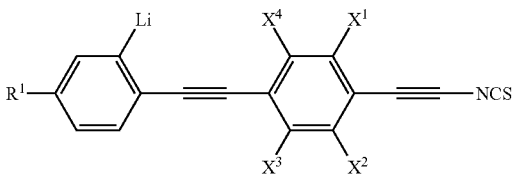

If-2

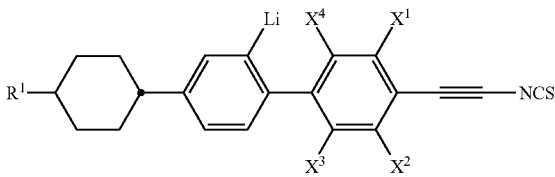

If-3

-continued

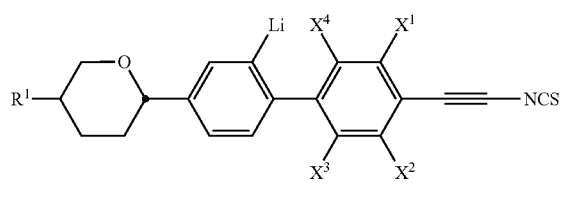

If-4

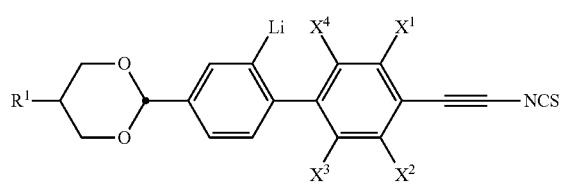

If-5

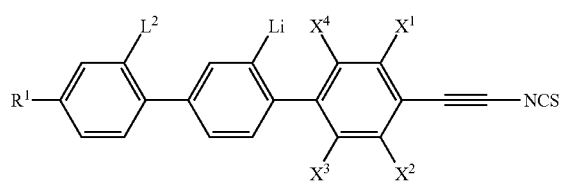

If-6

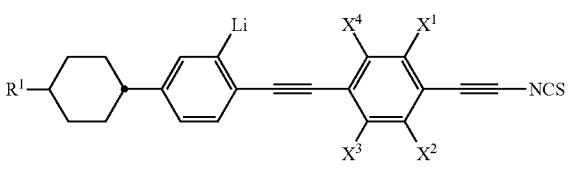

If-7

If-8

-continued

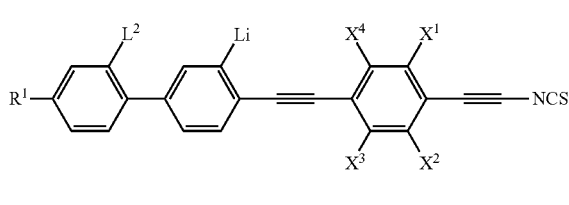

If-9

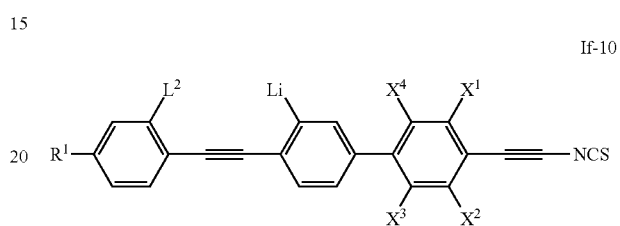

If-10

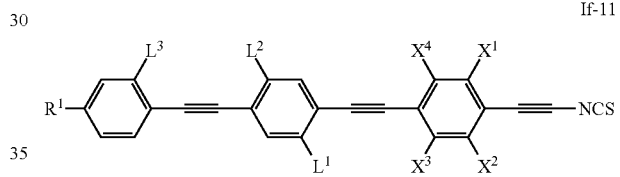

If-11 in which

L¹, L² and L³ identically or differently, denote H, F, Cl, methyl, ethyl, n-propyl, isopropyl, cyclopropyl, cyclobutyl, cyclopentyl or cyclopentenyl, R¹ has the meanings given above for formula I, and X¹, X², X³ and X⁴ denote F or Cl, preferably F.

Very preferably, the compounds of formula If are selected from the compound of formula If-3, in which the occurring groups have the meanings given above and particularly preferably L¹ denotes H, X¹, X², X³ and X⁴ denote F and R¹² denotes alkyl having 1 to 7 C atoms.

In another preferred embodiment, the compounds of formula I are selected from the compounds of formula Ig

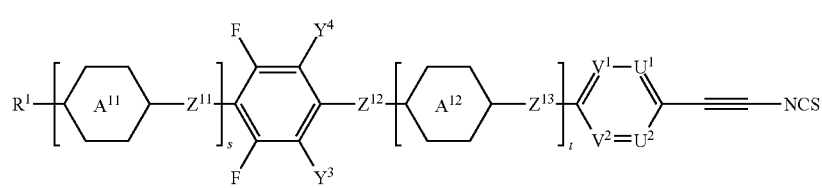

Ig in which the occurring groups have the meanings defined above for formula I, $Z^{13}$ independently has the meanings of $Z^{11}$, $Y^3$ and $Y^4$, identically or differently, denote H, F, Cl, or straight chain or branched or cyclic alkyl, alkenyl, alkoxy or alkenyloxy, each having up to 12 C atoms, preferably H, s is 0, 1 or 2, preferably 0 or 1, t is 0, 1 or 2, preferably 0 or 1, and s+t is 0, 1 or 2, preferably 0 or 1.

The compounds of formula Ig are preferably selected from the compounds of the formulae Ig-1 to Ig-20:

Ig-1

Ig-2

Ig-3

Ig-4

Ig-5

Ig-6

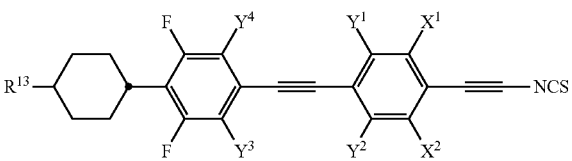

Ig-7

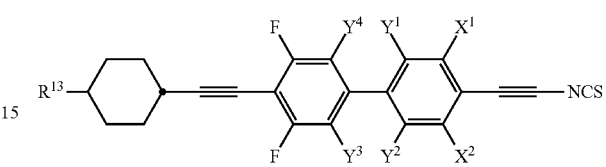

Ig-8

Ig-9

Ig-10

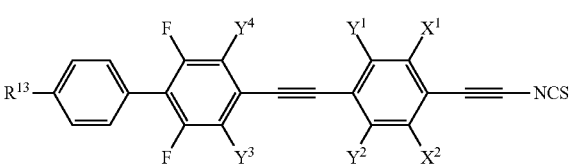

Ig-11

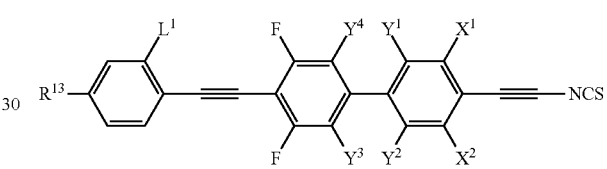

Ig-12

Ig-13

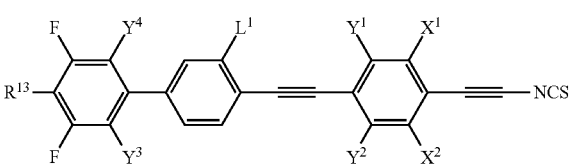

Ig-14

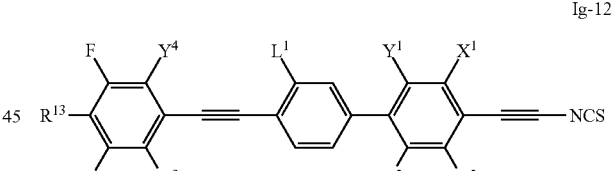

Ig-15

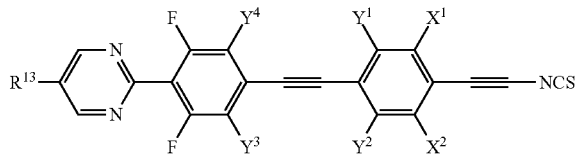

Ig-16

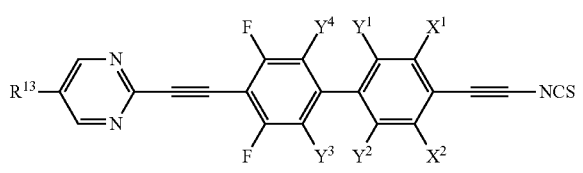

Ig-17

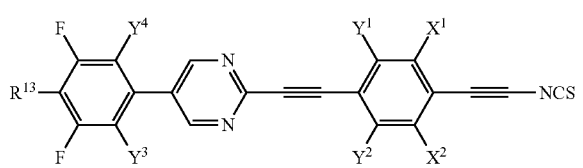

Ig-18

Ig-19

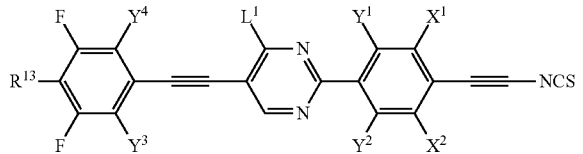

Ig-20 in which the occurring groups have the meanings indicated above for formula Ig and preferably $R^{13}$ denotes alkyl having 1 to 7 C atoms, $Y^1$, $Y^2$, $Y^3$, and $Y^4$, identically or differently, denote H, F, Cl, methyl, ethyl, n-propyl, isopropyl, cyclopropyl, cyclobutyl, cyclopentyl or cyclopentenyl, and more preferably $Y^1$ and $Y^2$ independently denote H or F, in particular H, and $Y^3$ and $Y^4$ very preferably denote H, and $L^1$ and $L^2$, identically or differently, very preferably denote H, F, methyl or ethyl, in particular H.

Preferred compounds of formula I in which the radical $R^1$ denotes $R^P$ are selected from the group of compounds of the formulae T-1a to T-4b:

T-1a

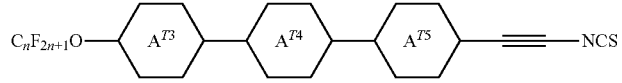

T-1b

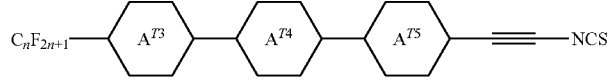

T-2a

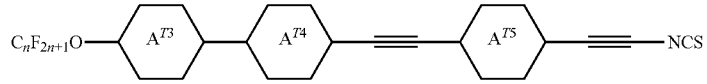

T-2b

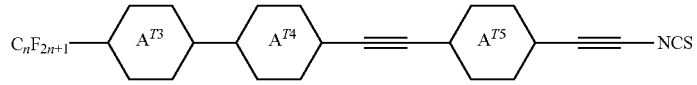

T-3a

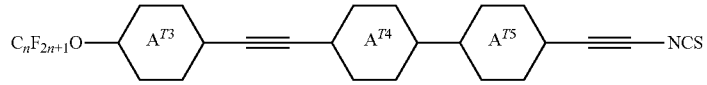

T-3b

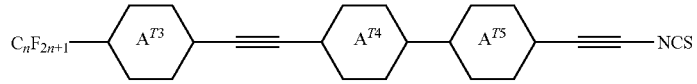

T-4a

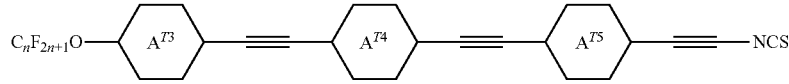

T-4b

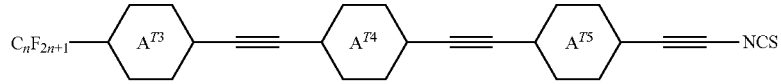

in which

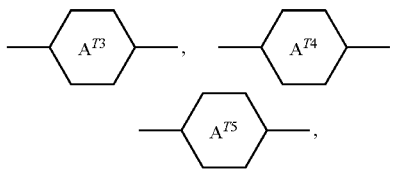

identically or differently, have the meanings given above for ring element $A^{12}$, and n is 1, 2, 3, 4, 5, 6 or 7, preferably 1, 2, 3 or 4, particularly preferably 1.

In a particularly preferred embodiment of the present invention the media comprise one or more compounds selected from the compounds of the formulae T-1a and T-2a.

Preferred compounds of formula T-1a are selected from the group of compounds of the following sub-formulae:

T-1a-1
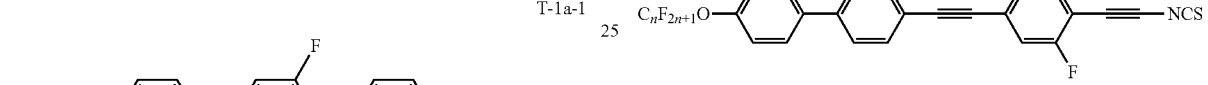

T-1a-2
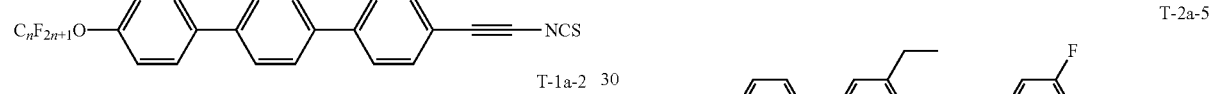

T-1a-3
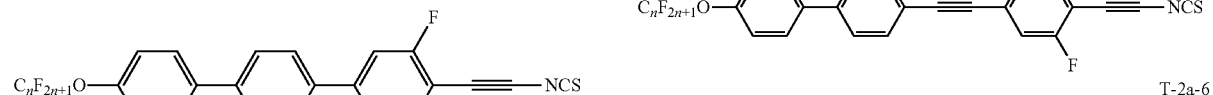

T-1a-4
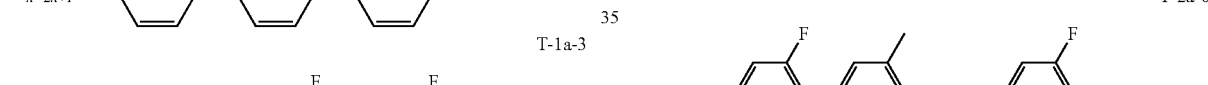

T-1a-5
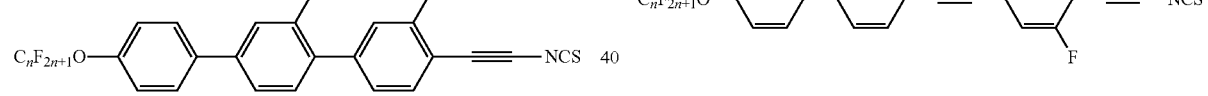

T-1a-6
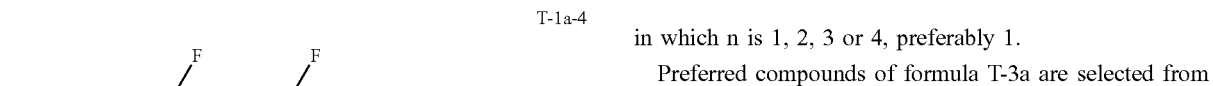

in which n is 1, 2, 3 or 4, preferably 1.

Preferred compounds of formula T-2a are selected from the group of compounds of the following sub-formulae:

T-2a-1
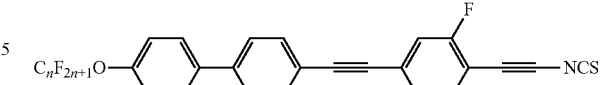

T-2a-2
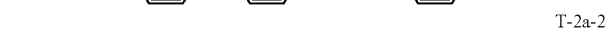

T-2a-3
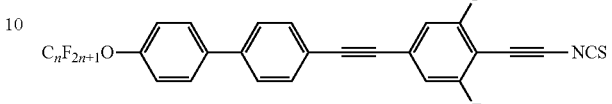

T-2a-4
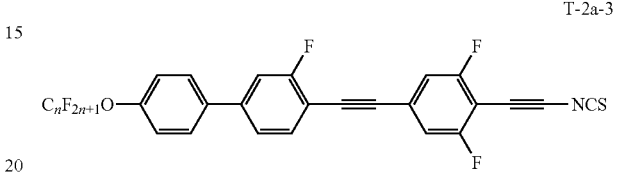

T-2a-5
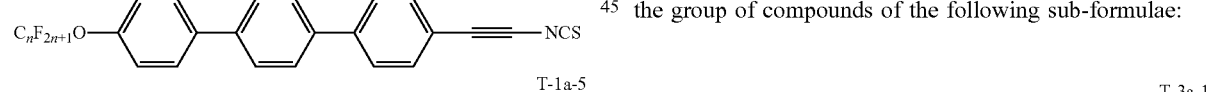

T-2a-6

in which n is 1, 2, 3 or 4, preferably 1.

Preferred compounds of formula T-3a are selected from the group of compounds of the following sub-formulae:

T-3a-1
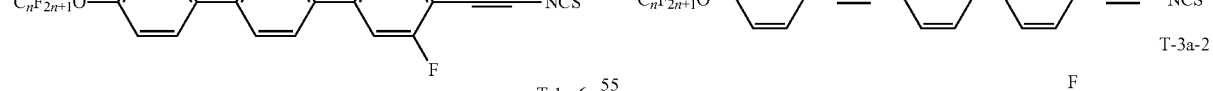

T-3a-2
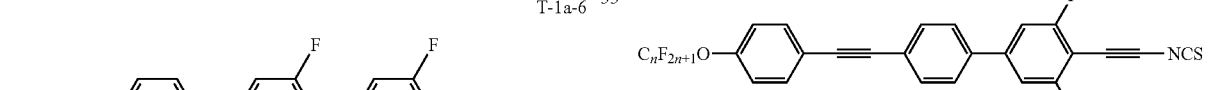

T-3a-3
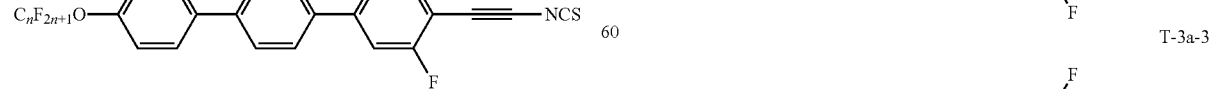

T-3a-4
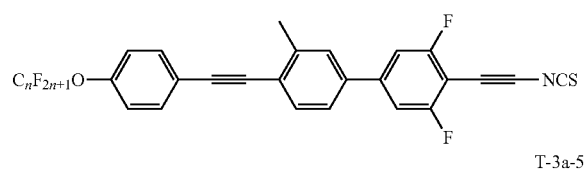
T-3a-5
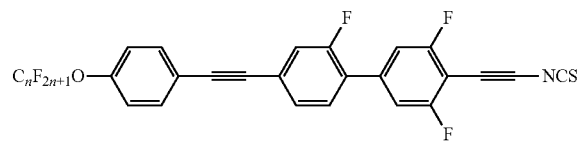
T-3a-6
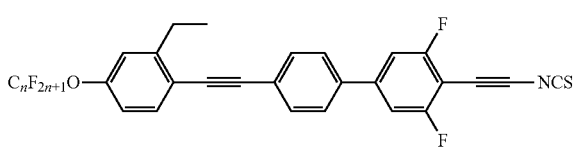
in which n is 1, 2, 3 or 4, preferably 1.
Preferred compounds of formula I in which the radical $R^1$ is a cyclic alkyl group are selected from the compounds of the formulae Cy-1 to Cy-16
Cy-1
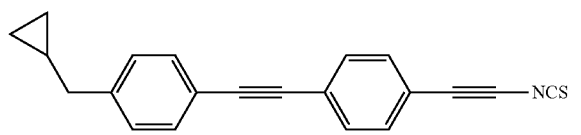
Cy-2
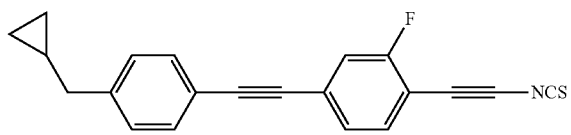
Cy-3
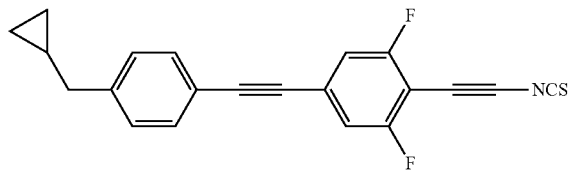
Cy-4
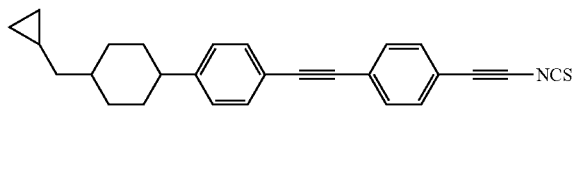
Cy-5
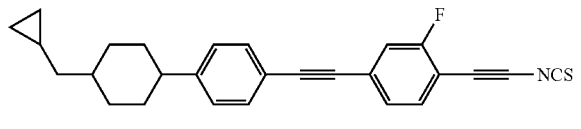
Cy-6
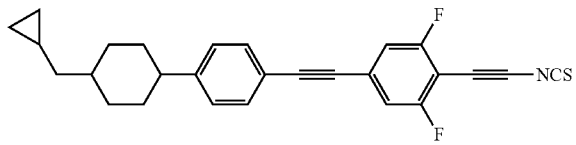
Cy-7
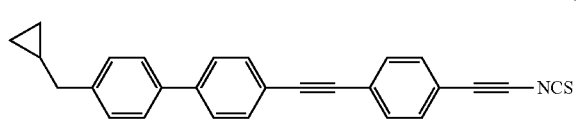
Cy-8
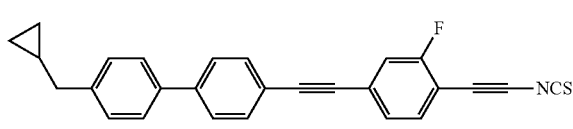
Cy-9
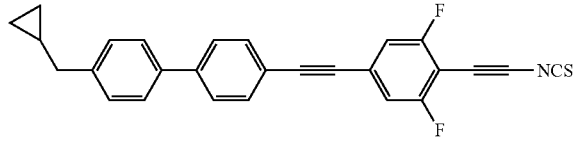
Cy-10
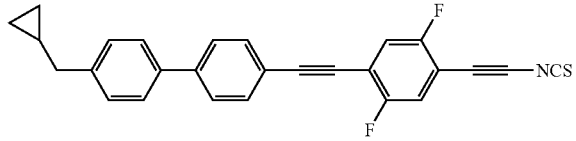
Cy-11
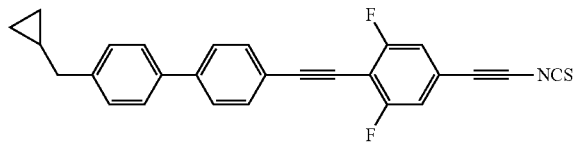
Cy-12
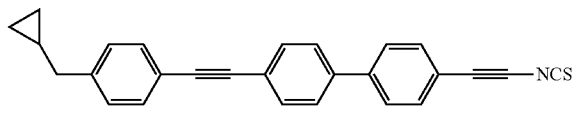
Cy-13
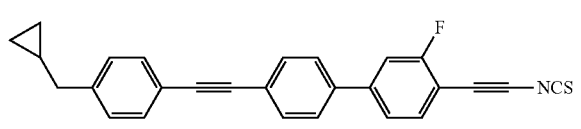
Cy-14
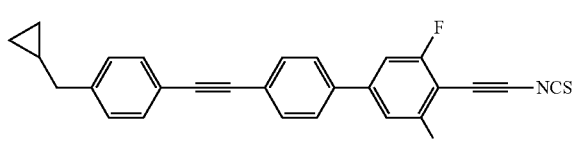

-continued

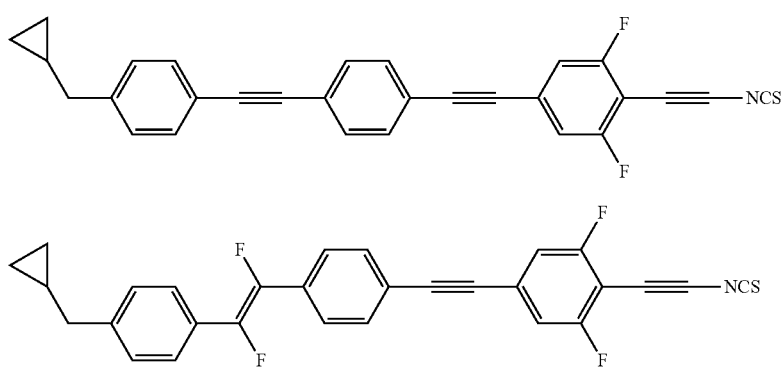

Cy-15

Cy-16

In a preferred embodiment, the compounds of formula I are selected from the compounds of formula Ih

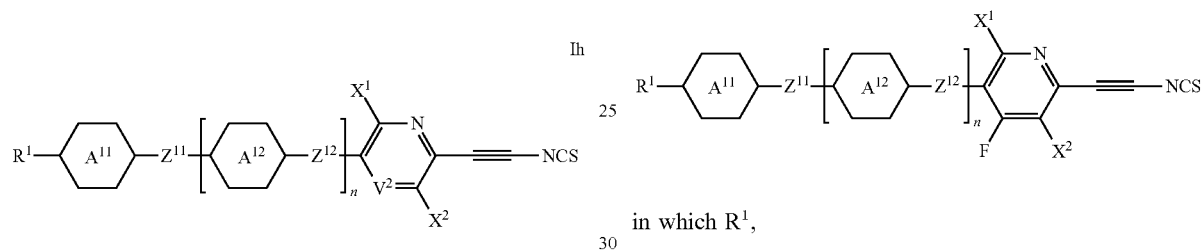

Ih

Ih-3 in which

R$^1$,

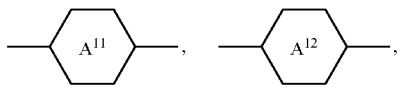

$Z^{11}$, $Z^{12}$ and n have the meanings given above for formula I, $V^2$ denotes N, C—F or C—Cl, $X^1$ and $X^2$, identically or differently, denote H, Cl, F, methyl or ethyl, and n is 0, 1 or 2.

The compound of formula Ih is preferably selected from the group consisting of the formulae Ih-1, Ih-2 and Ih-3:

Ih-1

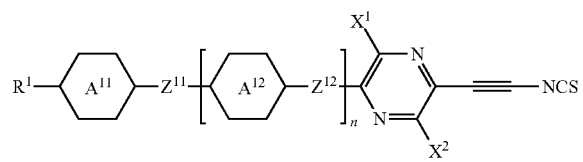

Ih-2

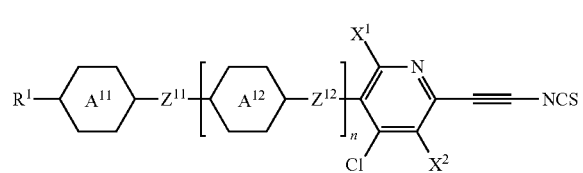

in which R$^1$,

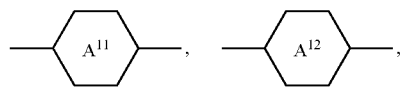

$Z^{11}$, $Z^{12}$, $X^1$, $X^2$ and n, have the respective meanings given above for formula I and its sub-formulae.

In a preferred embodiment, in formula Ih and its sub-formulae the radicals $X^1$ and $X^2$ both denote H.

In a preferred embodiment, in formula Ih and its sub-formulae the radical $X^1$ denotes H and the radical $X^2$ denotes F or Cl.

In a preferred embodiment, in formula Ih and its sub-formulae the radical $X^1$ denotes F or Cl and the radical $X^2$ denotes H.

In a preferred embodiment, in formula Ih and its sub-formulae the radicals $X^1$ and $X^2$ denote F or Cl, preferably both F.

The compounds of the formulae Ih-1, Ih-2 and Ih-3 are preferably selected from the group consisting of the formulae Ih-1-1 to Ih-1-10, Ih-2-1 to Ih-2-10 and Ih-3-1 to Ih-3-10:

Ih-1-1

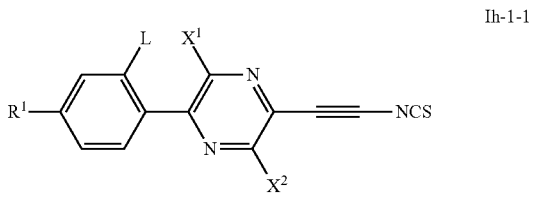

-continued

Ih-1-2, Ih-1-3, Ih-1-4, Ih-1-5, Ih-1-6, Ih-1-7, Ih-1-8, Ih-1-9

Ih-1-10, Ih-1-11, Ih-1-12, Ih-2-1, Ih-2-2, Ih-2-3, Ih-2-4, Ih-2-5

Ih-2-6
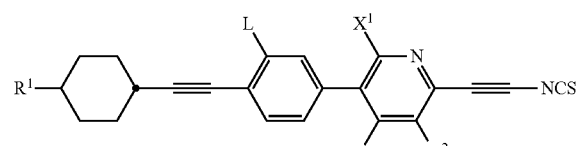
Ih-2-7
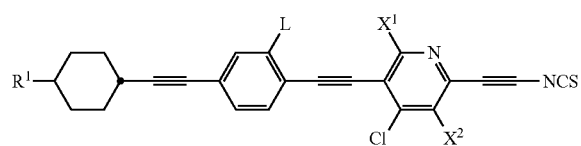
Ih-2-8
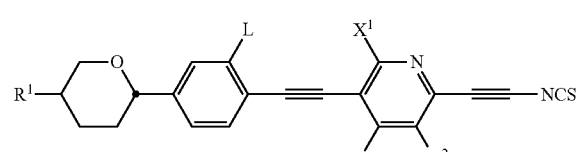
Ih-2-9
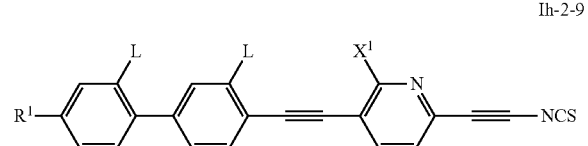
Ih-2-10
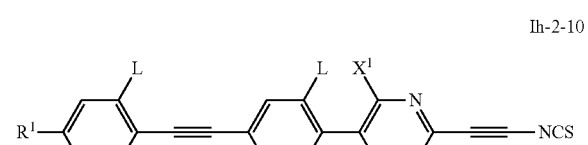
Ih-2-11
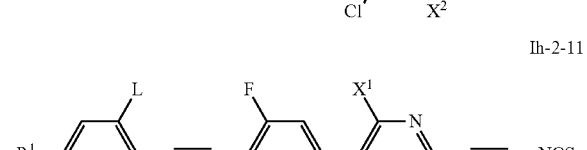
Ih-2-12
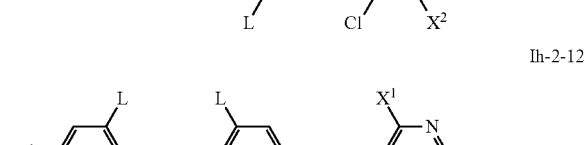
Ih-3-1
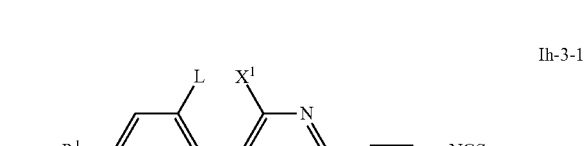
Ih-3-2
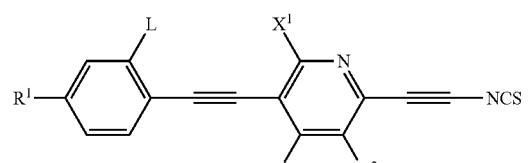
Ih-3-3
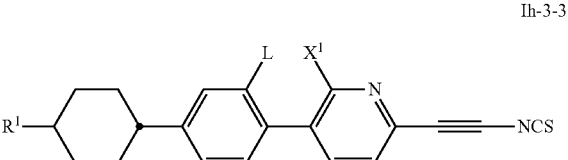
Ih-3-4
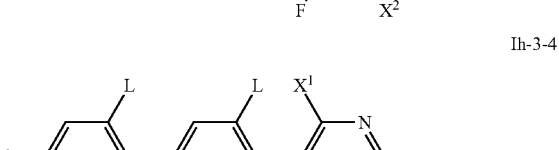
Ih-3-5
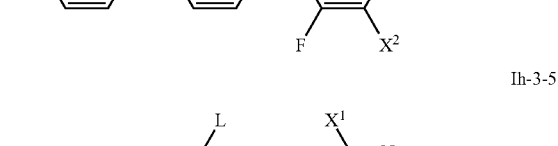
Ih-3-6
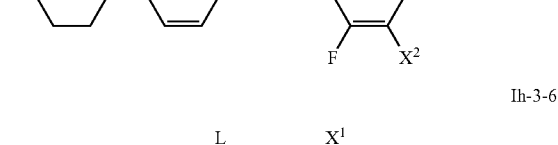
Ih-3-7
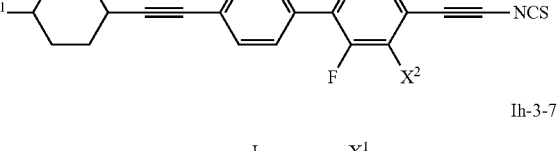
Ih-3-8
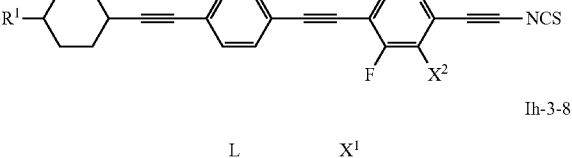
Ih-3-9
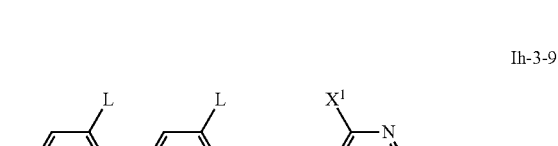

Ih-3-10

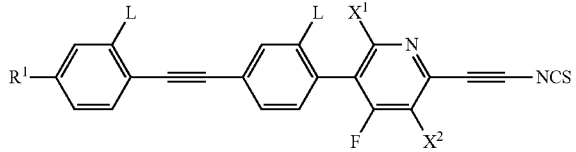

Ih-3-11

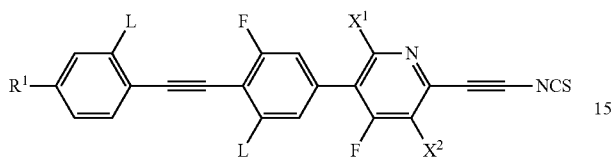

Ih-3-12

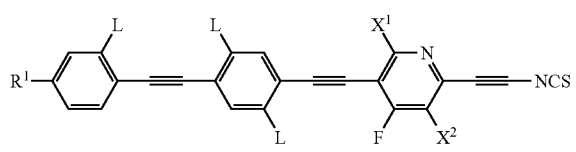

in which $R^N$, $X^1$ and $X^2$ have the meanings given above and L, on each occurrence identically or differently denotes H, F, methyl, ethyl or cyclopropyl.

In a preferred embodiment, the medium according to the invention comprises a compound of formula II Ii

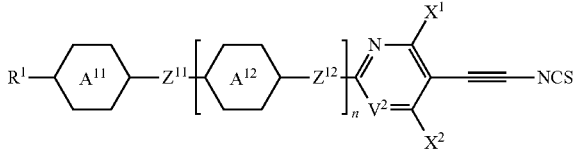

in which $R^1$,

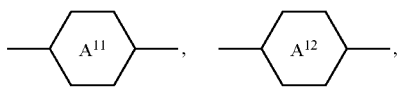

$Z^{11}$, $Z^{12}$, $V^2$, $X^1$, $X^2$ and n, have the respective meanings given above for formula Ih.

The compounds of formula II are preferably selected from the compounds of the formulae Ii-1 and Ii-2

Ii-1

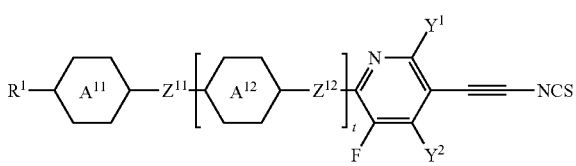

Ii-2

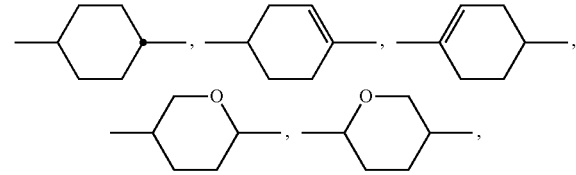

in which $R^1$, $Z^{11}$, $Z^{12}$,

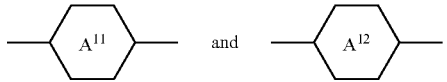

have the meanings given above for formula Ih, $Y^1$ and $Y^2$, identically or differently, denote H, F or Cl, and t is 0 or 1.

In the compounds of formula Ii or Ii-1 or Ii-2,

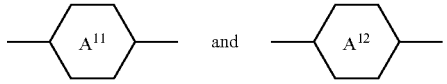

independently of one another, preferably denote

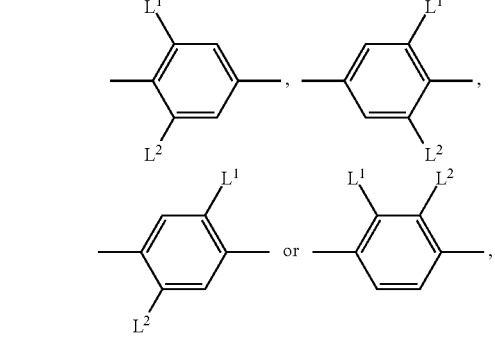

wherein

alternatively denotes

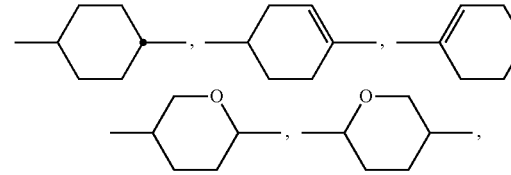

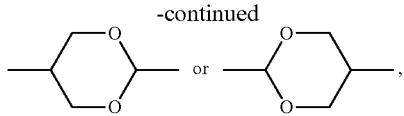

and $L^1$ and $L^2$, identically or differently, denote F, Cl or straight chain or branched or cyclic alkyl or alkenyl each having up to 12 C atoms.

In the compounds of formula Ii or Ii-1 or Ii-2, $Z^{11}$ and $Z^{12}$, identically or differently, preferably denote —C≡C— or a single bond.

In a preferred embodiment of the present invention, the compounds of formula Ii-1 and Ii-2 are selected from the compounds of the formulae Ii-1-1 to Ii-1-12 and Ii-2-1 to Ii-2-12

Ii-1-1

Ii-1-2

Ii-1-3

Ii-1-4

Ii-1-5

Ii-1-6

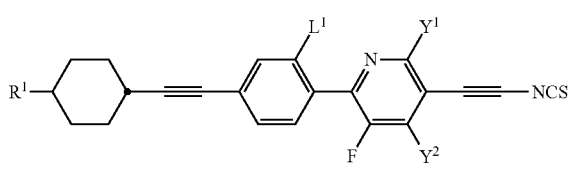

Ii-1-7

Ii-1-8

Ii-1-9

Ii-1-10

Ii-2-11

Ii-1-12

Ii-2-1

Ii-2-2

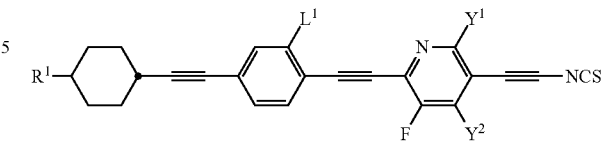
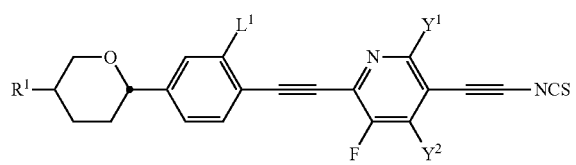
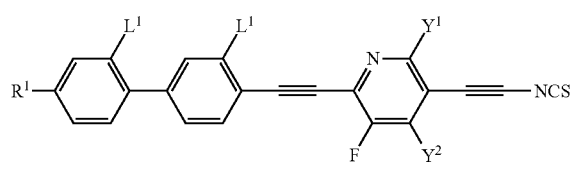
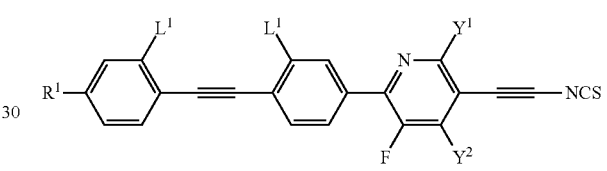
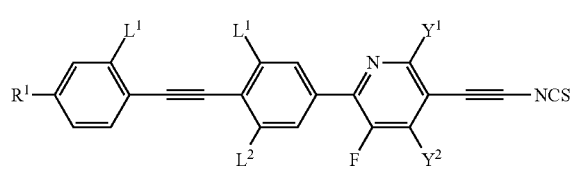
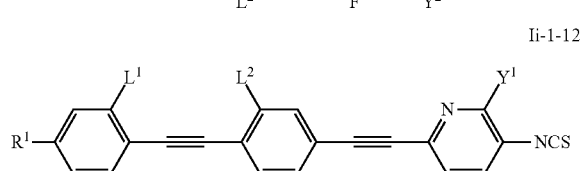
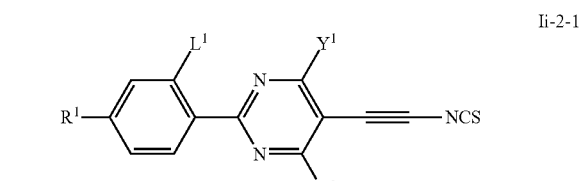
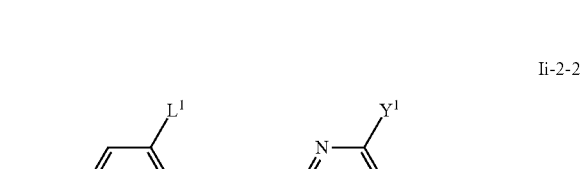
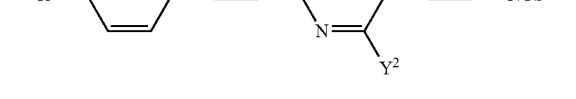

-continued
Ii-2-3
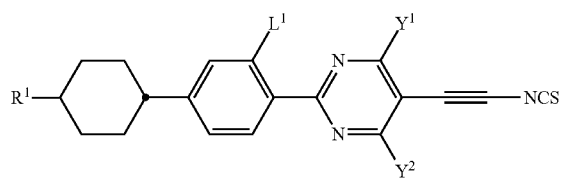
Ii-2-4
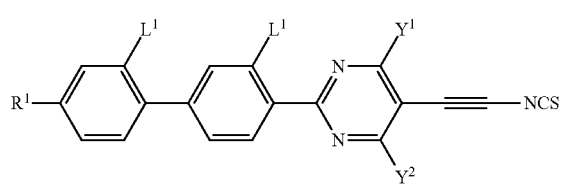
Ii-2-5
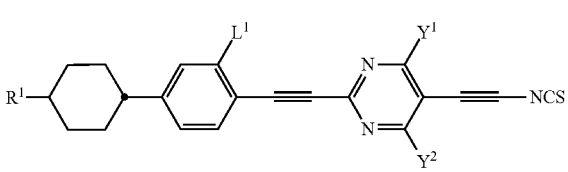
Ii-2-6
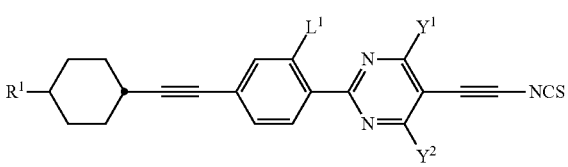
Ii-2-7
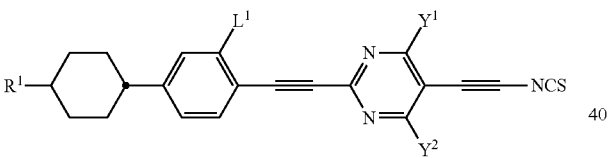
Ii-2-8
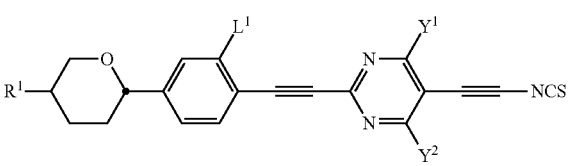
Ii-2-9
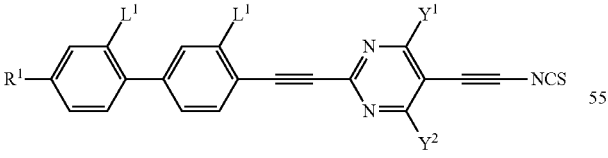
Ii-2-10
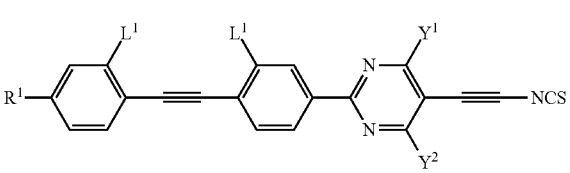
-continued
Ii-2-11
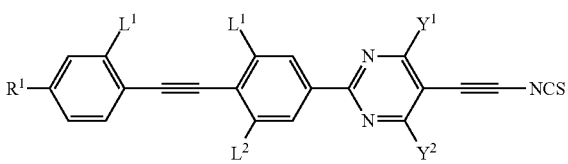
Ii-2-12
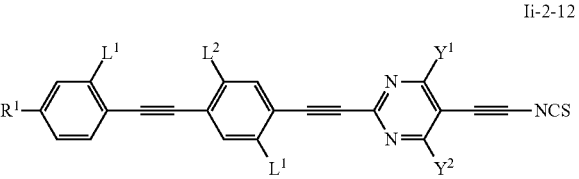
in which
$L^1$, $L^2$ and $L^3$ identically or differently, denote H, F, Cl, methyl, ethyl, n-propyl, isopropyl, cyclopropyl, cyclobutyl, cyclopentyl or cyclopentenyl, and
$R^1$, $Y^1$ and $Y^2$ have the meanings given above for formula Ih-1 and Ih-2, and in which very preferably the group
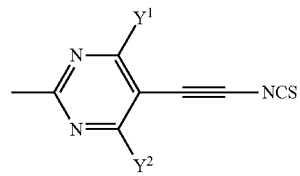
denotes
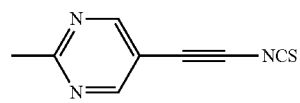
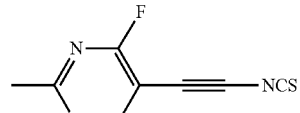
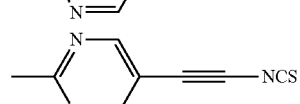
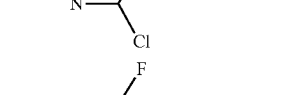
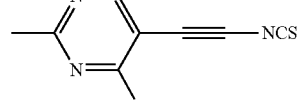
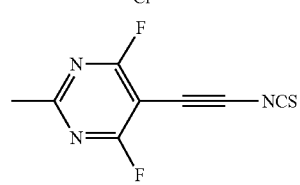

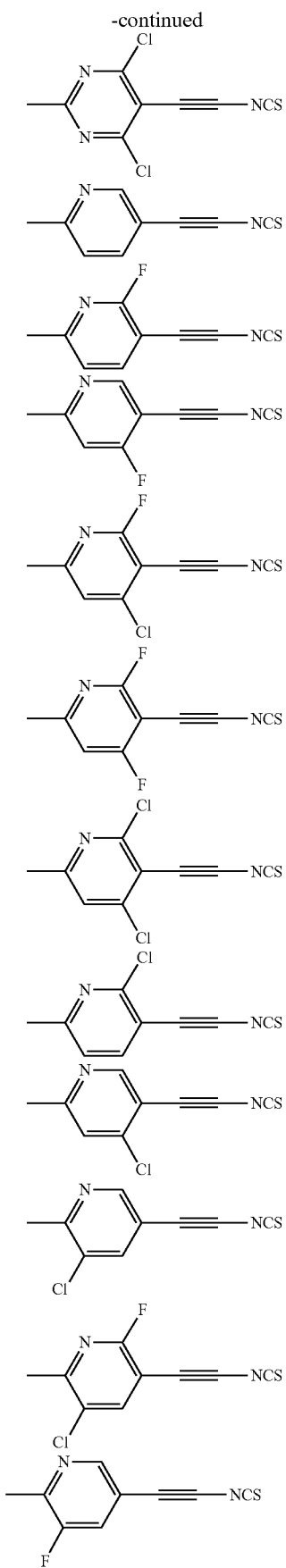

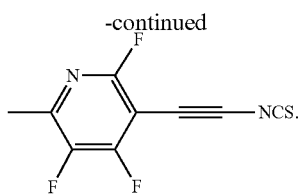

In a preferred embodiment, in the compounds of formula Ih and its sub-formulae, one or both of $Y^1$ and $Y^2$ denote H, preferably both.

In a preferred embodiment, the compounds of formula I are selected from the compounds of the formula Ij

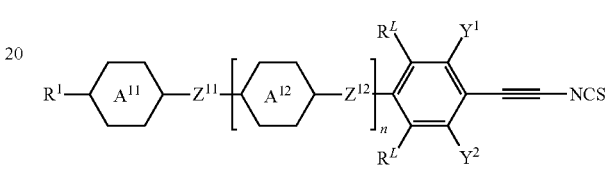

Ij in which $R^1$, $Z^{11}$, $Z^{12}$ and n have the meanings given for formula I above $Y^1$ denotes methyl, ethyl or Cl, $Y^2$ denotes H, methyl, ethyl, F or Cl, preferably H or F, $R^L$ denotes H, F, Cl or methyl, preferably H,

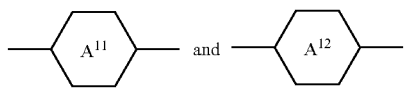

independently of one another, denote

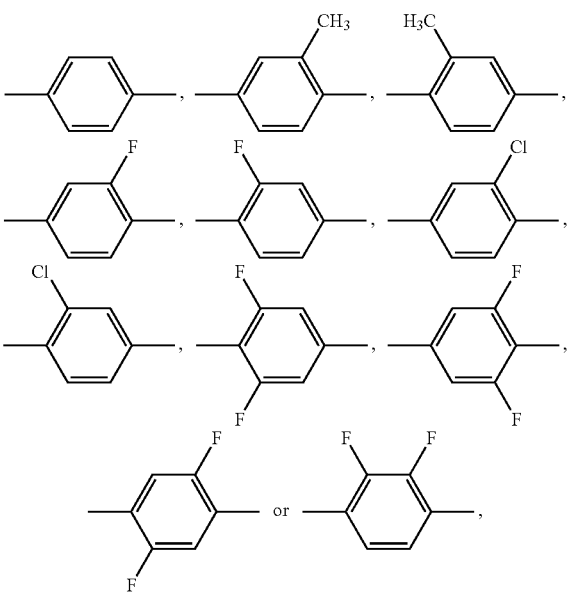

or preferably

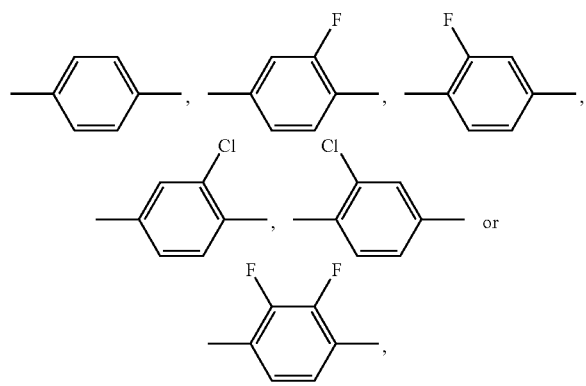

and
where

alternatively denotes

and
n is 0 or 1.

Preferably, the compounds of formula Ij are selected from the sub-formulae Ij-1 to Ij-4

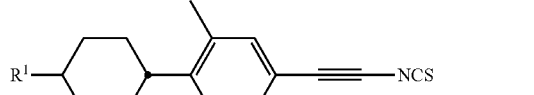

Ij-1

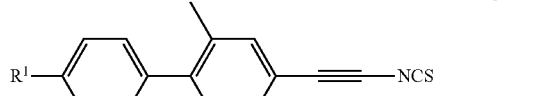

Ij-2

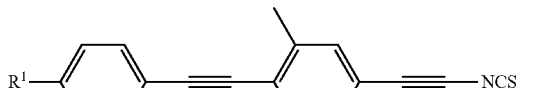

Ij-3

Ij-4 in which the occurring groups and parameters have the meanings given above for formula Ij.

Particularly preferably, the media according to the invention comprise one or more compounds selected from the group of compounds of the formulae Ij-2-1 to Ij-2-9 and Ij-4-1 to Ij-4-10:

Ij-2-1

Ij-2-2
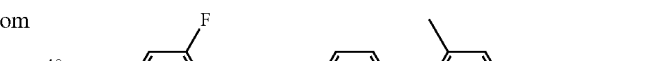

Ij-2-3
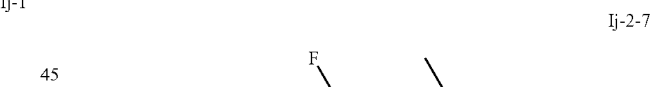

Ij-2-4

Ij-2-5

Ij-2-6

Ij-2-7
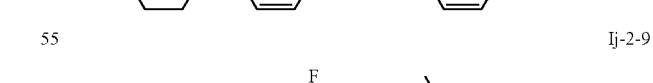

Ij-2-8
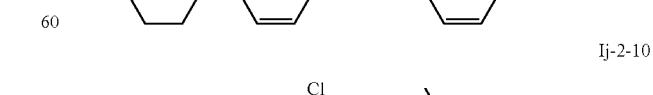

Ij-2-9

Ij-2-10
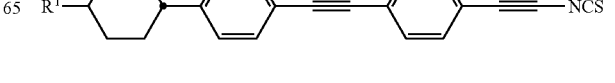

-continued

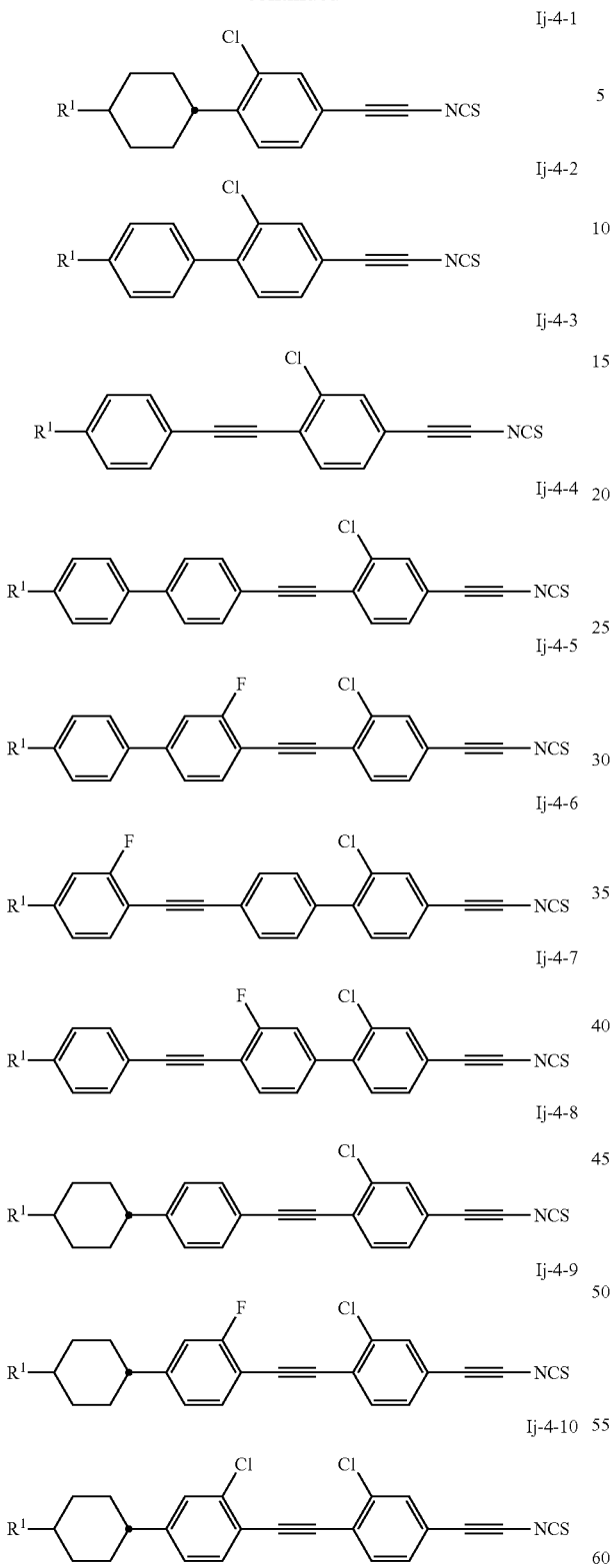

Ij-4-1
Ij-4-2
Ij-4-3
Ij-4-4
Ij-4-5
Ij-4-6
Ij-4-7
Ij-4-8
Ij-4-9
Ij-4-10

The liquid-crystalline media in accordance with the present invention comprise one or more compounds of the formula I and optionally at least one further, preferably mesogenic compound. The liquid-crystal medium therefore preferably comprises two or more compounds which are preferably liquid-crystalline. Preferred media comprise the preferred compounds of the formula I.

The present invention therefore also relates to a liquid-crystalline medium comprising two or more liquid-crystalline compounds, comprising one or more compounds of the general formula I.

Further components of the liquid-crystalline media are preferably selected from the compounds of the formula II:

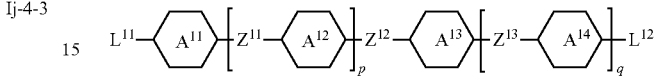

II in which $L^{11}$ denotes $R^{11}$ or $X^{11}$, $L^{12}$ denotes $R^{12}$ or $X^{12}$, $R^{11}$ and $R^{12}$, independently of one another, denote non-fluorinated alkyl or non-fluorinated alkoxy having 1 to 17, preferably having 3 to 10, C atoms or non-fluorinated alkenyl, non-fluorinated alkynyl, non-fluorinated alkenyloxy or non-fluorinated alkoxyalkyl having 2 to 15, preferably 3 to 10, C atoms, preferably alkyl or non-fluorinated alkenyl, $X^{11}$ and $X^{12}$, independently of one another, denote F, Cl, Br, —CN, —NCS, —SCN, $SF_5$, fluorinated alkyl or fluorinated alkoxy having 1 to 7 C atoms or fluorinated alkenyl, fluorinated alkenyloxy or fluorinated alkoxyalkyl having 2 to 7 C atoms, preferably $CF_3$, $OCF_3$, C, F or NCS, p and q, independently of one another, denote 0 or 1, $Z^{11}$ to $Z^{13}$, independently of one another, denote trans-CH=CH—, trans-CF=CF—, —C≡C— or a single bond,

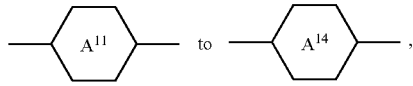

independently of one another, denote

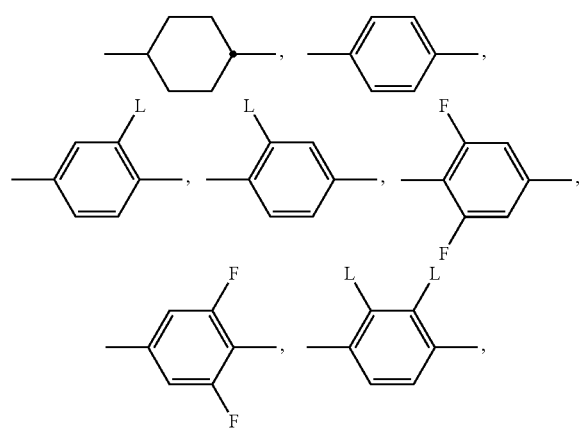

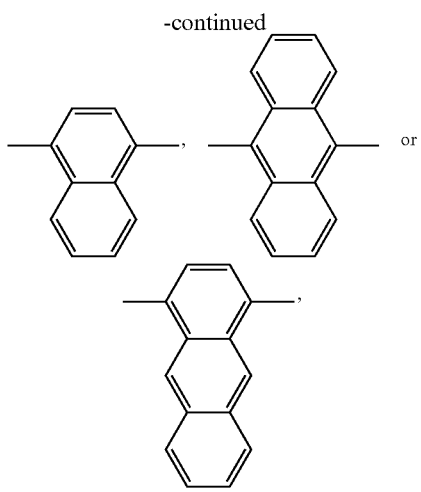

and

L on each occurrence, independently of one another, denotes branched or unbranched alkyl, alkenyl or alkynyl having 1 or 2 to 12 C atoms, resp., in which, independently of one another, one or more $CH_2$ groups may also be replaced by O, or denotes $C_3$-$C_6$ cycloalkyl, $C_3$-$C_6$ cycloalkenyl, fluorinated alkyl or alkenyl, fluorinated alkoxy or alkenyloxy, F, Cl, Br, CN, NCS, SCN or $SF_5$.

In a preferred embodiment of the present invention, the liquid-crystalline media comprise one or more compounds of the formula I and one or more compounds of the formula II.

The liquid-crystalline media in accordance with the present application preferably comprise in total 1 to 50%, preferably 2 to 40% and particularly preferably 3 to 30%, of compounds of the formula I.

The liquid-crystalline media in accordance with the present application preferably comprise in total 10 to 100%, preferably 20 to 95% and particularly preferably 25 to 90%, of compounds of the formulae I and II.

In accordance with the present invention, the compounds of the formula II are preferably used in a total concentration of 10% to 90%, more preferably 15% to 85%, even more preferably 25% to 80% and very preferably 30% to 75%, of the mixture as a whole.

In addition, the liquid-crystalline media may comprise further additives, such as stabilisers, chiral dopants, dichroic dyes and nanoparticles. The individual added compounds are employed in concentrations of 0.005 to 6%, preferably 0.1 to 3%. The total concentration of these further constituents is in the range from 0% to 10%, preferably 0.1% to 6%, based on the mixture as a whole. However, the concentration data for the remaining constituents of the liquid-crystal mixtures, i.e., the liquid-crystalline or mesogenic compounds, are indicated without taking into account the concentration of these additives.

The liquid-crystalline media preferably comprise 0 to 10% by weight, in particular 0.01 to 5% by weight and particularly preferably 0.1 to 3% by weight, of stabilisers. The media preferably comprise one or more stabilisers selected from 2,6-di-tert-butylphenols, 2,2,6,6-tetramethylpiperidines or 2-benzotriazol-2-ylphenols. These assistants are known to the person skilled in the art and are commercially available, for example as light stabilisers.

In the present application, the expression dielectrically positive describes compounds or components where $\Delta\varepsilon>3.0$, dielectrically neutral describes those where $-1.5<\Delta\varepsilon<3.0$ and dielectrically negative describes those where $\Delta\varepsilon<-1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\parallel-\varepsilon_\perp)$, while $\varepsilon_{ave.}$ is $(\varepsilon_\parallel+2\varepsilon_\perp)/3$.

The host mixture used for the determination of physical constants of pure compounds by extrapolation is ZLI-4792 from Merck KGaA, Germany. The absolute values of the dielectric constants, the birefringence ($\Delta n$) and the rotational viscosity ($\gamma_1$) of the compounds are determined from the change in the respective values of the host mixture on addition of the compounds. The concentration in the host is 10% or in case of insufficient solubility 5%. The values are extrapolated to a concentration of 100% of the added compounds.

In the examples, the phase sequences of pure compounds are given using the following abbreviations:

K: crystalline, N: nematic, SmA: smectic A, SmB: smectic B, I: isotropic.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties, are determined using test cells produced at Merck KGaA, Germany. The test cells for the determination of $\Delta\varepsilon$ have a cell thickness of approximately 20 µm. The electrode is a circular ITO electrode having an area of 1.13 $cm^2$ and a guard ring. The orientation layers are SE-1211 from Nissan Chemicals, Japan, for homeotropic orientation ($\varepsilon_\parallel$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystalline media are investigated with respect to their properties in the microwave frequency range as described in A. Penirschke et al. "Cavity Perturbation Method for Characterization of Liquid Crystals up to 35 GHz", 34$^{th}$ European Microwave Conference—Amsterdam, pp. 545-548. Compare in this respect also A. Gaebler et al. "Direct Simulation of Material Permittivities . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) or quartz capillary. The capillary has an inner diameter of 0.5 mm and an outer diameter of 0.78 mm. The effective length is 2.0 cm. The filled capillary is introduced into the centre of the cylindrical cavity with a resonance frequency of 19 GHz. This cavity has a length of 11.5 mm and a radius of 6 mm. The input signal (source) is then applied, and the frequency depending response of the cavity is recorded using a commercial vector network analyser (N5227A PNA Microwave Network Analyzer, Keysight Technologies Inc. USA. For other frequencies, the dimensions of the cavity are adapted correspondingly.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in the above-mentioned publication A. Penirschke et al., 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla.

Preferred components are phase shifters, varactors, wireless and radio wave antenna arrays, matching circuit adaptive filters and others.

In the present application, the term compounds is taken to mean both one compound and a plurality of compounds, unless expressly stated otherwise.

All mixtures according to the invention are nematic. The liquid-crystal media according to the invention preferably have nematic phases in preferred ranges given above. The expression have a nematic phase here means on the one hand that no smectic phase and no crystallisation are observed at low temperatures at the corresponding temperature and on the other hand that no clearing occurs on heating from the nematic phase. At high temperatures, the clearing point is measured in capillaries by conventional methods. The investigation at low temperatures is carried out in a flow viscometer at the corresponding temperature and checked by storage of bulk samples: The storage stability in the bulk (LTS) of the media according to the invention at a given temperature T is determined by visual inspection. 2 g of the media of interest are filled into a closed glass vessel (bottle) of appropriate size placed in a refrigerator at a predetermined temperature. The bottles are checked at defined time intervals for the occurrence of smectic phases or crystallisation. For every material and at each temperature two bottles are stored. If crystallisation or the appearance of a smectic phase is observed in at least one of the two correspondent bottles the test is terminated and the time of the last inspection before the one at which the occurrence of a higher ordered phase is observed is recorded as the respective storage stability. The test is finally terminated after 1000 h, i.e., an LTS value of 1000 h means that the mixture is stable at the given temperature for at least 1000 h.

The liquid crystals employed preferably have a positive dielectric anisotropy. This is preferably 2 or more, preferably 4 or more, particularly preferably 6 or more and very particularly preferably 10 or more.

Furthermore, the liquid-crystal media according to the invention are characterised by high anisotropy values in the microwave range. The birefringence at about 19 GHz is, for example, preferably 0.14 or more, particularly preferably 0.15 or more, particularly preferably 0.20 or more, particularly preferably 0.25 or more and very particularly preferably 0.30 or more. In addition, the birefringence is preferably 0.80 or less.

The dielectric anisotropy in the microwave range is defined as $$\Delta\varepsilon_r \equiv (\varepsilon_{r,\parallel} - \varepsilon_{r,\perp}).$$

The tunability ($\tau$) is defined as $$\tau \equiv (\Delta\varepsilon_r/\varepsilon_{r,\parallel}).$$

The material quality ($\eta$) is defined as $$\eta \equiv (\tau/\tan\delta_{\varepsilon,r,max.}),$$

where
the maximum dielectric loss is $$\tan\delta_{\varepsilon r,max.} \equiv \max.\{\tan\delta_{\varepsilon r,\perp}; \tan\delta_{\varepsilon r,\parallel}\}.$$

The tunability $\tau$ of the medium according to the invention, measured at 20° C. and 19 GHz is 0.250 or more, preferably 0.300 or more, 0.310 or more, 0.320 or more, 0.330 or more, or 0.340 or more, very preferably 0.345 or more and in particular 0.350 or more.

The material quality ($\eta$) of the preferred liquid-crystal materials is 6 or more, preferably 8 or more, preferably 10 or more, preferably 15 or more, preferably 17 or more, preferably 20 or more, particularly preferably 25 or more and very particularly preferably 30 or more.

In the corresponding components, the preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

In some embodiments, however, liquid crystals having a negative value of the dielectric anisotropy can also advantageously be used.

The liquid crystals employed are either individual substances or mixtures. They preferably have a nematic phase.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

Preferably the media according to the present invention comprise one or more chiral compounds as chiral dopants in order to adjust their cholesteric pitch. Their total concentration in the media according to the instant invention is preferably in the range 0.05% to 15%, more preferably from 1% to 10% and most preferably from 2% to 6%.

Optionally the media according to the present invention may comprise further liquid crystal compounds in order to adjust the physical properties. Such compounds are known to the skilled person. Their concentration in the media according to the instant invention is preferably 0% to 30%, more preferably 0.1% to 20% and most preferably 1% to 15%.

The response times are given as rise time ($\tau_{on}$) for the time for the change of the relative tuning, respectively of the relative contrast for the electro-optical response, from 0% to 90% ($t_{90}-t_0$), i.e. including the delay time ($t_{10}-t_0$), as decay time ($\tau_{off}$) for the time for the change of the relative tuning, respectively of the relative contrast for the electro-optical response, from 100% back to 10% ($t_{100}-t_{10}$) and as the total response time ($\tau_{total}=\tau_{on}+\tau_{off}$), respectively.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_lH_{2l+1}$, and $C_nH_{2n-1}$, $C_mH_{2m-1}$ and $C_lH_{2l-1}$ denote straight-chain alkyl or alkylene, respectively, in each case having n, m or l C atoms, wherein n and m, independently are 1, 2, 3, 4, 5, 6 or 7 and l is 1, 2 or 3. Table A lists the codes used for the ring elements of the core structures of the compounds, while Table B shows the linking groups and end groups. Table C shows illustrative structures of compounds with their respective abbreviations.

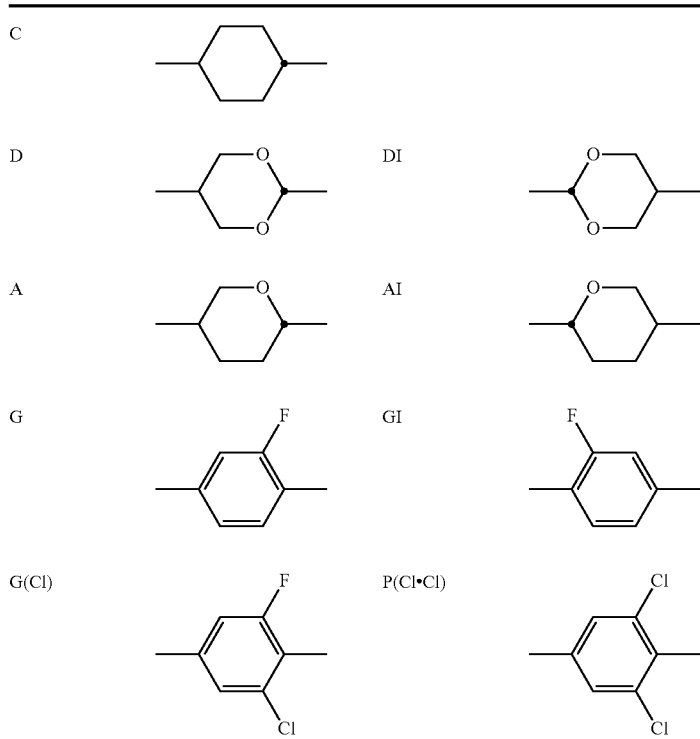

-continued
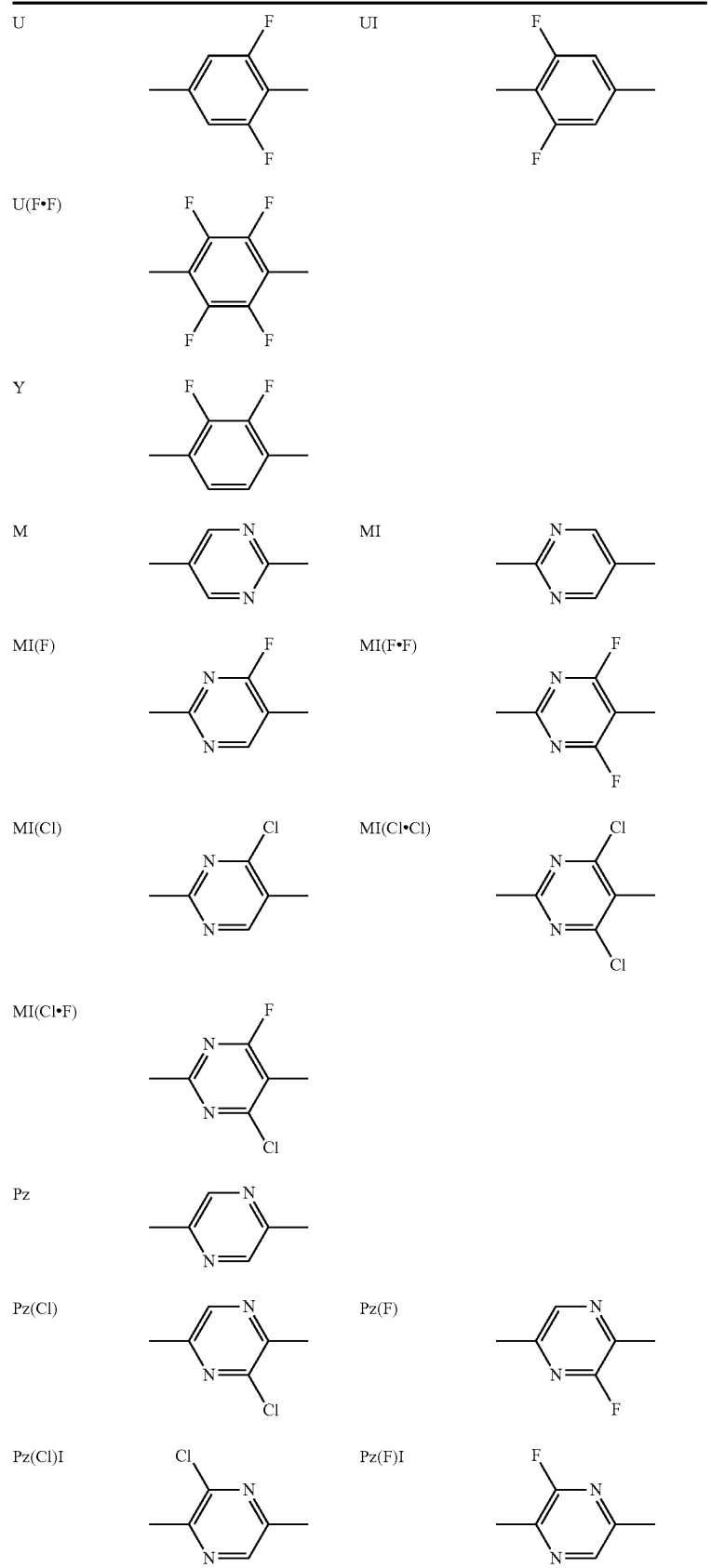

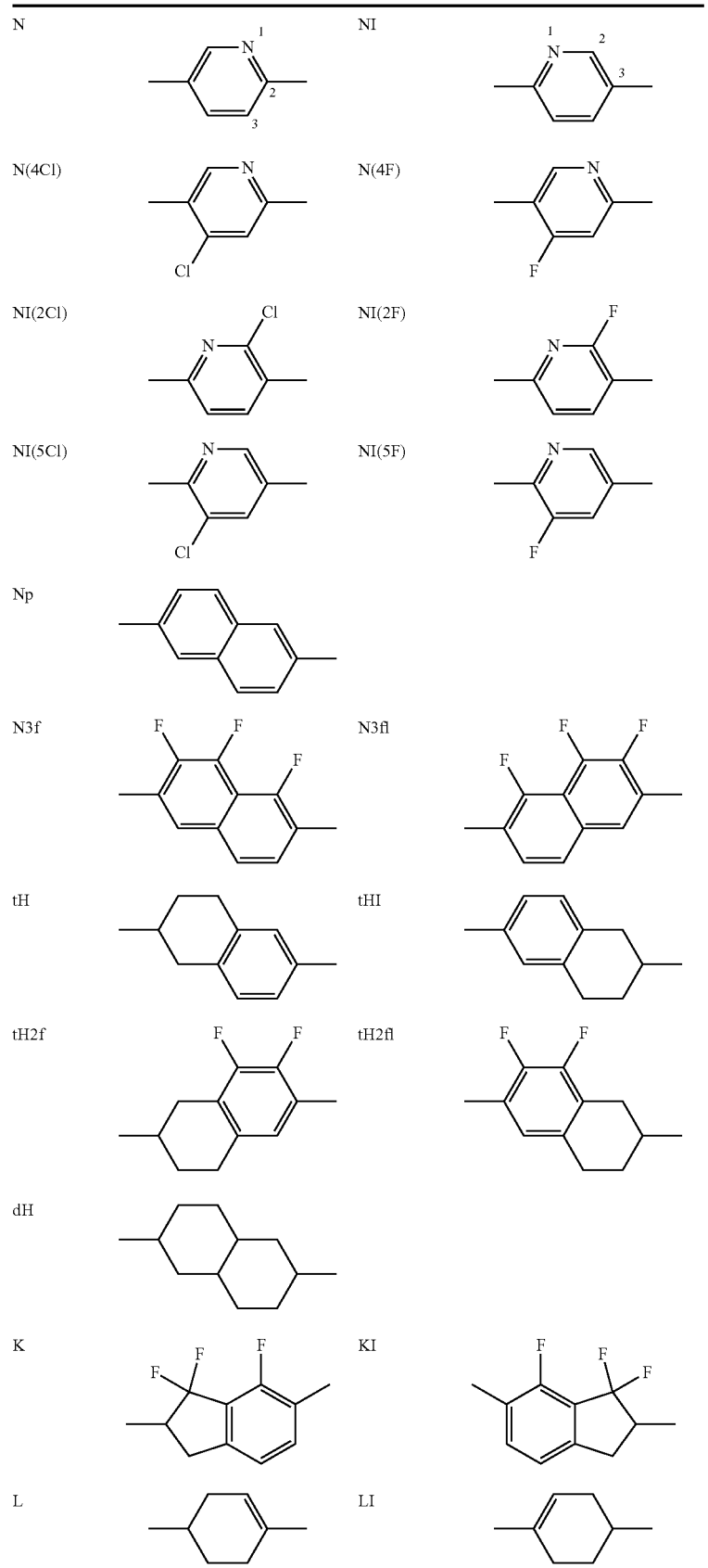

-continued
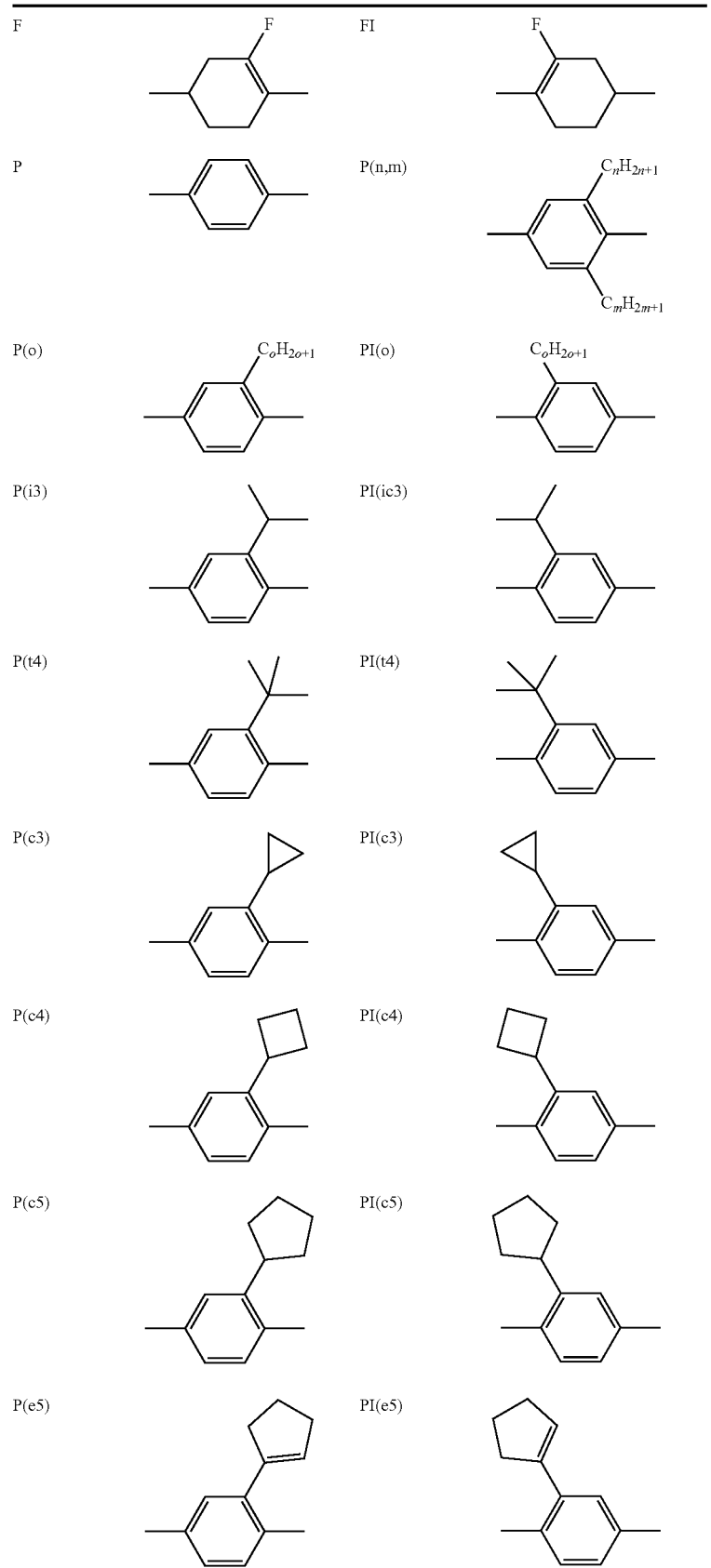

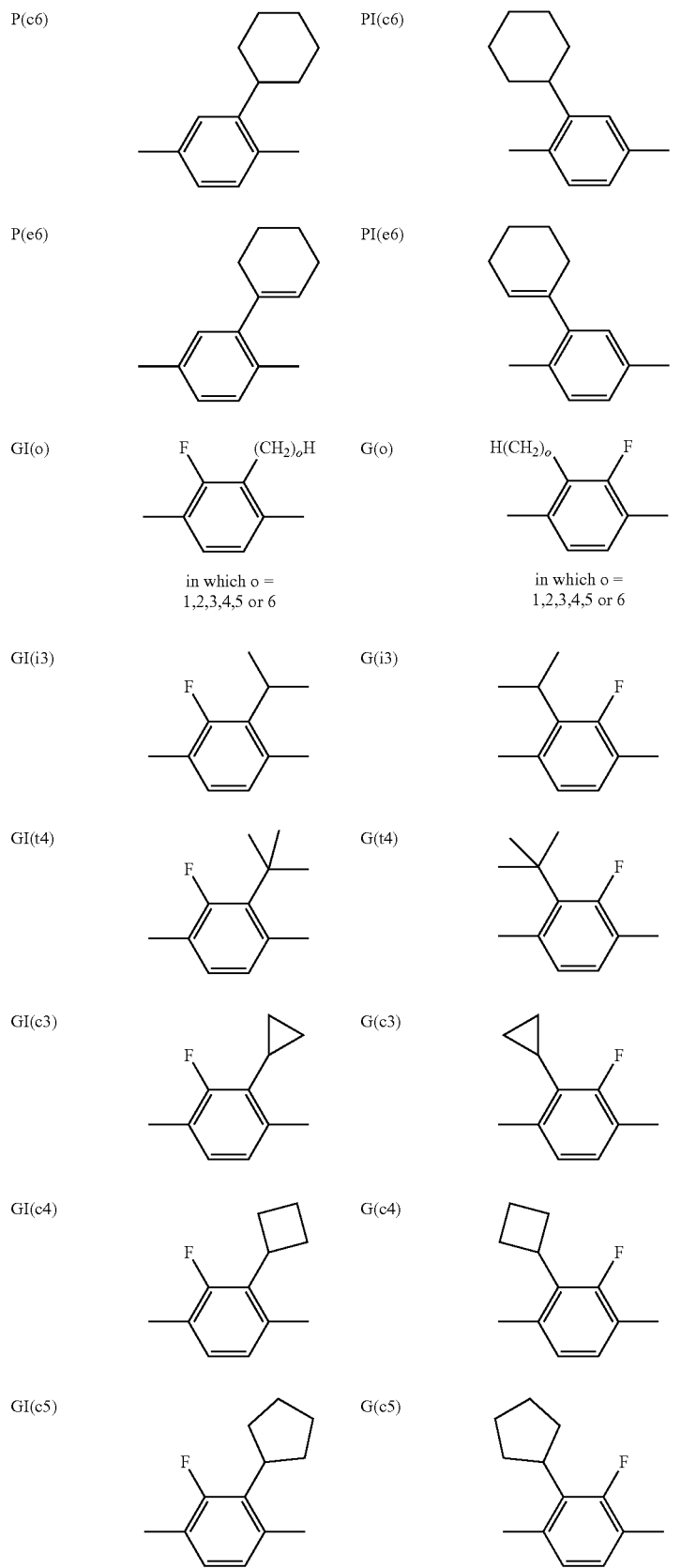

-continued

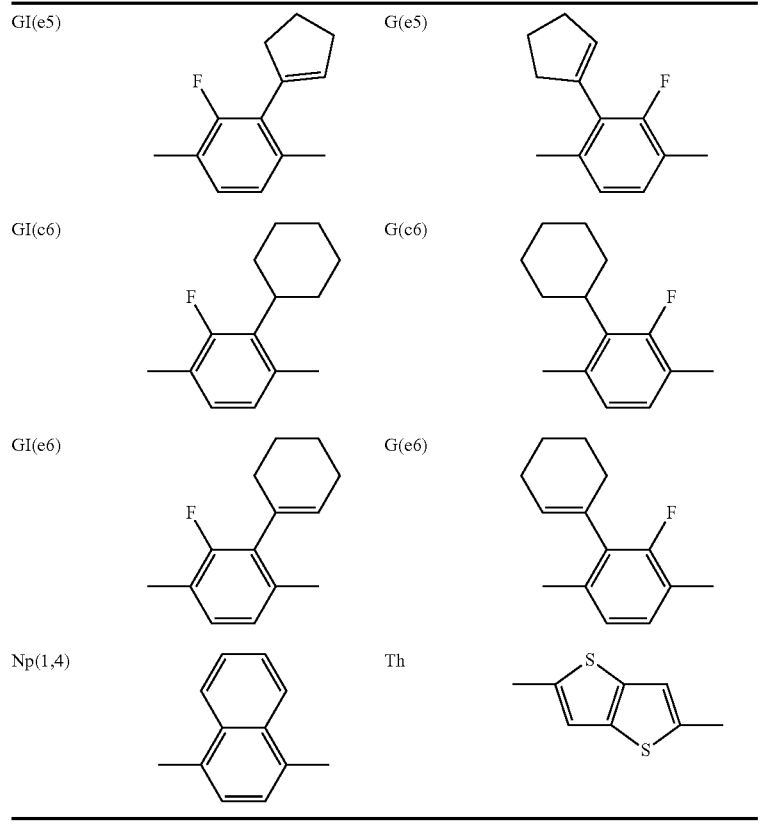

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | | |

End groups

| Left-hand side | | Right-hand side | |
|---|---|---|---|
| | | Used alone | |
| -n- | C$_n$H$_{2n+1}$— | -n | —C$_n$H$_{2n+1}$ |
| -nO— | C$_n$H$_{2n+1}$—O— | —On | —O—C$_n$H$_{2n+1}$ |
| —V— | CH$_2$=CH— | —V | —CH=CH$_2$ |
| -nV— | C$_n$H$_{2n+1}$—CH=CH— | -nV | —C$_n$H$_{2n}$—CH=CH$_2$ |
| —Vn- | CH$_2$=CH— C$_n$H$_{2n+1}$— | —Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$-CH=CH—C$_m$H$_{2m+1}$ |
| —N— | N≡C— | —N | —C≡N |
| —S— | S=C=N— | —S | —N=C=S |
| —F— | F— | —F | —F |
| —CL- | Cl— | —CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| —MO— | CFH$_2$O— | —OM | —OCFH$_2$ |
| -DO— | CF$_2$HO— | —OD | —OCF$_2$H |
| -TO— | CF$_3$O— | —OT | —OCF$_3$ |
| —FXO— | CF$_2$=CH—O— | —OXF | —O—CH=CF$_2$ |
| -A- | H=C=C— | -A | —C≡C—H |
| -nA- | C$_n$H$_{2n+1}$-C≡C— | -An | —C≡C—C$_n$H$_{2n+1}$ |
| —NA- | N≡C—C≡C— | -AN | —C≡C—C≡N |
| -(cn)- | (CH$_2$)$_{n-2}$⟨△⟩ | -(cn) | ⟨△⟩(CH$_2$)$_{n-2}$ |

TABLE B-continued

| -(cn)m- | (CH₂)ₙ₋₂ / (CH₂)ₘ— | -m(cn) | —(CH₂)ₘ \ (CH₂)ₙ₋₂ |
|---|---|---|---|

Used in combination with others

| - ... A ... - | —C≡C— | - ... A ... - | —C≡C— |
|---|---|---|---|
| - ... V ... - | —CH=CH— | - ... V ... - | —CH=CH— |
| - ... Z ... - | —CO—O— | - ... Z ... - | —CO—O— |
| - ... ZI ... - | —O—CO— | - ... ZI ... - | —O—CO— |
| - ... K ... - | —CO— | - ... K ... - | —CO— |
| - ... W ... - | —CF=CF— | - ... W ... - | —CF=CF— | in which n and m each denote integers, and the three dots " ... " are placeholders for other abbreviations from this table.

Branched lateral groups are numbered starting from the position next to the ring (1) where the longest chain is selected, the smaller number indicating the length of the branch and the superscript number in brackets indicates the position of the branch, for example:

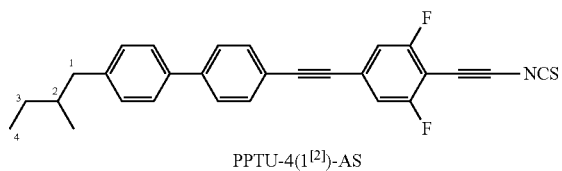

PPTU-4(1[2])-AS

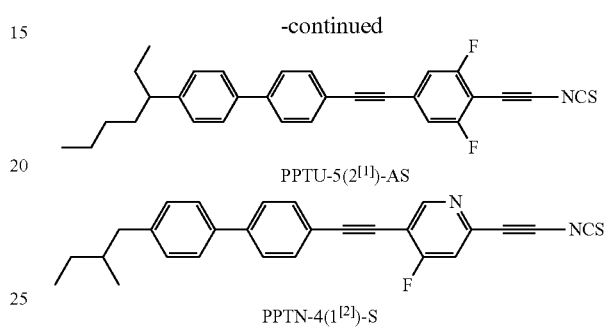

PPTU-5(2[1])-AS

PPTN-4(1[2])-S

The following table shows illustrative structures together with their respective abbreviations. These are shown in order to illustrate the meaning of the rules for the abbreviations. They furthermore represent compounds which are preferably used.

TABLE C

Illustrative structures and preferred co-components

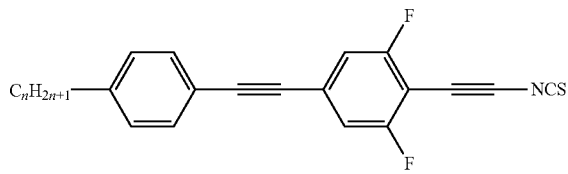

PTU-n-AS

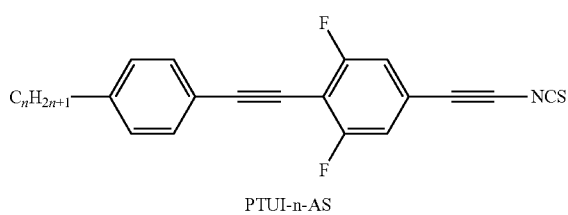

PTUI-n-AS

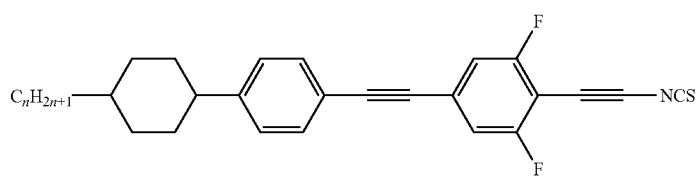

CPTU-n-AS

TABLE C-continued
Illustrative structures and preferred co-components
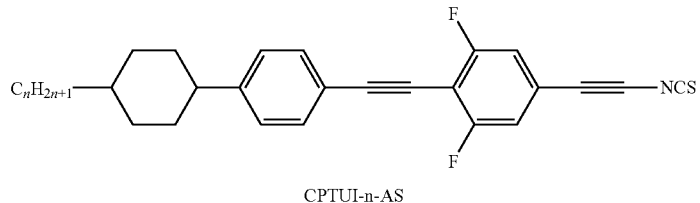
CPTUI-n-AS
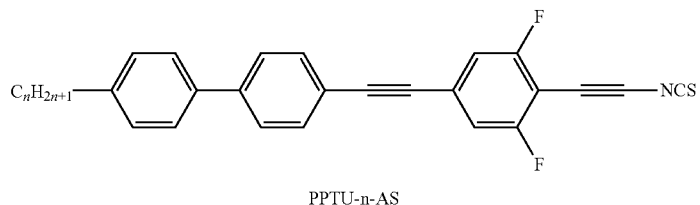
PPTU-n-AS
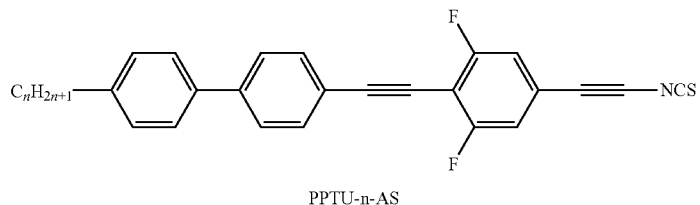
PPTU-n-AS
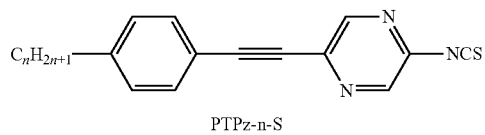
PTPz-n-S
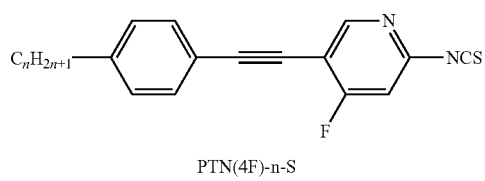
PTN(4F)-n-S
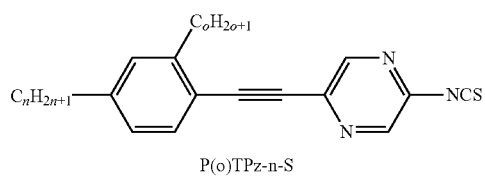
P(o)TPz-n-S
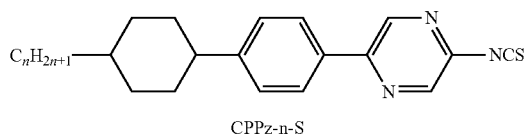
CPPz-n-S
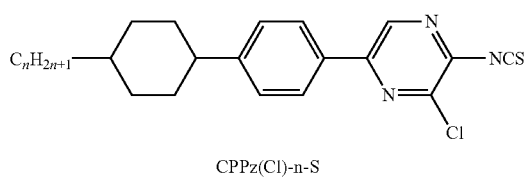
CPPz(Cl)-n-S TABLE C-continued
Illustrative structures and preferred co-components
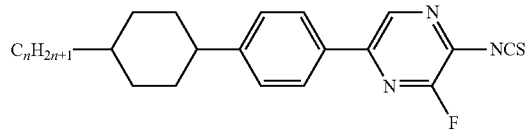
CPPz(F)-n-S
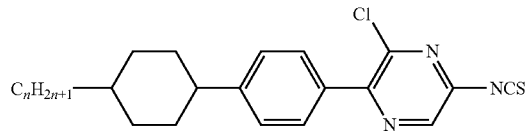
CPPz(Cl)I-n-S
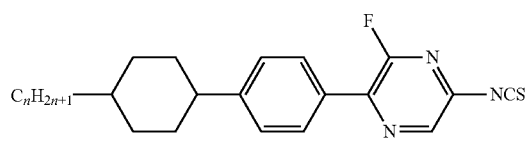
CPPz(F)I-n-S
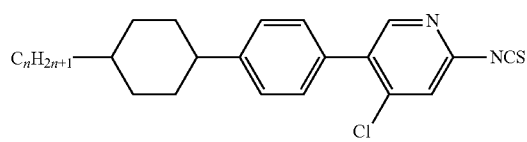
CPN(4Cl)-n-S
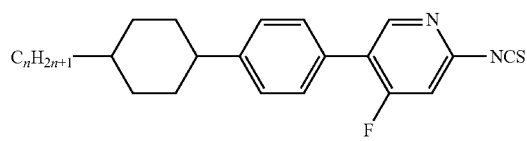
CPN(4F)-n-S
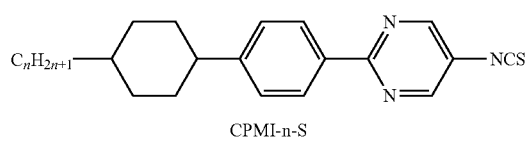
CPMI-n-S
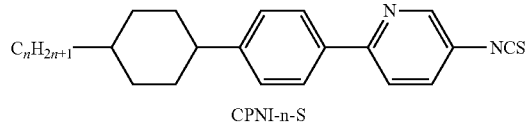
CPNI-n-S
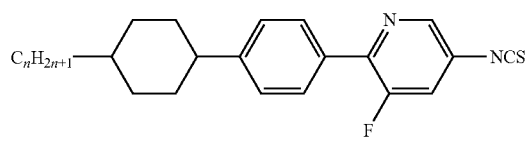
CPNI(5F)-n-S
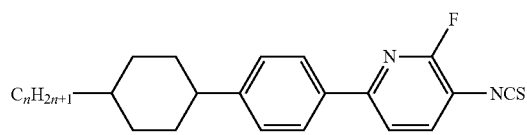
CPNI(2F)-n-S TABLE C-continued
Illustrative structures and preferred co-components
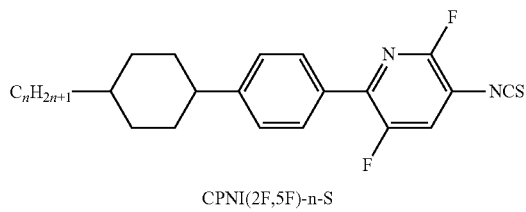
CPNI(2F,5F)-n-S
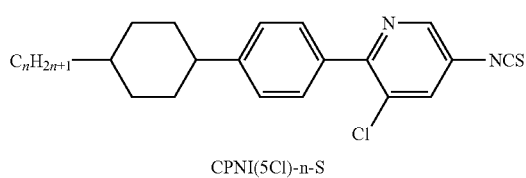
CPNI(5Cl)-n-S
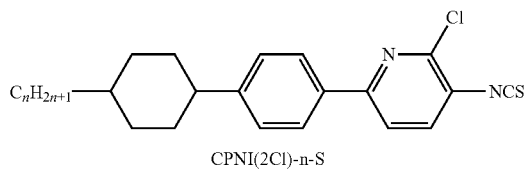
CPNI(2Cl)-n-S
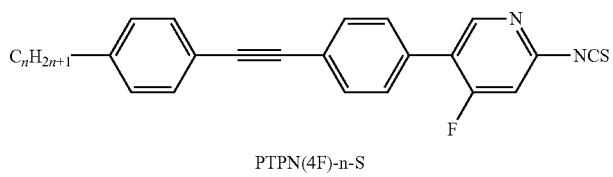
PTPN(4F)-n-S
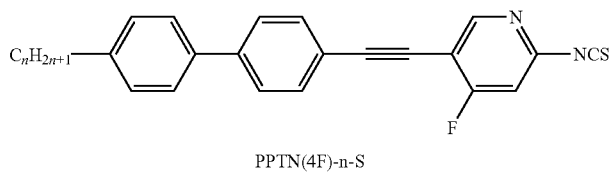
PPTN(4F)-n-S
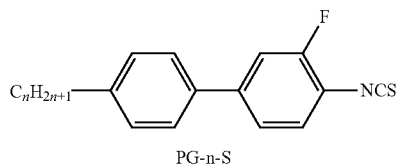
PG-n-S
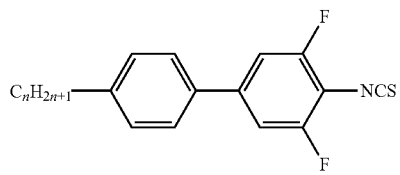
PU-n-S
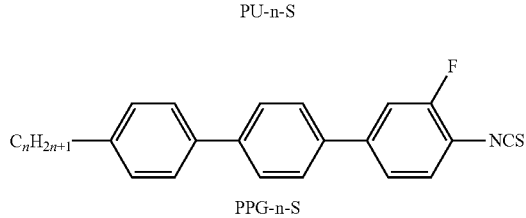
PPG-n-S TABLE C-continued
Illustrative structures and preferred co-components
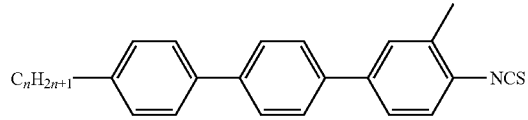
PPP(1)-n-S
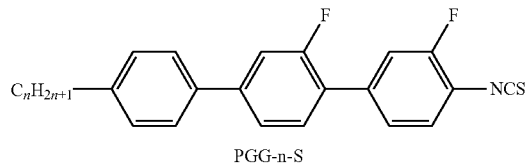
PGG-n-S
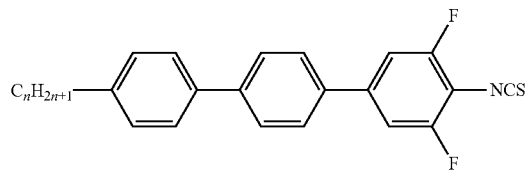
PPU-n-S
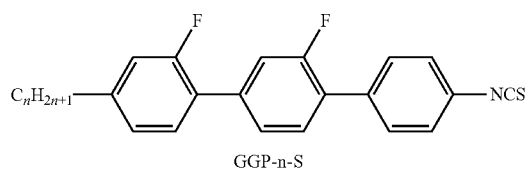
GGP-n-S
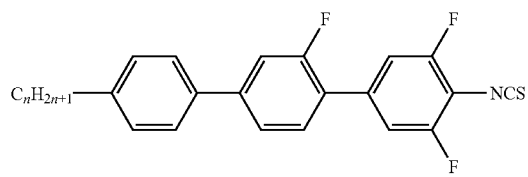
PGU-n-S
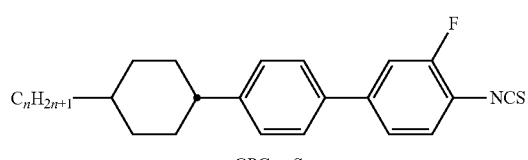
CPG-n-S
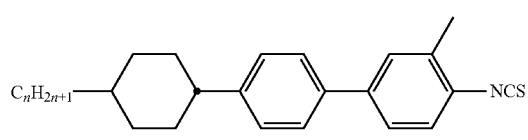
CPP(1)-n-S
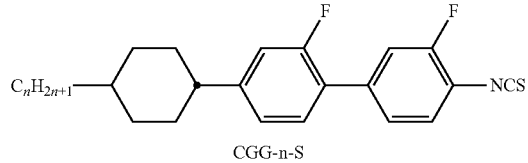
CGG-n-S TABLE C-continued
Illustrative structures and preferred co-components
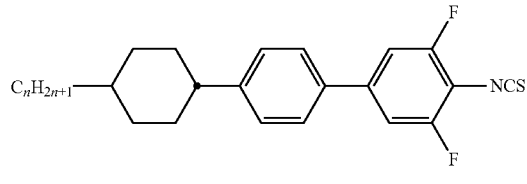
CPU-n-S
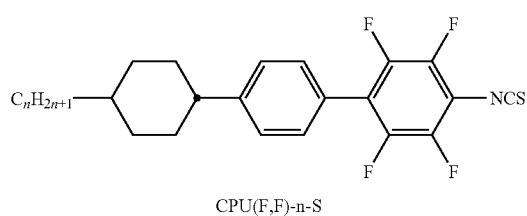
CPU(F,F)-n-S
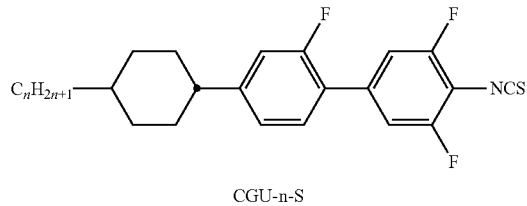
CGU-n-S
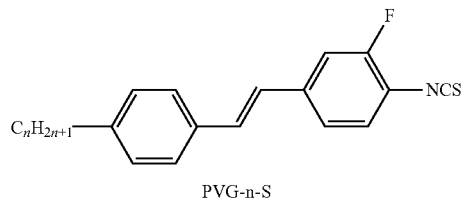
PVG-n-S
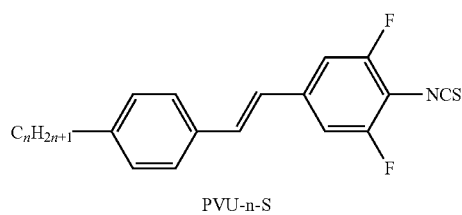
PVU-n-S
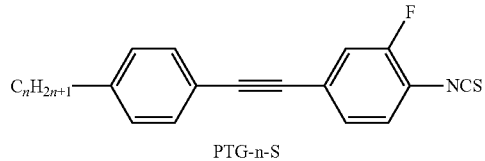
PTG-n-S
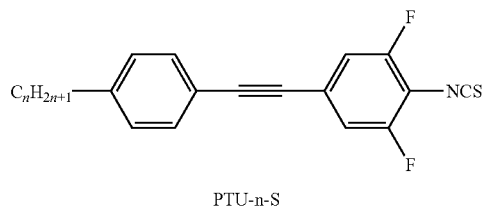
PTU-n-S TABLE C-continued
Illustrative structures and preferred co-components
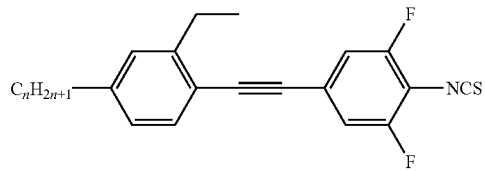
P(2)TU-n-S
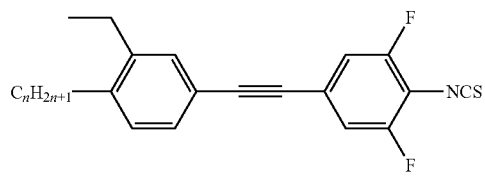
PI(2)TU-n-S
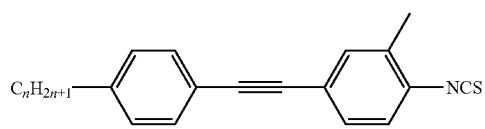
PTP(1)-n-S
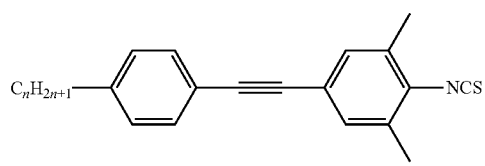
PTP(1,1)-n-S
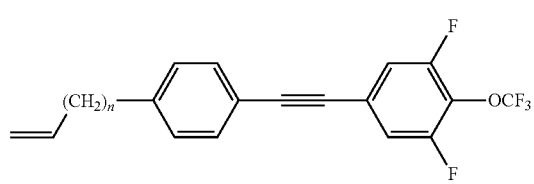
PTU-Vn-OT
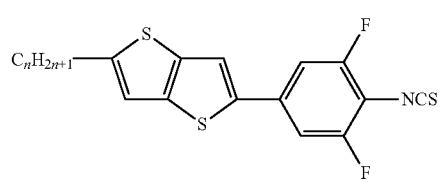
ThU-n-S
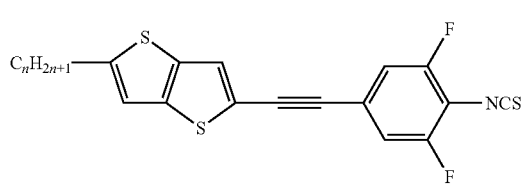
ThTU-n-S TABLE C-continued
Illustrative structures and preferred co-components
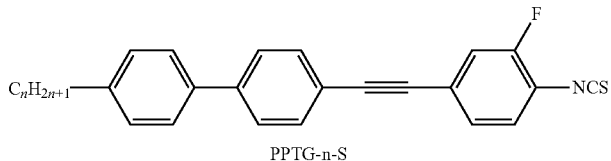
PPTG-n-S
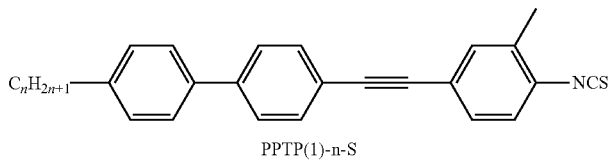
PPTP(1)-n-S
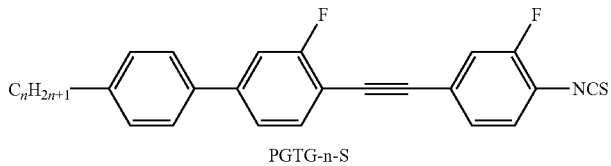
PGTG-n-S
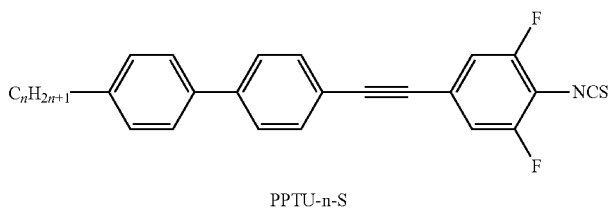
PPTU-n-S
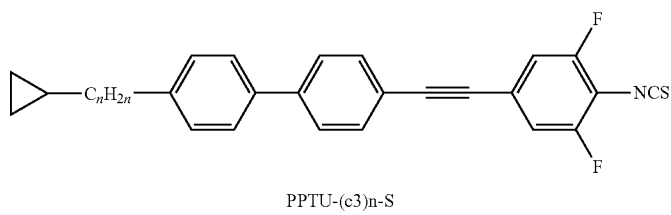
PPTU-(c3)n-S
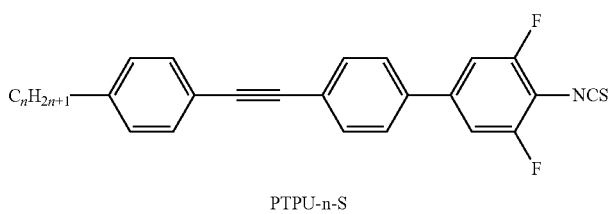
PTPU-n-S
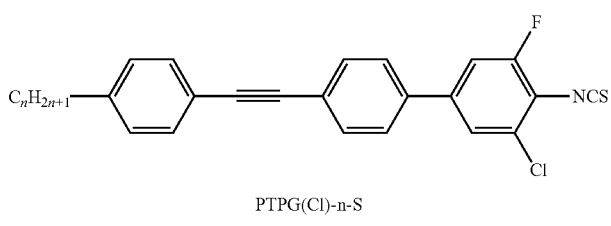
PTPG(Cl)-n-S TABLE C-continued
Illustrative structures and preferred co-components
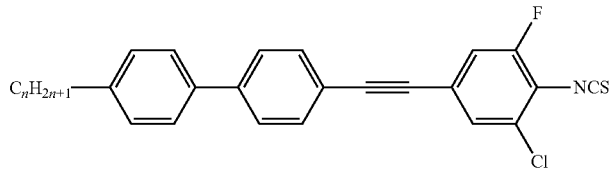
PPTG(Cl)-n-S
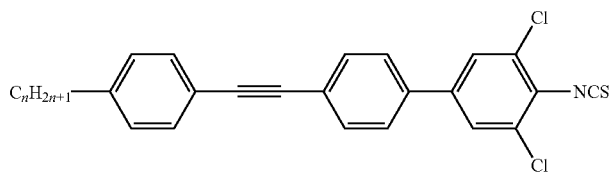
PTPP(Cl,Cl)-n-S
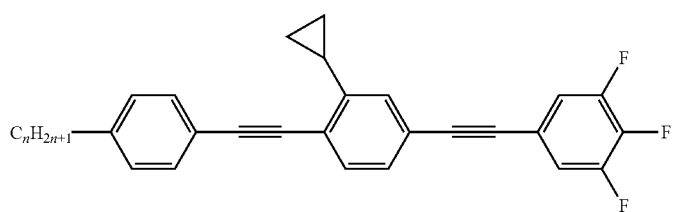
PTPI(c3)TU-n-F
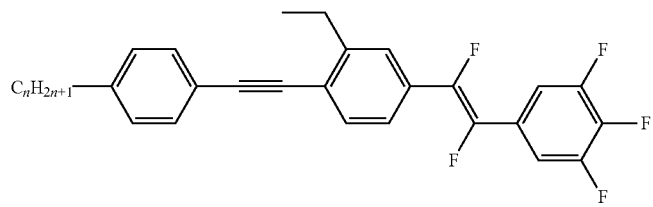
PTPI(2)WU-n-F
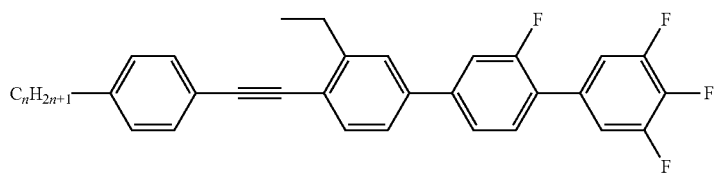
PTPI(2)GU-n-F
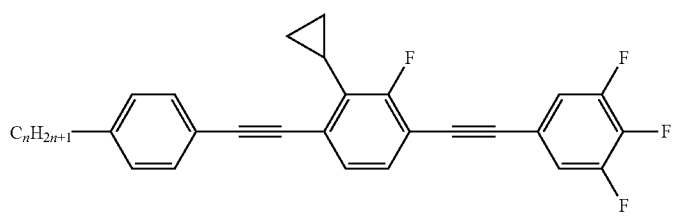
PTG(c3)TU-n-F TABLE C-continued
Illustrative structures and preferred co-components
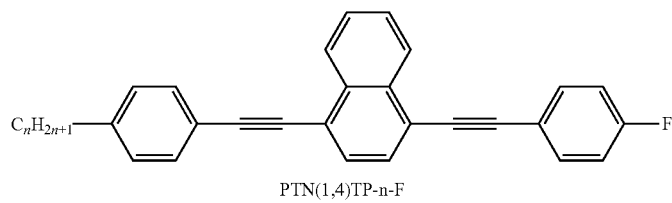
PTN(1,4)TP-n-F
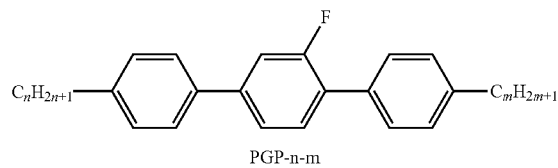
PGP-n-m
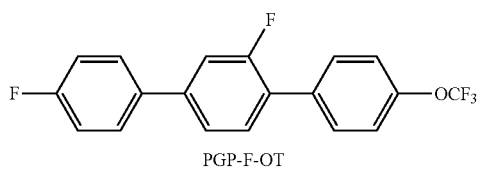
PGP-F-OT
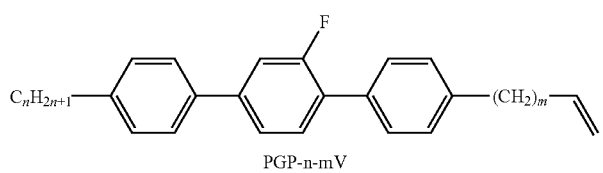
PGP-n-mV
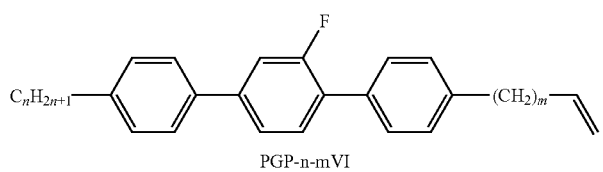
PGP-n-mVI
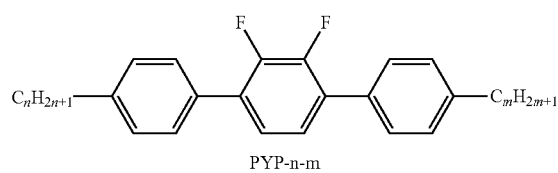
PYP-n-m
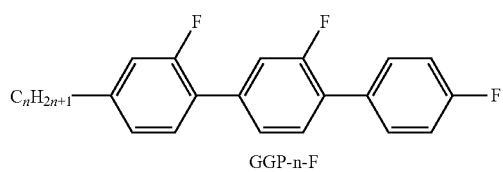
GGP-n-F
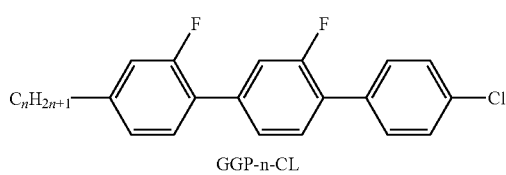
GGP-n-CL TABLE C-continued
Illustrative structures and preferred co-components
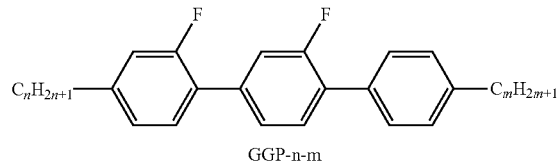
GGP-n-m
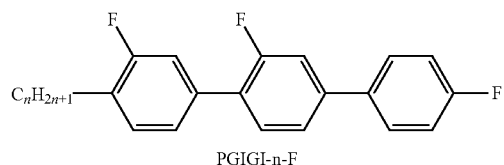
PGIGI-n-F
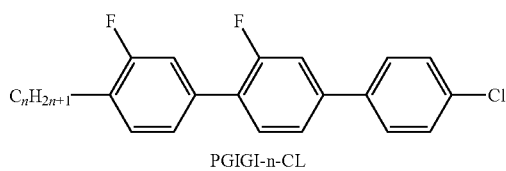
PGIGI-n-CL
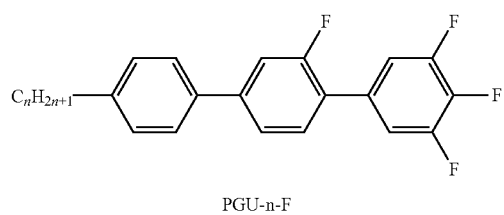
PGU-n-F
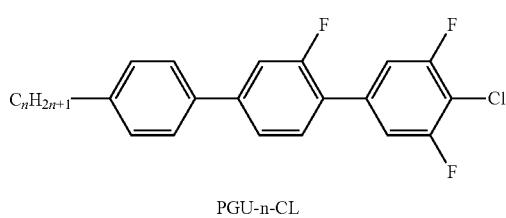
PGU-n-CL
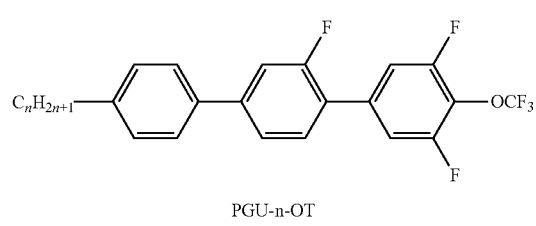
PGU-n-OT
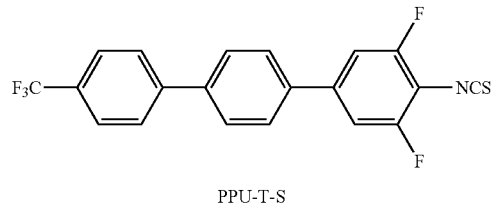
PPU-T-S TABLE C-continued
Illustrative structures and preferred co-components
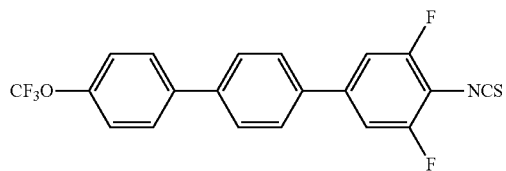
PPU-TO-S
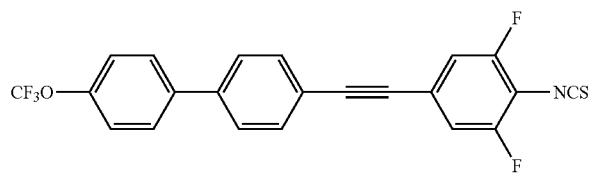
PPTU-TO-S
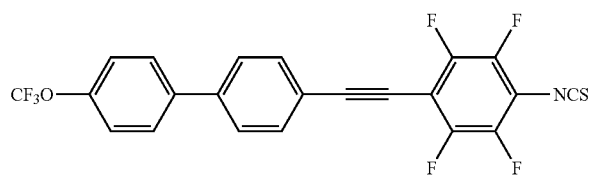
PPTU(F,F)-TO-S
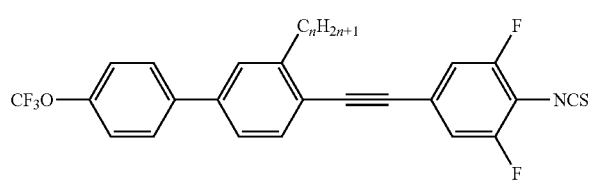
PP(n)TU-TO-S
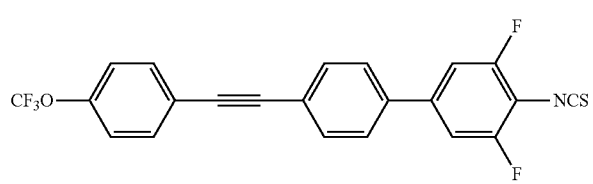
PTPU-TO-S
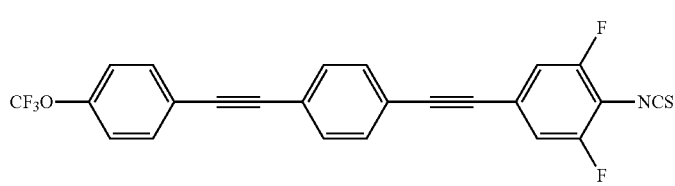
PTPTU-TO-S
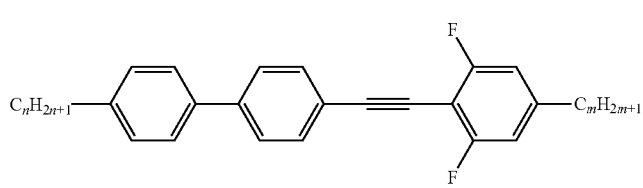
PPTUI-n-m TABLE C-continued
Illustrative structures and preferred co-components
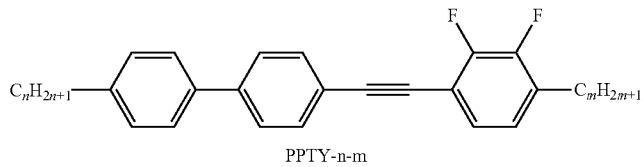
PPTY-n-m
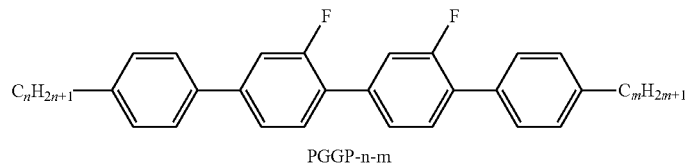
PGGP-n-m
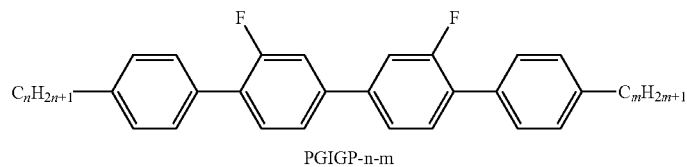
PGIGP-n-m
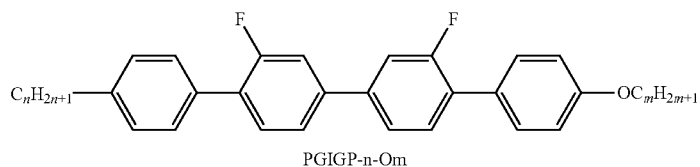
PGIGP-n-Om
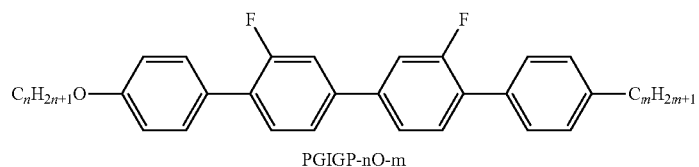
PGIGP-nO-m
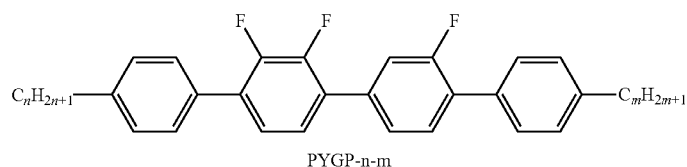
PYGP-n-m
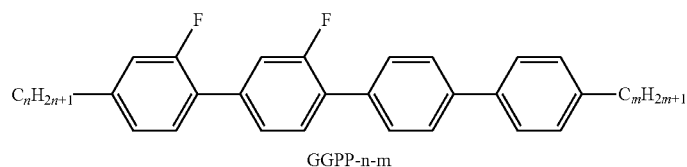
GGPP-n-m
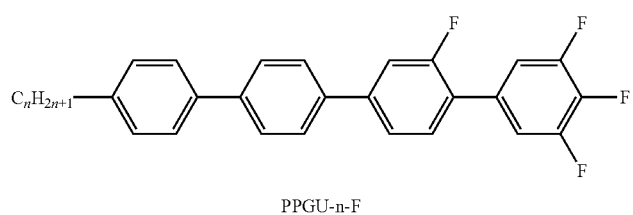
PPGU-n-F TABLE C-continued
Illustrative structures and preferred co-components
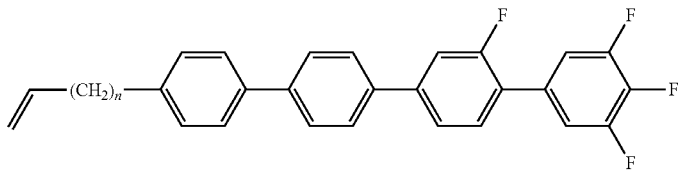
PPGU-Vn-F
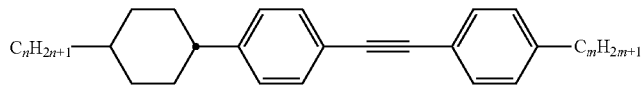
CPTP-n-m
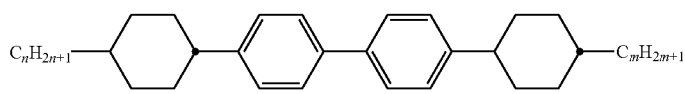
CPPC-n-m
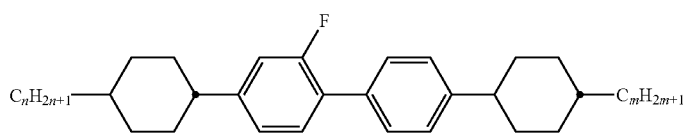
CGPC-n-m
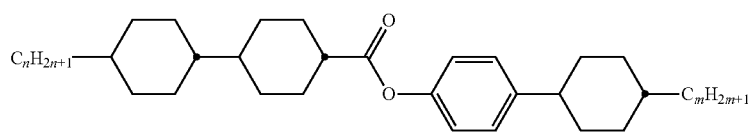
CCZPC-n-m
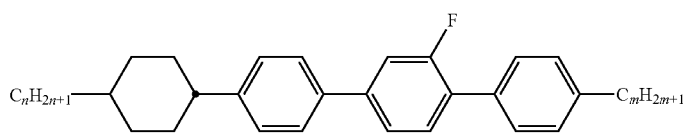
CPGP-n-m
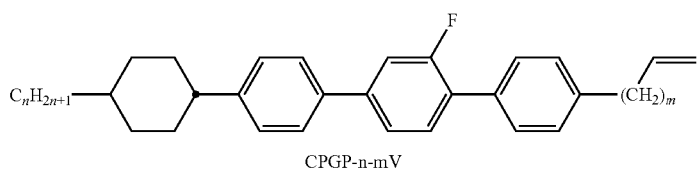
CPGP-n-mV
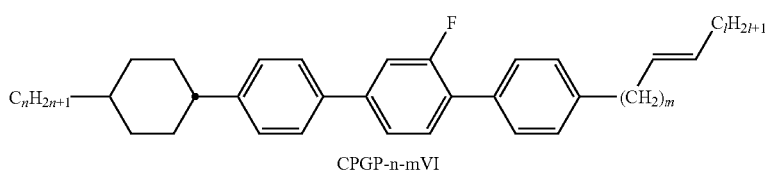
CPGP-n-mVI
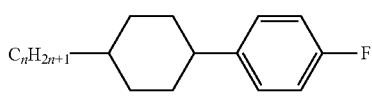
CP-n-F TABLE C-continued
Illustrative structures and preferred co-components
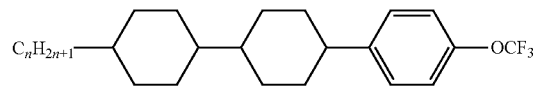
CCP-n-OT
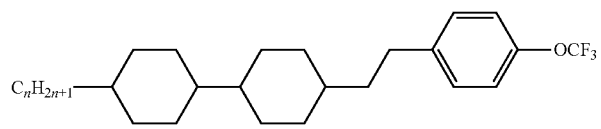
CCEP-n-OT
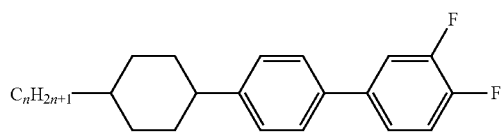
CPG-n-F
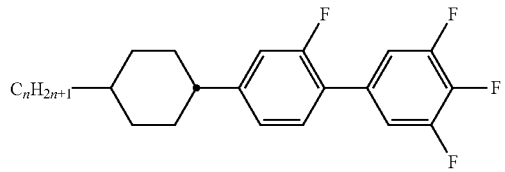
CGU-n-F
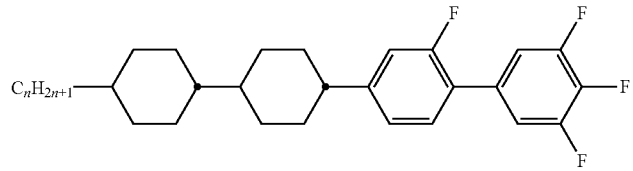
CCPU-n-F
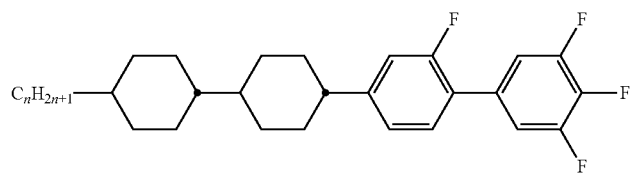
CCGU-n-F
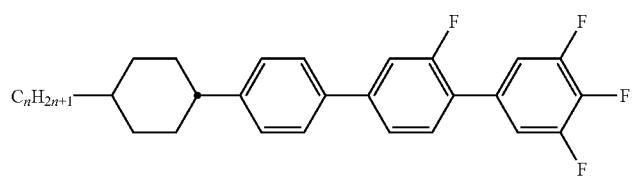
CPGU-n-F
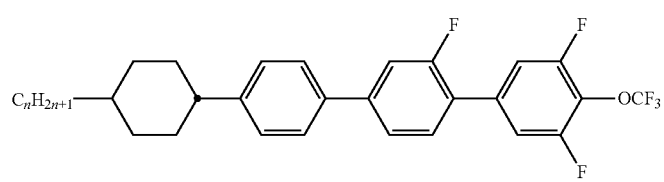
CPGU-n-OT

TABLE C-continued

Illustrative structures and preferred co-components

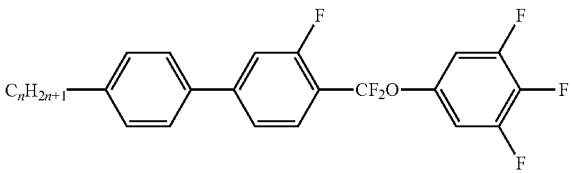

PUQU-n-F

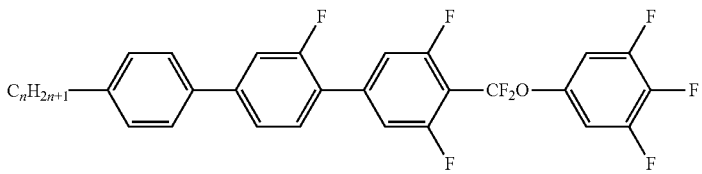

PGUQU-n-F

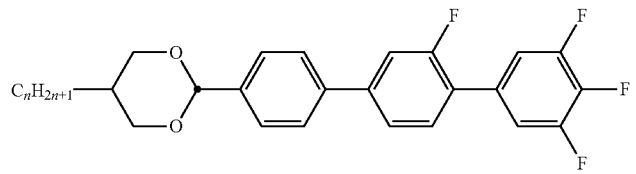

DPGU-n-F

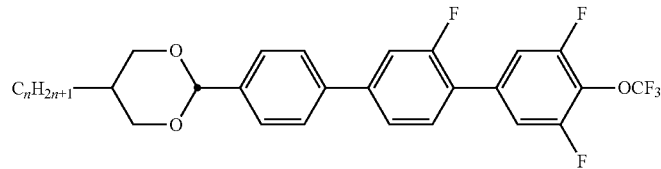

DPGU-n-OT

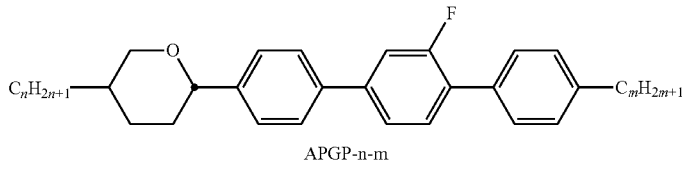

APGP-n-m in which m and n, identically or differently, are 1, 2, 3, 4, 5, 6 or 7.

Preferably, the medium according to the invention comprises one or more compounds selected from the compounds of Table C.

The following table, Table D, shows illustrative compounds which can be used as alternative stabilizers in the mesogenic media in accordance with the present invention. The total concentration of these and similar compounds in the media is preferably 5% or less.

In a preferred embodiment of the present invention, the mesogenic media comprise one or more compounds selected from the group of the compounds from Table D. The following table, Table E, shows illustrative compounds which can preferably be used as chiral dopants in the mesogenic media in accordance with the present invention.

In a preferred embodiment of the present invention, the mesogenic media comprise one or more compounds selected from the group of the compounds of Table E. The mesogenic media in accordance with the present application preferably comprise two or more, preferably four or more, compounds selected from the group consisting of the compounds from the above tables.

Unless indicated otherwise, parts or percent data denote parts by weight or percent by weight.

Above and below:

$V_o$ denotes threshold voltage, capacitive [V] at 20° C., $n_e$ denotes extraordinary refractive index at 20° C. and 589 nm, $n_o$ denotes ordinary refractive index at 20° C. and 589 nm, $\Delta n$ denotes optical anisotropy at 20° C. and 589 nm, $\varepsilon_\perp$ denotes dielectric permittivity perpendicular to the director at 20° C. and 1 kHz, $\varepsilon_\parallel$ denotes dielectric permittivity parallel to the director at 20° C. and 1 kHz, $\Delta\varepsilon$ denotes dielectric anisotropy at 20° C. and 1 kHz, cl.p., T(N,I) denotes clearing point [° C.], $\gamma_1$ denotes rotational viscosity measured at 20° C. [mPa·s], $K_1$ denotes elastic constant, "splay" deformation at 20° C. [pN], $K_2$ denotes elastic constant, "twist" deformation at 20° C. [pN], $K_3$ denotes elastic constant, "bend" deformation at 20° C. [pN], $K_{avg}$ denotes average elastic constant defined as $K_{avg}=\frac{1}{3}(1.5 \cdot K_1 + K_3)$ LTS denotes low-temperature stability (nematic phase), determined in test cells or in the bulk, as specified.

Unless explicitly noted otherwise, all values indicated in the present application for temperatures, such as, for example, the melting point T(C,N), the transition from the smectic (S) to the nematic (N) phase T(S,N) and the clearing point T(N,I) or cl.p., are indicated in degrees Celsius (° C.). M.p. denotes melting point. Furthermore, Tg=glass state, C=crystalline state, N=nematic phase, S=smectic phase and I=isotropic phase. The numbers between these symbols represent the transition temperatures.

The term "threshold voltage" for the present invention relates to the capacitive threshold ($V_0$), also called the Freedericksz threshold, unless explicitly indicated otherwise. In the examples, as is generally usual, the optical threshold can also be indicated for 10% relative contrast ($V_{10}$).

The display used for measurement of the capacitive threshold voltage consists of two plane-parallel glass outer plates at a separation of 20 µm, which each have on the insides an electrode layer and an unrubbed polyimide alignment layer on top, which cause a homeotropic edge alignment of the liquid-crystal molecules.

The so-called "HTP" denotes the helical twisting power of an optically active or chiral substance in an LC medium (in µm). Unless indicated otherwise, the HTP is measured in the commercially available nematic LC host mixture MLD-6260 (Merck KGaA) at a temperature of 20° C.

The Clearing point is measured using the Mettler Thermosystem FP900. The optical anisotropy (Δn) is measured using an Abbe Refractometer H005 (Natrium-spectral lamp Na10 at 589 nm, 20° C.). The dielectric anisotropy (Δε) is measured using an LCR-Meter E4980A/Agilent (G005) at 20° C. (ε-parallel-cells with JALS 2096-R1). The turn on voltage ($V_0$) is measured using an LCR-Meter E4980A/Agilent (G005) at 20° C. (ε-parallel-cells with JALS 2096-R1). The rotational viscosity ($\gamma_1$) is measured using a TOYO LCM-2 (0002) at 20° C. (gamma 1 negative cells with JALS-2096-R 1). The elastic constant ($K_1$, splay) is measured using an LCR-Meter E4980A/Agilent (G005) at 20° C. (ε parallel-cells with JALS 2096-R1). $K_3$: The elastic constant ($K_3$, bend) is measured using an LCR-Meter E4980A/Agilent (G005) at 20° C. (ε-parallel-cells with JALS 2096-R1).

Unless explicitly noted otherwise, all concentrations in the present application are indicated in percent by weight and relate to the corresponding mixture as a whole, comprising all solid or liquid-crystalline components, without solvents. All physical properties are determined in accordance with "Merck Liquid Crystals, Physical Properties of Liquid Crystals", Status November 1997, Merck KGaA, Germany, and apply for a temperature of 20° C., unless explicitly indicated otherwise.

EXAMPLES

The present invention is illustrated in detail by the following non-restrictive working examples.

Abbreviations

BuLi n-Butyllithium
dist. distilled
THF Tetrahydrofuran
MTB ether Methyl-tert-butyl ether
XPhos Pd G2 Chloro(2-dicyclohexylphosphino-2',4',6'-triisopropyl-1,1'-biphenyl)[2-(2'-amino-1,1'-biphenyl)]palladium (II)

Synthesis Example 1: 5-[2-(4-Butylphenyl)ethynyl]-1,3-difluoro-2-(2-isothiocyanatoethynyl)benzene Step 1.1: 5-[2-(4-Butylphenyl)ethynyl]-2-(2-chloroethynyl)-1,3-difluorobenzene

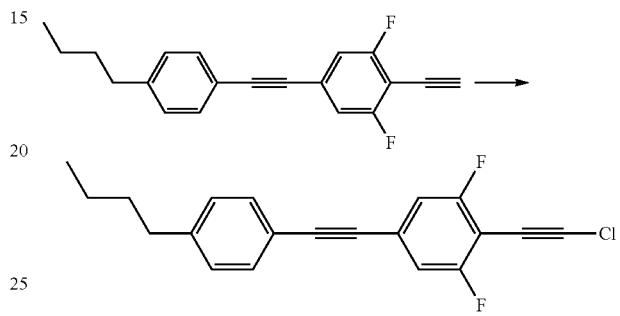

A solution of 5-[2-(4-butylphenyl)ethynyl]-2-ethynyl-1,3-difluorobenzene (CAS 2545094-24-2) (10.0 g, 34 mmol) in THF (100 mL) is treated with BuLi (25.5 mL, 41 mmol, 15% in n-hexanes) at −70° C. under argon atmosphere. N-chlorosuccinimide (5.0 g, 37 mmol) is added after 30 min, and the reaction mixture is stirred at room temperature overnight. It is then quenched with dist. water and MTB ether at 5° C. The aqueous phase is separated and washed MTB ether, and the combined organic phases are washed with brine, dried (sodium sulfate) and concentrated in vacuo. The residue is purified by flash chromatography (solvent heptane) and crystallized from isopropanol. 5-[2-(4-Butylphenyl)ethynyl]-2-(2-chloroethynyl)-1,3-difluorobenzene is isolated as yellow crystals.

Step 1.2: {4-[2-(4-butylphenyl)ethynyl]-2,6-difluorophenyl}ethynamine

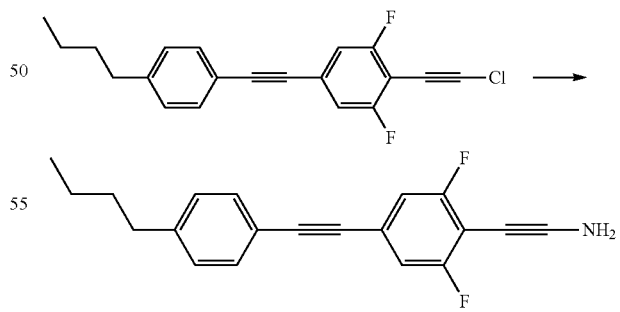

Sodium amide (1.2 g, 31 mmol) is added to a solution of 5-[2-(4-butylphenyl)ethynyl]-2-(2-chloroethynyl)-1,3-difluorobenzene (9.2 g, 28 mmol) in THF (90 mL) at 0° C., and the reaction mixture is stirred at room temperature overnight. It is then quenched with dist. water and MTB ether at 0° C. The aqueous phase is separated and washed MTB ether, and the combined organic phases are washed with brine, dried (sodium sulfate) and concentrated in vacuo. The residue is purified by flash chromatography (solvent heptane) and crystallized from isopropanol to give beige crystals of {4-[2-(4-butylphenyl)ethynyl]-2,6-difluorophenyl}ethynamine.

Step 1.3: 5-[2-(4-Butylphenyl)ethynyl]-1,3-difluoro-2-(2-isothiocyanatoethynyl)benzene

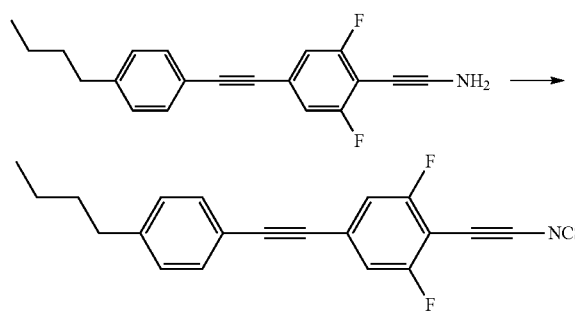

Thiophosgene (2.0 mL, 26 mmol) is slowly added to a solution of {4-[2-(4-butylphenyl)ethynyl]-2,6-difluorophenyl}ethynamine (6.5 g, 21 mmol) and 1,4-diazabicyclo[2.2.2]octane (5.9 g, 53 mmol) in dichloromethane (90 mL) at 0° C. under argon atmosphere, and the mixture is stirred at room temperature for 1 h. Then the reaction mixture is quenched with dist. water. The aqueous phase is separated and extracted with dichloromethane. The combined organic phases are washed with brine, dried (sodium sulfate) and concentrated in vacuo. The residue is purified by silica gel chromatography (solvent heptane/MTB ether) and crystallization from heptane to give white crystals of 5-[2-(4-butylphenyl)ethynyl]-1,3-difluoro-2-(2-isothiocyanatoethynyl)benzene.
Δε=11.2
Δn=0.441

Synthesis Example 2: 4-[3,5-Difluoro-4-(2-isothiocyanatoethynyl)phenyl]-4'-(trifluoromethoxy)-1,1'-biphenyl Step 2.1: 4-(4-Ethynyl-3,5-difluorophenyl)-4'-(trifluoromethoxy)-1,1'-biphenyl

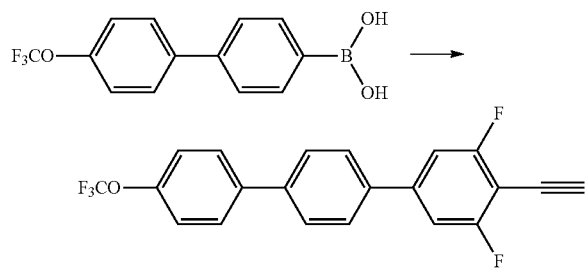

Bis(dibenzylidene-acetone)palladium(0) (20 mg, 0.04 mmol) and tris-(o-tolyl)phosphine (11 mg, 0.04 mmol) are added to a mixture of [4-(4-(trifluoromethoxy)phenyl]phenyl]boronic acid (CAS 501944-50-9) (10.0 g, 36 mmol) and 5-bromo-2-ethynyl-1,3-difluorobenzene (CAS 1823343-58-3) (7.7 g, 36 mmol) in acetone (70 mL) under argon atmosphere at 50° C. Aqueous sodium hydroxide (2 N) (35.5 mL, 71 mmol) is slowly added at reflux temperature, and the reaction mixture is heated at reflux temperature overnight. Then it is quenched with water and hydrochloric acid (2 N) and diluted with MTB ether. The aqueous phase is separated and extracted with MTB ether. The combined organic phases are washed with brine, dried (sodium sulfate) and concentrated in vacuo. The residue is purified by silica gel chromatography (solvent heptane/MTB ether) to give 4-(4-ethynyl-3,5-difluorophenyl)-4'-(trifluoromethoxy)-1,1'-biphenyl as a white solid.

Step 2.2: 4-[4-(2-Chloroethynyl)-3,5-difluorophenyl]-4'-(trifluoromethoxy)-1,1'-biphenyl

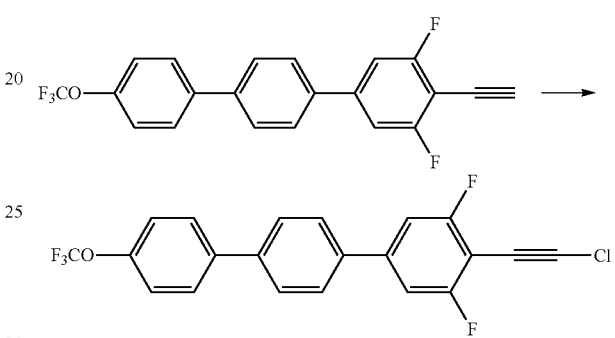

A solution of 4-(4-ethynyl-3,5-difluorophenyl)-4'-(trifluoromethoxy)-1,1'-biphenyl (9.4 g, mmol) in THF (100 mL) is treated with BuLi (18.8 mL, 30 mmol, 15% in n-hexanes) at −70° C. under argon atmosphere. N-chlorosuccinimide (3.7 g, 28 mmol) is added after 30 min, and the reaction mixture is stirred at room temperature overnight. It is then quenched with dist. water and MTB ether at 5° C. The aqueous phase is separated and washed MTB ether, and the combined organic phases are washed with brine, dried (sodium sulfate) and concentrated in vacuo. The residue is purified by flash chromatography (solvent heptane) and crystallized from isopropanol. 4-[4-(2-Chloroethynyl)-3,5-difluorophenyl]-4'-(trifluoromethoxy)-1,1'-biphenyl is isolated as yellow crystals.

Step 2.3: {2,6-Difluoro-4-[4'-(trifluoromethoxy)-[1,1'-biphenyl]-4-yl]phenyl}ethynamine

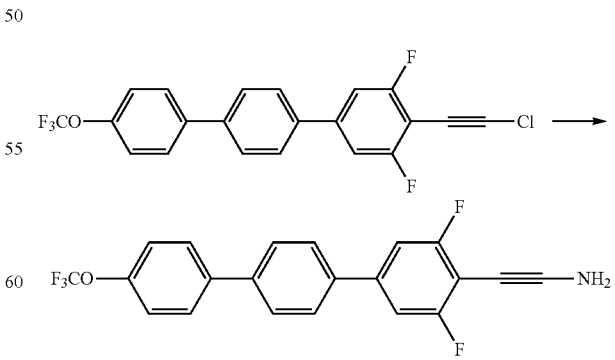

Sodium amide (0.89 g, 23 mmol) is added to a solution of 4-[4-(2-chloroethynyl)-3,5-difluorophenyl]-4'-(trifluoromethoxy)-1,1'-biphenyl (8.5 g, 21 mmol) in THF (90 mL)

at 0° C. under argon atmosphere, and the reaction mixture is stirred at room temperature overnight. It is then quenched with dist. water and MTB ether at 0° C. The aqueous phase is separated and washed MTB ether, and the combined organic phases are washed with brine, dried (sodium sulfate) and concentrated in vacuo. The residue is purified by flash chromatography (solvent heptane) and crystallized from isopropanol to give beige crystals of {2,6-difluoro-4-[4'-(trifluoromethoxy)-[1,1'-biphenyl]-4-yl]phenyl}ethynamine.

Step 2.4: 4-[3,5-Difluoro-4-(2-isothiocyanatoethynyl)phenyl]-4'-(trifluoromethoxy)-1,1'-biphenyl

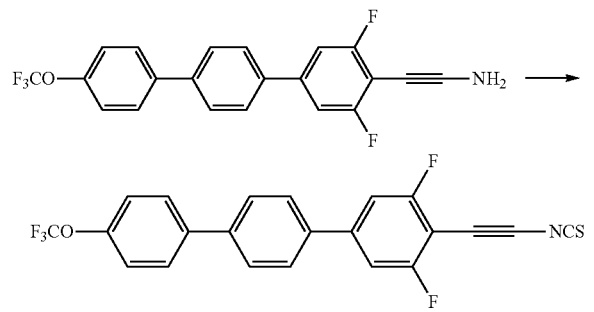

Thiophosgene (1.5 mL, 20 mmol) is slowly added to a solution of {2,6-difluoro-4-[4'-(trifluoromethoxy)-[1,1'-biphenyl]-4-yl]phenyl}ethynamine (6.3 g, 16 mmol) and 1,4-diazabicyclo[2.2.2]octane (4.5 g, 41 mmol) in dichloromethane (70 mL) at 0° C. under argon atmosphere, and the mixture is stirred at room temperature for 1 h. Then the reaction mixture is quenched with dist. water. The aqueous phase is separated and extracted with dichloromethane. The combined organic phases are washed with brine, dried (sodium sulfate) and concentrated in vacuo. The residue is purified by silica gel chromatography (solvent heptane/MTB ether) and crystallization from heptane to give white crystals of 4-[3,5-difluoro-4-(2-isothiocyanatoethynyl)phenyl]-4'-(trifluoromethoxy)-1,1'-biphenyl.
Δε=3.3
Δn=0.428

Synthesis Example 3: 3,5-Difluoro-4-(2-isothiocyanatoethynyl)-4'-(4-pentylcyclohexyl)-1,1'-biphenyl Step 3.1: 4-(2-Chloroethynyl)-3,5-difluoro-4'-(4-pentylcyclohexyl)-1,1'-biphenyl

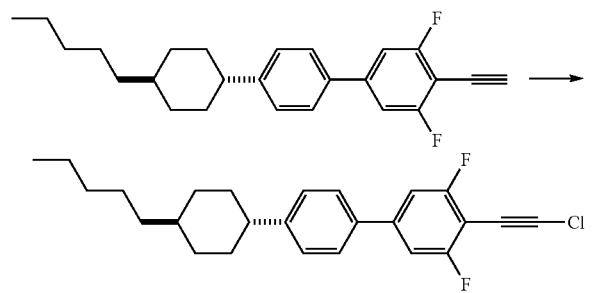

A solution of 4-ethynyl-3,5-difluoro-4'-(4-pentylcyclohexyl)-1,1'-biphenyl (CAS 2172891-00-6) (10.0 g, 27 mmol) in THF (100 mL) is treated with BuLi (20.5 mL, 33 mmol, 15% in n-hexanes) at −70° C. under argon atmosphere. N-chlorosuccinimide (4.0 g, 30 mmol) is added after 30 min, and the reaction mixture is stirred at room temperature overnight. It is then quenched with dist. water and MTB ether at 5° C. The aqueous phase is separated and washed MTB ether, and the combined organic phases are washed with brine, dried (sodium sulfate) and concentrated in vacuo. The residue is purified by flash chromatography (solvent heptane) and crystallized from isopropanol. 4-(2-Chloroethynyl)-3,5-difluoro-4'-(4-pentylcyclohexyl)-1,1'-biphenyl is isolated as yellow crystals.

Step 3.2: [3,5-Difluoro-4'-(4-pentylcyclohexyl)-[1,1'-biphenyl]-4-yl]ethynamine

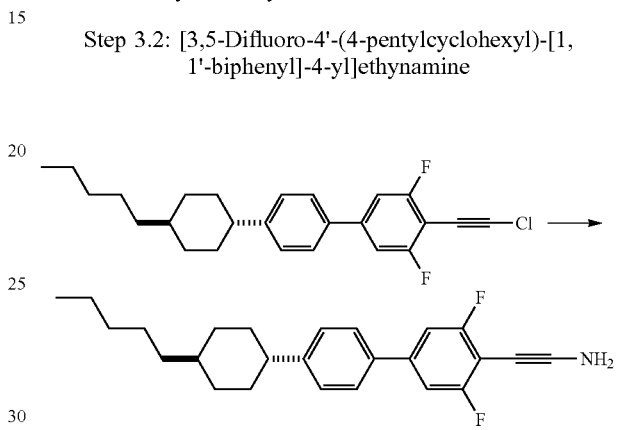

Sodium amide (1.0 g, 25 mmol) is added to a solution of 4-(2-chloroethynyl)-3,5-difluoro-4'-(4-pentylcyclohexyl)-1,1'-biphenyl (9.1 g, 23 mmol) in THF (90 mL) at 0° C. under argon atmosphere, and the reaction mixture is stirred at room temperature overnight. It is then quenched with dist. water and MTB ether at 0° C. The aqueous phase is separated and washed MTB ether, and the combined organic phases are washed with brine, dried (sodium sulfate) and concentrated in vacuo. The residue is purified by flash chromatography (solvent heptane) and crystallized from isopropanol to give beige crystals of [3,5-difluoro-4'-(4-pentylcyclohexyl)-[1,1'-biphenyl]-4-yl]ethynamine.

Step 3.3: 3,5-Difluoro-4-(2-isothiocyanatoethynyl)-4'-(4-pentylcyclohexyl)-1,1'-biphenyl

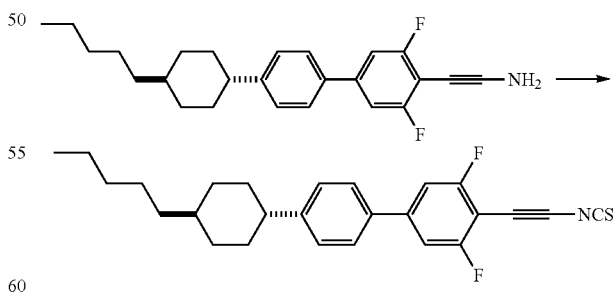

Thiophosgene (1.7 mL, 22 mmol) is slowly added to a solution of [3,5-difluoro-4'-(4-pentylcyclohexyl)-[1,1'-biphenyl]-4-yl]ethynamine (6.7 g, 18 mmol) and 1,4-diazabicyclo[2.2.2]octane (4.9 g, 44 mmol) in dichloromethane (80 mL) at 0° C. under argon atmosphere, and the mixture is stirred at room temperature for 1 h. Then the reaction mixture is quenched with dist. water. The aqueous phase is separated and extracted with dichloromethane. The combined organic phases are washed with brine, dried (sodium sulfate) and concentrated in vacuo. The residue is purified by silica gel chromatography (solvent heptane/MTB ether) and crystallization from heptane to give white crystals of 3,5-difluoro-4-(2-isothiocyanatoethynyl)-4'-(4-pentylcyclohexyl)-1,1'-biphenyl.

Δε=10.3
Δn=0.367

Synthesis Example 4: 4-Butyl-4'-{2-[3,5-difluoro-4-(2-isothiocyanatoethynyl)phenyl]-ethynyl}-1,1'-biphenyl Step 4.1: 4-Butyl-4'-[2-(4-ethynyl-3,5-difluorophenyl)ethynyl]-1,1'-biphenyl

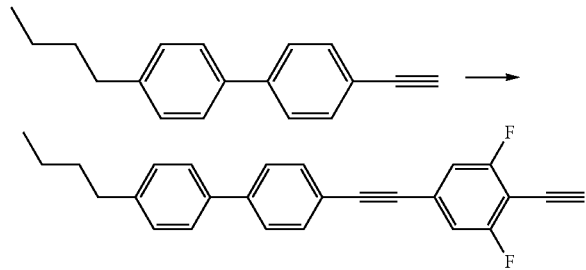

XPhos Pd G2 (64 mg, 0.08 mmol), XPhos (39 mg, 0.08 mmol) and copper(I) iodide (7.7 mg, 0.04 mmol) are added to a mixture of 4-butyl-4'-ethynyl-1,1'-biphenyl (CAS 136723-70-1) (10.0 g, 43 mmol) and 5-bromo-2-ethynyl-1,3-difluorobenzene (CAS 1823343-58-3) (8.8 g, 41 mmol) in diisopropylamine (130 mL) and THF (15 mL) under argon atmosphere at 55° C. The reaction mixture is heated at reflux temperature overnight. Then it is allowed to cool to room temperature, filtered and concentrated in vacuo. The residue is dissolved in toluene, washed with dist. water, dried (sodium sulfate) and concentrated in vacuo. The crude product is purified by silica gel chromatography (solvent toluene) and crystallization (heptane) to give yellow crystals of 4-butyl-4'-[2-(4-ethynyl-3,5-difluorophenyl)ethynyl]-1,1'-biphenyl.

Step 4.2: 4-Butyl-4'-{2-[4-(2-chloroethynyl)-3,5-difluorophenyl]ethynyl}-1,1'-biphenyl

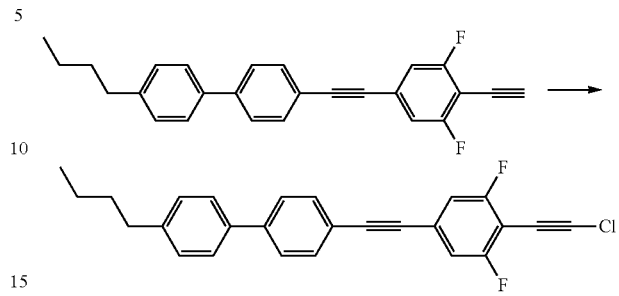

A solution of 4-butyl-4'-[2-(4-ethynyl-3,5-difluorophenyl)ethynyl]-1,1'-biphenyl (9.7 g, 26 mmol) in THF (100 mL) is treated with BuLi (19.6 mL, 31 mmol, 15% in n-hexanes) at −70° C. under argon atmosphere. N-chlorosuccinimide (3.9 g, 29 mmol) is added after 30 min, and the reaction mixture is stirred at room temperature overnight. It is then quenched with dist. water and MTB ether at 5° C. The aqueous phase is separated and washed MTB ether, and the combined organic phases are washed with brine, dried (sodium sulfate) and concentrated in vacuo. The residue is purified by flash chromatography (solvent heptane) and crystallized from isopropanol. 4-Butyl-4'-{2-[4-(2-chloroethynyl)-3,5-difluorophenyl]ethynyl}-1,1'-biphenyl is isolated as yellow crystals.

Step 4.3: [4-(2-{4'-Butyl-[1,1'-biphenyl]-4-yl}ethynyl)-2,6-difluorophenyl]ethynamine

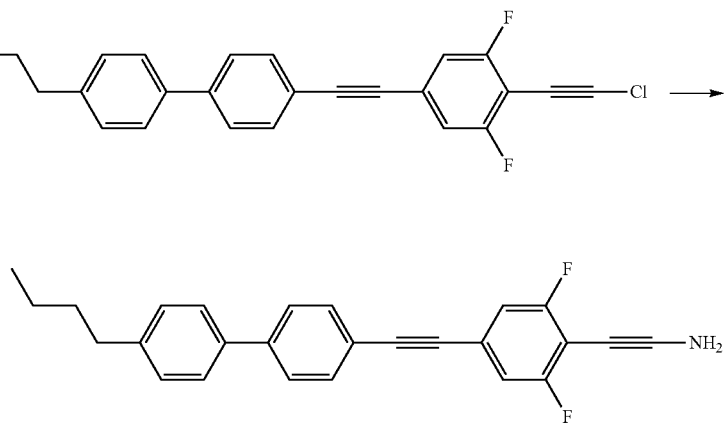

Sodium amide (0.92 g, 24 mmol) is added to a solution of 4-butyl-4'-{2-[4-(2-chloroethynyl)-3,5-difluorophenyl]ethynyl}-1,1'-bipheny (8.7 g, 22 mmol) in THF (90 mL) at 0° C. under argon atmosphere, and the reaction mixture is stirred at room temperature overnight. It is then quenched with dist. water and MTB ether at 0° C. The aqueous phase is separated and washed MTB ether, and the combined organic phases are washed with brine, dried (sodium sulfate) and concentrated in vacuo. The residue is purified by flash chromatography (solvent heptane) and crystallized from isopropanol to give beige crystals of [4-(2-{4'-butyl-[1,1'-biphenyl]-4-yl}ethynyl)-2,6-difluorophenyl]ethynamine.

Step 4.4: 4-Butyl-4'-{2-[3,5-difluoro-4-(2-isothio-cyanatoethynyl)phenyl]ethynyl}-1,1'-biphenyl

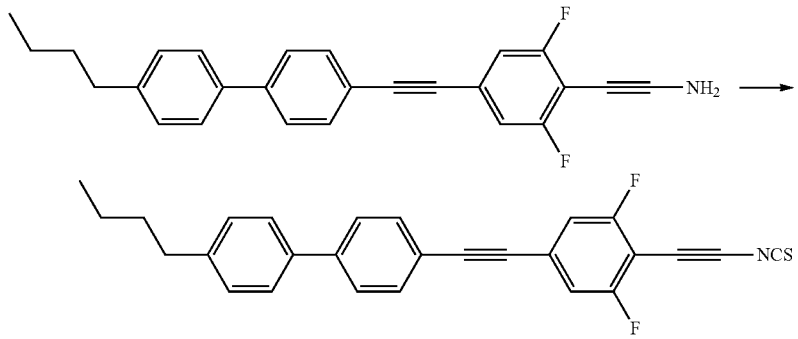

Thiophosgene (1.6 mL, 21 mmol) is slowly added to a solution of [4-(2-{4'-butyl-[1,1'-biphenyl]-4-yl}ethynyl)-2,6-difluorophenyl]ethynamine (6.4 g, 17 mmol) and 1,4-diazabicyclo[2.2.2]octane (4.7 g, 42 mmol) in dichloromethane (70 mL) at 0° C. under argon atmosphere, and the mixture is stirred at room temperature for 1 h. Then the reaction mixture is quenched with dist. water. The aqueous phase is separated and extracted with dichloromethane. The combined organic phases are washed with brine, dried (sodium sulfate) and concentrated in vacuo. The residue is purified by silica gel chromatography (solvent heptane/MTB ether) and crystallization from heptane to give white crystals of 4-butyl-4'-{2-[3,5-difluoro-4-(2-isothiocyanatoethynyl)phenyl]ethynyl}-1,1'-biphenyl.

Δε=11.3
Δn=0.564

In analogy to Synthesis Examples 1 to 4 are obtained:

Synthesis Example 5

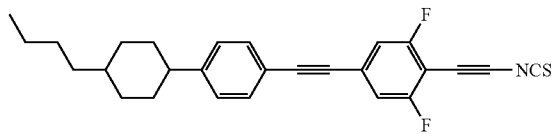

Δε=10.5
Δn=0.449

Synthesis Example 6

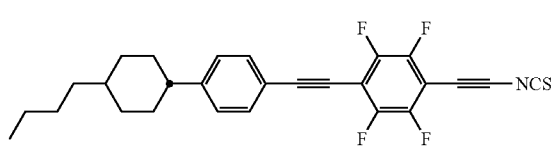

Δε=2.8
Δn=0.294

Synthesis Example 7

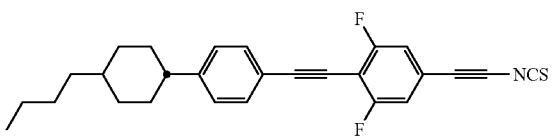

Δε=2.7
Δn=0.312

8

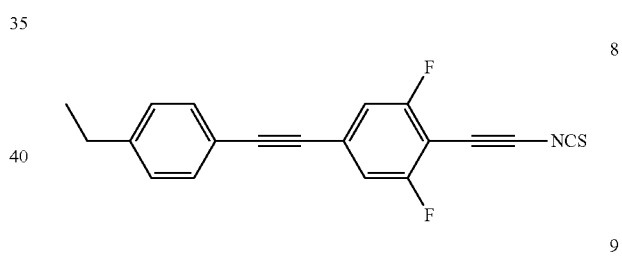

9

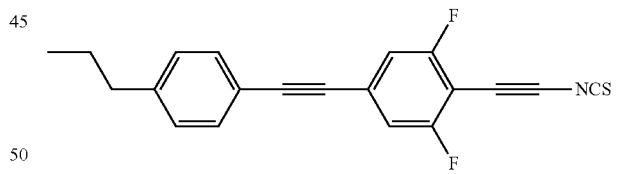

10

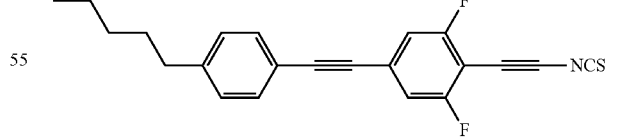

11

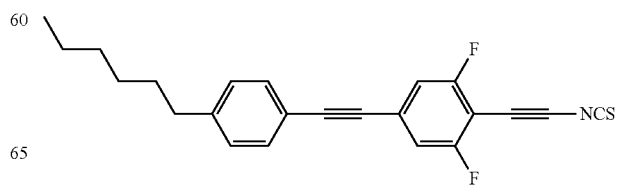

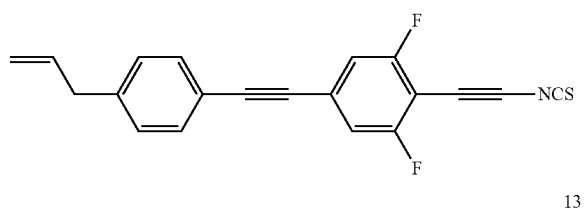
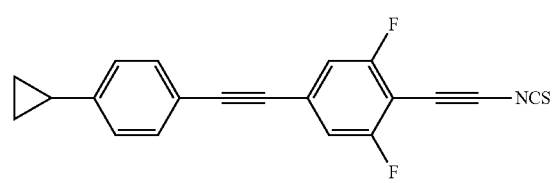
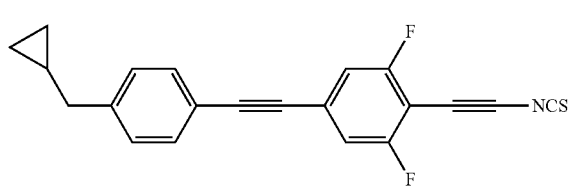
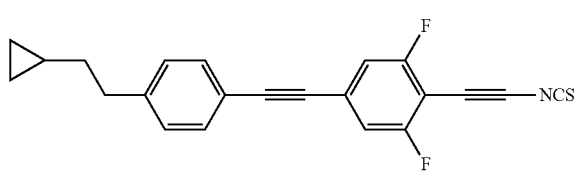
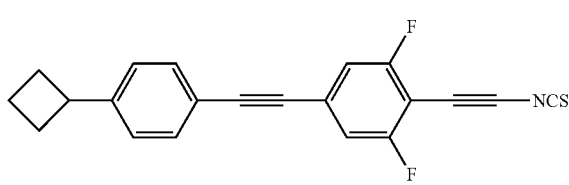
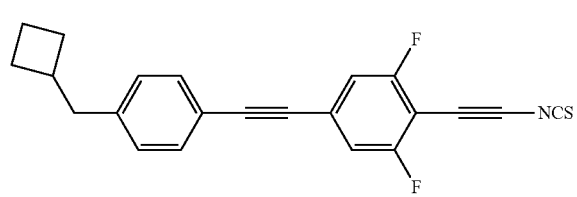
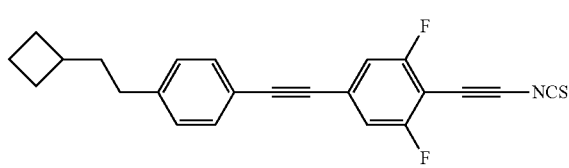
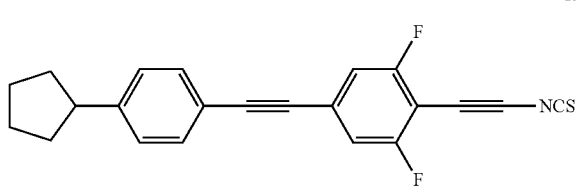
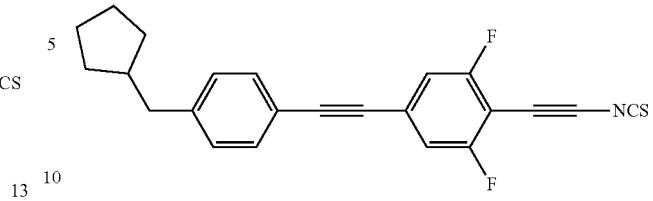
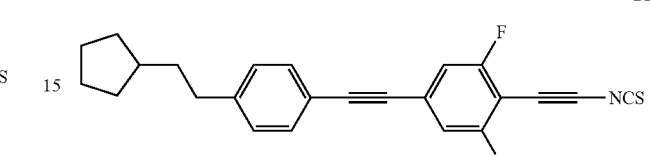
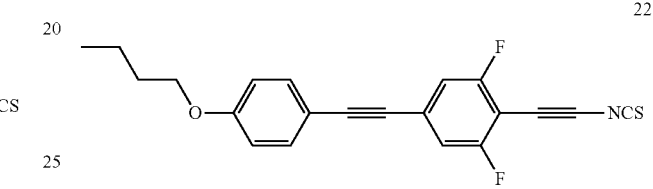
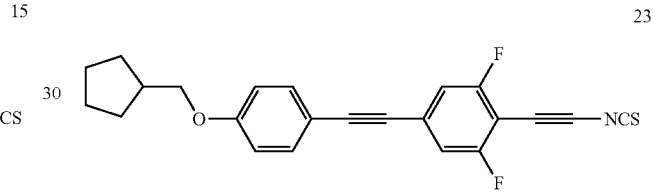
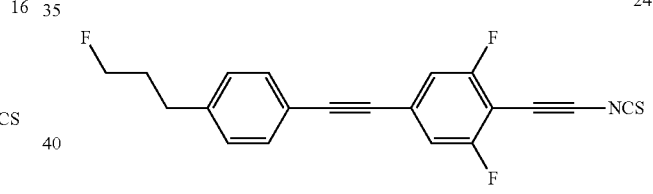
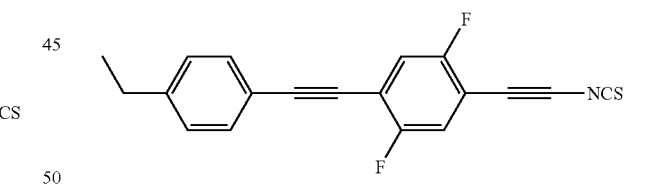
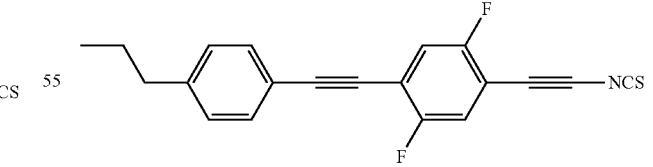
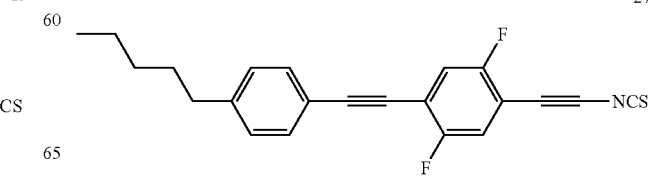

-continued
28
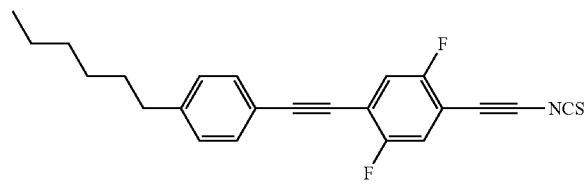
29
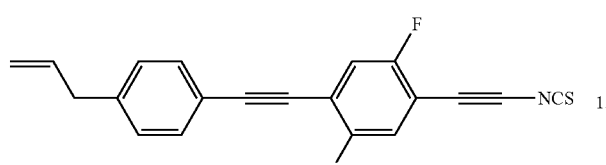
30
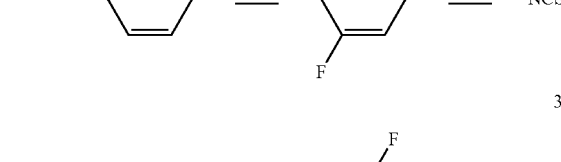
31
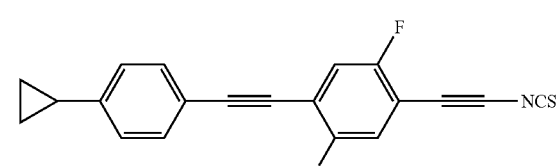
32
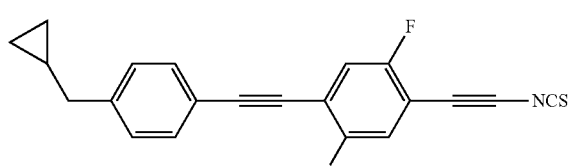
33
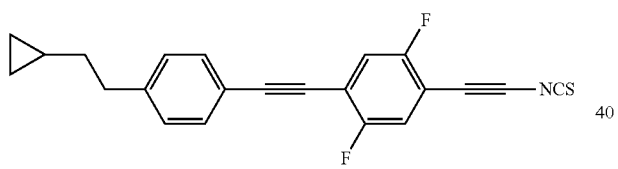
34
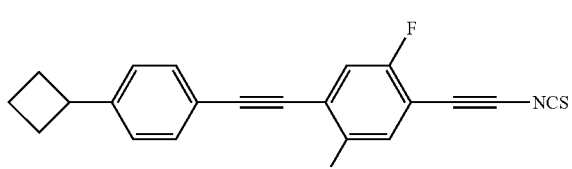
35
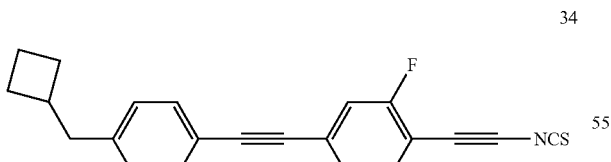
-continued
36
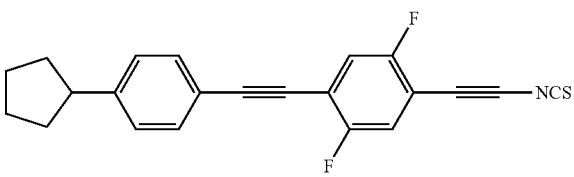
37
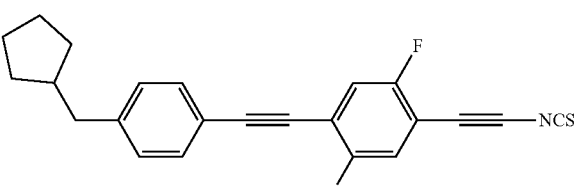
38
39
40
41
42
43

44
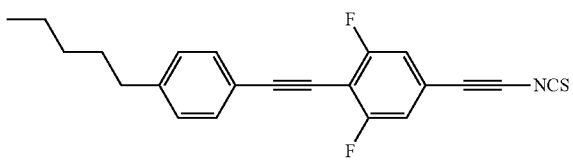
45
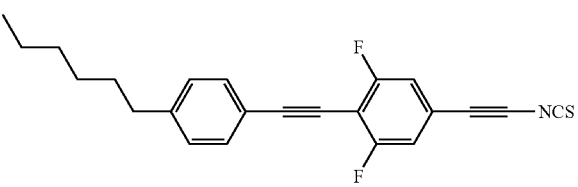
46
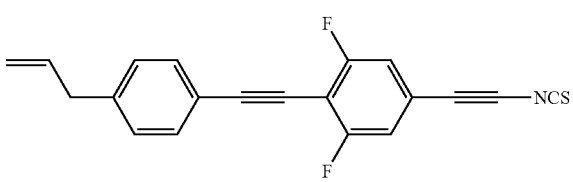
47
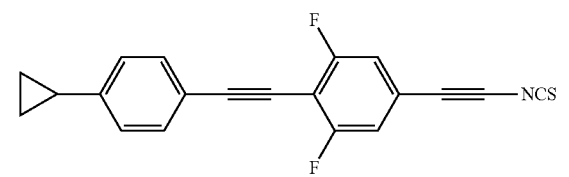
48
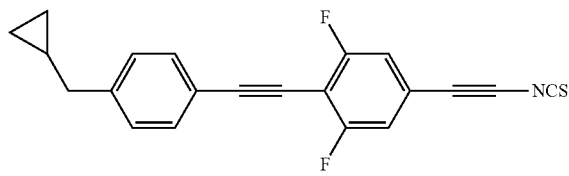
49
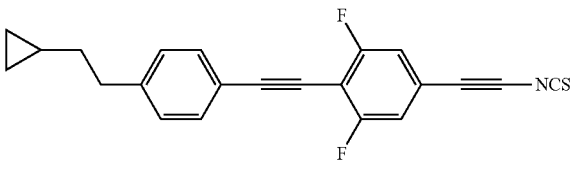
50
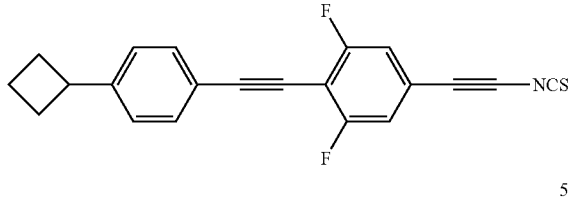
51
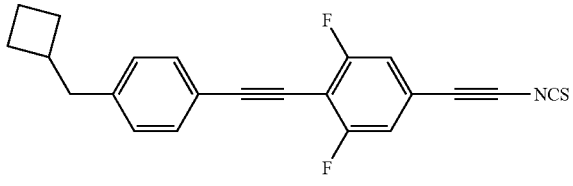
52
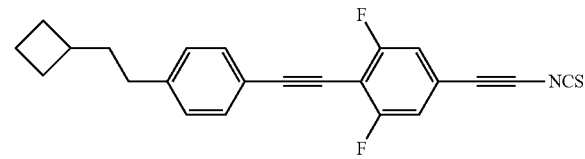
53
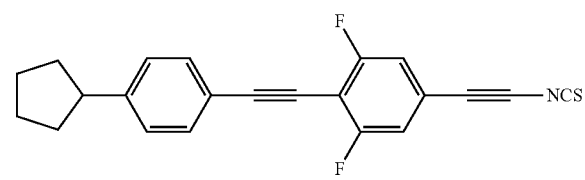
54
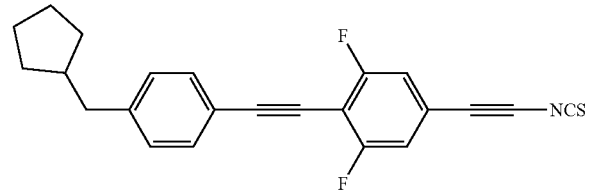
55
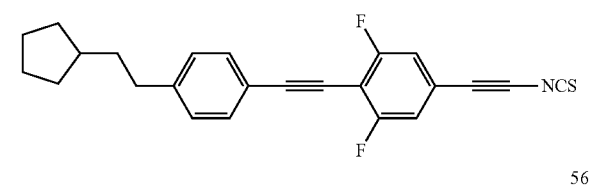
56
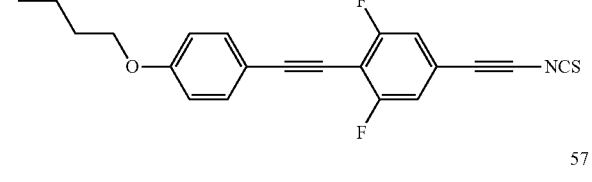
57
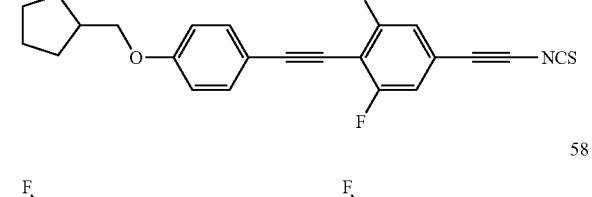
58
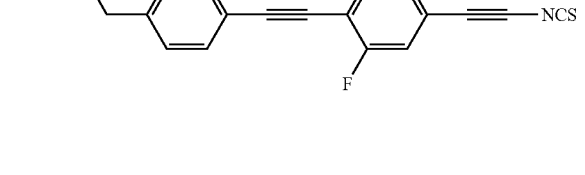
58
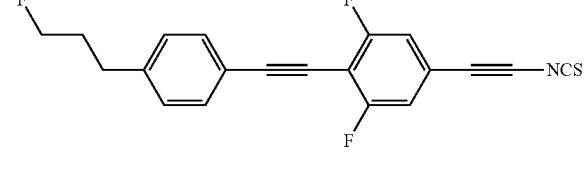

Mixture Examples

A nematic host N1 is prepared as follows:

| | | | |
|---|---|---|---|
| CPG-3-F | 12.0% | T(N, I)= | 92° C. |
| CPG-5-F | 10.0% | Δn (20° C., 589.3 nm)= | 0.0969 |
| CCEP-3-OT | 5.0% | Δε (20° C., 1 kHz)= | 5.2 |
| CCEP-5-OT | 5.0% | $\gamma_1$ (20° C.)= | 134 mPa·s |
| CGPC-3-3 | 2.0% | | |
| CGPC-5-3 | 2.0% | | |
| CGPC-5-5 | 2.0% | | |
| CP-6-F | 8.0% | | |
| CP-7-F | 6.0% | | |
| CCP-2-OT | 8.0% | | |
| CCP-3-OT | 12.0% | | |
| CCP-4-OT | 7.0% | | |
| CCP-5-OT | 11.0% | | |
| CP-5-F | 10.0% | | |
| Σ | 100.0% | | |

The tunability of the medium N1 is τ=0.107 at 20° C., 19 GHz.

Mixture Example M1

The medium M1 consists of 90% of host N1 and 10% of compound PTU-4-AS. The addition of the compound PTU-4-AS results in an increase of the tunability by 21% to τ=0.129.

The invention claimed is:

1. A compound of formula I

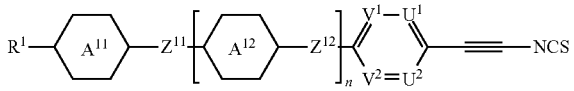

in which

R$^1$ denotes H, straight chain alkyl having 1 to 12 C atoms, alkenyl having 2 to 12 C atoms, or branched alkyl having 3 to 12 C atoms, in which one or more CH$_2$-groups may be replaced by

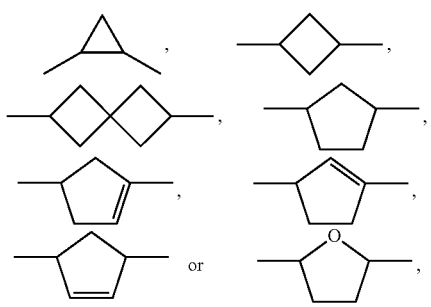

where one or more non adjacent CH$_2$-groups may be replaced by O and/or S, and where one or more H atoms may be replaced by F; or denotes a group R$^P$, R$^P$ denotes halogen, CN, NCS, R$^F$, R$^F$—O— or R$^F$—S—, wherein R$^F$ denotes fluorinated alkyl having 1 to 9 C atoms or fluorinated alkenyl having 2 to 9 C atoms, Z$^{11}$, Z$^{12}$ identically or differently, denote —CH=CH—, —CF=CF—, —CH=CF—, —CF=CH—, —C≡C—, —C≡C—C≡C— or a single bond, U$^1$, U$^2$, V$^1$ and V$^2$ identically or differently, denote —N= or —CR$^0$=, R$^0$ denotes H, Cl, F, CF$_3$, CHF$_2$, or alkyl or alkyoxy each having 1 to 6 C atoms, —⟨A$^{11}$⟩— and —⟨A$^{12}$⟩— denote a radical selected from the following groups:

a) the group consisting of 1,4-phenylene, 1,4-naphthylene, 2,6-naphthylene, tetralin-5,8-diyl, and tetralin-2,6-diyl, in which one or two CH groups may be replaced by N and in which one or more H atoms may be replaced by R$^L$, b) the group consisting of trans-1,4-cyclohexylene, 1,4-cyclohexenylene, bicyclo[1.1.1]pentane-1,3-diyl, 4,4'-bicyclohexylene, bicyclo[2.2.2]octane-1,4-diyl, and spiro[3.3]heptane-2,6-diyl, in which one or more non-adjacent CH$_2$ groups may be replaced by —O— and/or —S— and in which one or more H atoms may be replaced by F or alkyl having 1 to 6 C atoms, c) the group consisting of thiophene-2,5-diyl, thieno[3,2-b]thiophene-2,5-diyl, and selenophene-2,5-diyl, each of which may also be mono- or polysubstituted by R$^L$, R$^L$ on each occurrence, identically or differently, denotes F, Cl, CN, SCN, SF$_5$ or straight-chain having 1 to 12 C atoms or branched having 3 to 12 C atoms, in each case optionally fluorinated, alkyl, alkoxy, alkylcarbonyl, alkoxycarbonyl, alkylcarbonyloxy or alkoxycarbonyloxy, and n is 0, 1 or 2.

2. The compound according to claim 1, wherein the compound of Formula I comprises one or more compounds of formulae Ia, Ib, Ic or Id:

Ia

Ib

Ic

Id wherein R$^1$, A$^{11}$, A$^{12}$, Z$^{11}$, Z$^{12}$, U$^1$, U$^2$, V$^1$, V$^2$, and n are as defined in Formula I.

3. The compound according to claim 1, wherein the compound of Formula I comprises one or more compounds of formula Ie

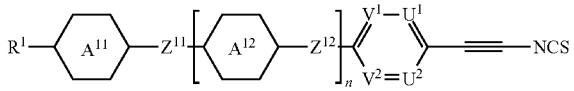

Ie in which
one of

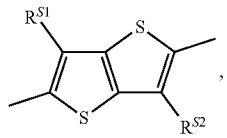

denotes

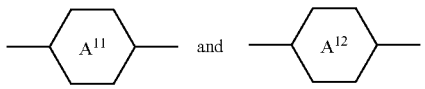

$R^{S1}$ and $R^{S2}$ identically or differently, denote H or alkyl having 1 to 6 C atoms, and
wherein $R^1, A^{11}, A^{12}, Z^{11}, Z^{12}, U^1, U^2, V^1, V^2$, and n are as defined in claim 1.

4. The compound according to claim 1, wherein the compound of Formula I comprises one or more compounds of the formula If,

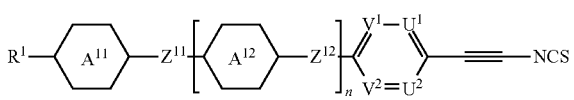

If in which
$U^1, U^2, V^1$ and $V^2$ denote —$CR^0$=,
$R^0$ denotes Cl or F, and
wherein $R^1, A^{11}, A^{12}, Z^{11}, Z^{12}, U^1, U^2, V^1, V^2$, and n are as defined in claim 1.

5. The compound according to claim 1, wherein the compound of Formula I comprises one or more compounds of the formula Ig,

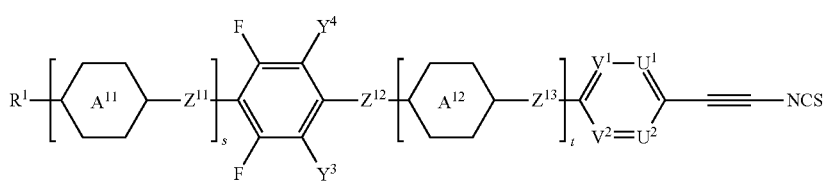

Ig in which $R^1$,

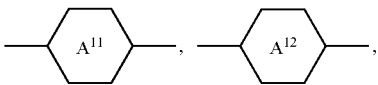

$Z^{11}, Z^{12}, U^1, U^2, V^1$ and $V^2$ have the meanings given in in Formula I, $Z^{13}$ independently has the meanings of $Z^{11}, Y^3$ and $Y^4$, identically or differently, denote H, F, Cl, or straight chain having 1 to 12 C atoms or branched or cyclic having 3 to 12 C atoms alkyl, alkenyl, alkoxy or alkenyloxy,
S is 0, 1 or 2,
t is 0, 1 or 2, and
s+t is 0, 1 or 2.

6. The compound according to claim 1, wherein the compound of Formula I comprises one or more compounds of the formula Ih,

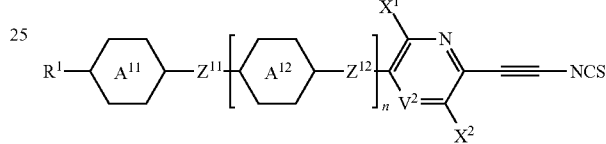

Ih in which
$V^2$ denotes —N=, —CF= or —CCl=,
$X^1$ and $X^2$, identically or differently, denote H, Cl, F, methyl or ethyl,
wherein $R^1, A^{11}, A^{12}, Z^{11}$, and $Z^{12}$ are as defined in Formula I, and
n is 0, 1 or 2.

7. The compound according to claim 1, wherein the compound of Formula I comprises one or more compounds of the formula Ii

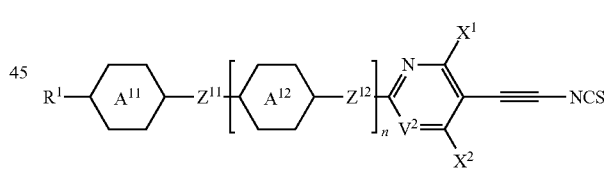

Ii in which
$X^1$ and $X^2$, identically or differently, denote H, Cl, F, methyl or ethyl,
wherein $R^1, A^{11}, A^{12}, Z^{11}, Z^{12}$, and $V^2$ are as defined in Formula I, and
n is 0, 1 or 2.

8. The compound according to claim 1, wherein the compound of Formula I comprises one or more compounds of the formula Ij

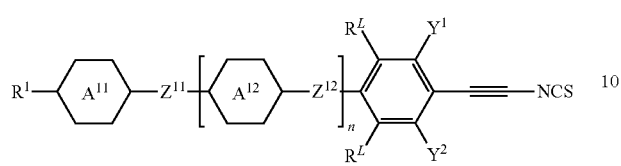

Ij in which
$Y^1$ denotes methyl, ethyl or Cl,
$Y^2$ denotes H, methyl, ethyl, F or Cl,
$R^L$ denotes H, F, Cl or methyl,

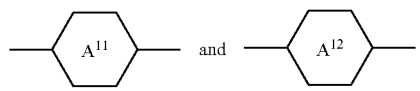

independently of one another, denote

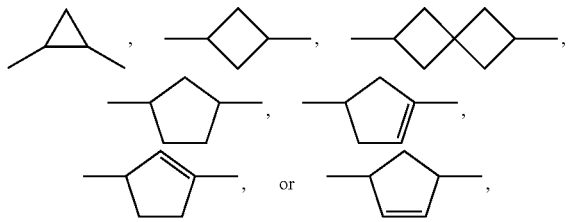

and where

alternatively denotes

wherein $R^1$, $A^{11}$, $A^{12}$, $Z^{11}$, and $Z^{12}$ are as defined in Formula I, and
n is 0 or 1.

9. The compound according to claim 1,
in which
$R^1$ denotes H, non-fluorinated alkyl having 1 to 12 C atoms, or non-fluorinated alkenyl having 2 to 12 C atoms, in which one or more $CH_2$-groups may be replaced by

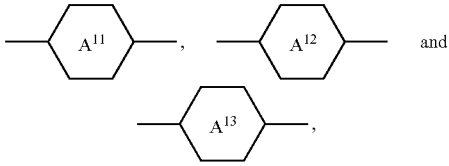

where one or more non-adjacent $CH_2$-groups may be replaced by O;

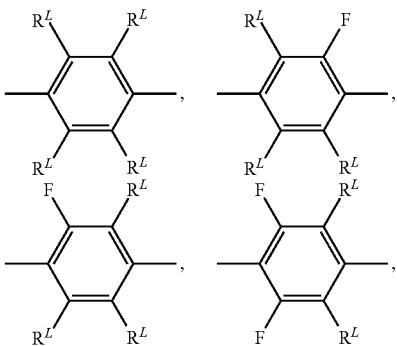

on each occurrence, independently of one another, denote

-continued

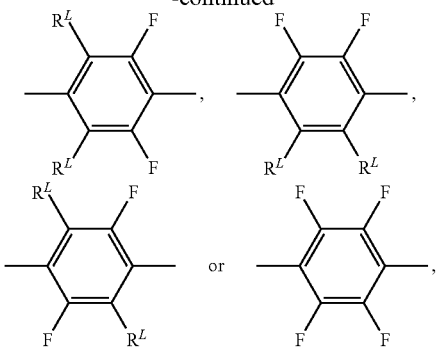

in which $R^L$, on each occurrence, identically or differently, denotes H, Cl or alkyl having 1 to 6 C atoms, or denote

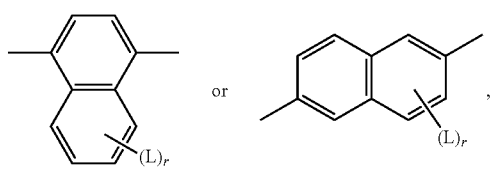

L denotes F or alkyl having 1 to 6 C atoms, and
r is 0, 1, 2, 3, 4, 5 or 6,
and wherein

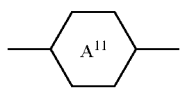

alternatively denotes

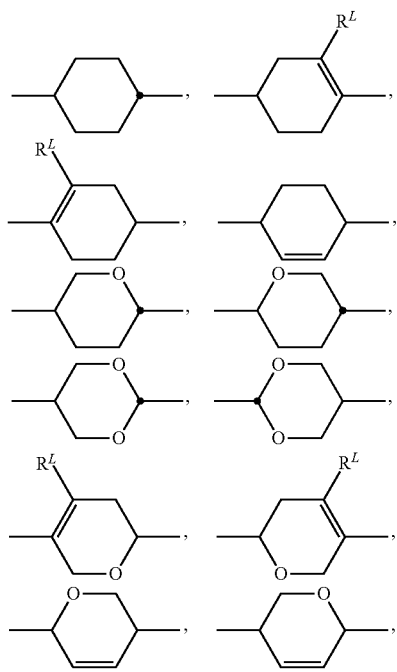

-continued

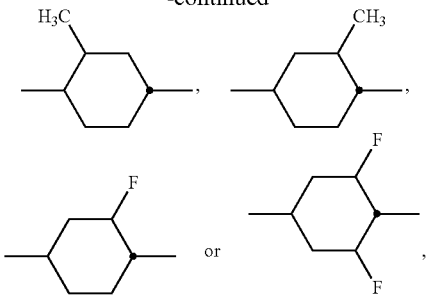

$R^L$ denotes H or methyl, and
n is 1 or 2.

10. The compound according to claim 1, wherein $R^1$ denotes $R^P$.

11. The compound according to claim 1, in which $Z^{11}$ and $Z^{12}$ independently denote —C≡C— or a single bond.

12. A liquid crystal medium comprising one or more compounds according to claim 1.

13. The liquid crystal medium according to claim 12, wherein the medium comprises one or more compounds of formula II

II

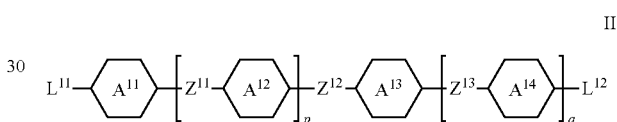

in which
$L^{11}$ denotes $R^{11}$ or $X^{11}$,
$L^{12}$ denotes $R^{12}$ or $X^{12}$,
$R^{11}$ and $R^{12}$, independently of one another, denote unfluorinated alkyl or unfluorinated alkoxy having 1 to 17 C atoms or unfluorinated alkenyl, unfluorinated alkynyl, unfluorinated alkenyloxy or unfluorinated alkoxyalkyl having 2 to 15 C atoms,
$X^{11}$ and $X^{12}$, independently of one another, denote F, Cl, Br, —CN, —NCS, —SCN, $SF_5$, fluorinated alkyl or fluorinated alkoxy having 1 to 7 C atoms or fluorinated alkenyl, fluorinated alkenyloxy or fluorinated alkoxyalkyl having 2 to 7 C atoms,
p and q, independently of one another, denote 0 or 1,
$Z^{11}$ to $Z^{13}$, independently of one another, denote trans-CH=CH—, trans-CF=CF—, —C≡C— or a single bond,

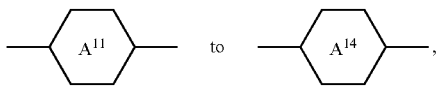

independently of one another, denote

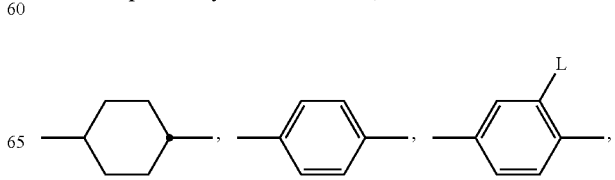

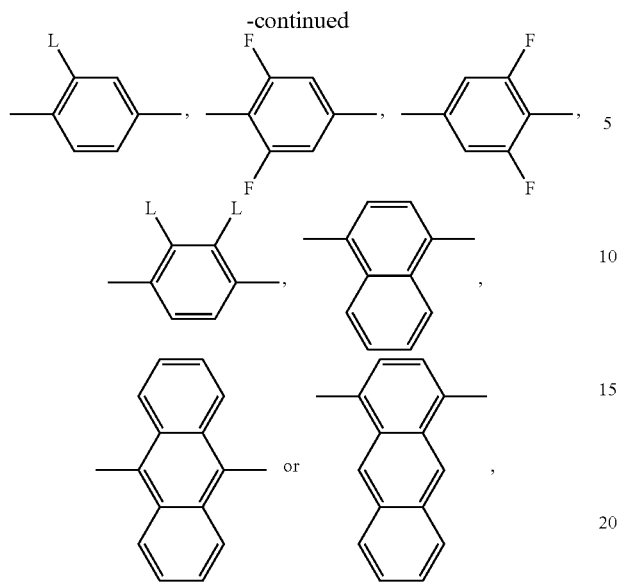

and

L on each occurrence, independently of one another, denotes unbranched alkyl having 1 to 12 C atoms, unbranched alkenyl or alkynyl having 2 to 12 C atoms, or branched alkyl, alkenyl or alkynyl having 3 to 12 C atoms, in which, independently of one another, one or more $CH_2$ groups may also be replaced by O, or denotes $C_3$-$C_6$ cycloalkyl, $C_3$-$C_6$ cycloalkenyl, fluorinated alkyl or alkenyl, fluorinated alkoxy or alkenyloxy, F, Cl, Br, CN, NCS, SCN or $SF_5$.

14. A component for high-frequency technology, comprising the liquid crystal medium according to claim 12.

15. The component according to claim 14, comprising a liquid-crystal based antenna element, a phase shifter, a tunable filter, a tunable metamaterial structure, a matching network or a varactor.

16. A microwave antenna array, comprising one or more components according to claim 14.

17. A compound of formula N

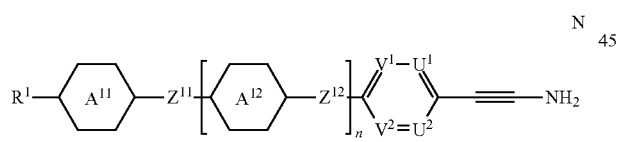

in which:
R$^1$ denotes H, straight chain alkyl having 1 to 12 C atoms, alkenyl having 2 to 12 C atoms, or branched alkyl having 3 to 12 C atoms, in which one or more $CH_2$-groups may be replaced by

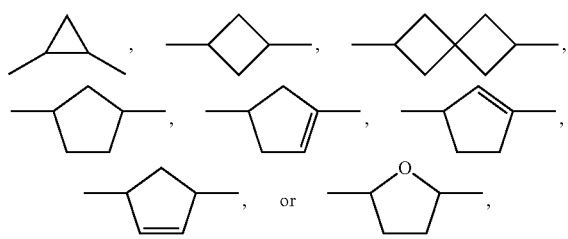

where one or more non adjacent $CH_2$-groups may be replaced by O and/or S, and where one or more H atoms may be replaced by F; or denotes a group $R^P$,
$R^P$ denotes halogen, CN, NCS, $R^F$, $R^F$—O— or $R^F$—S—, wherein
$R^F$ denotes fluorinated alkyl having 1 to 9 C atoms or fluorinated alkenyl having 2 to 9 C atoms,
$Z^{11}$, $Z^{12}$ identically or differently, denote —CH=CH—, —CF=CF—, —CH=CF—, —CF=CH—, —C≡C—, —C≡C—C≡C— or a single bond,
$U^1$, $U^2$, $V^1$ and $V^2$ identically or differently, denote —N= or —CR$^0$=,
$R^0$ denotes H, Cl, F, $CF_3$, $CHF_2$, or alkyl or alkyoxy each having 1 to 6 C atoms,

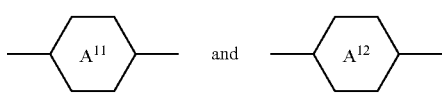

denote a radical selected from the following groups:
a) the group consisting of 1,4-phenylene, 1,4-naphthylene, 2,6-naphthylene, tetralin-5,8-diyl, and tetralin-2,6-diyl, in which one or two CH groups may be replaced by N and in which one or more H atoms may be replaced by $R^L$,
b) the group consisting of trans-1,4-cyclohexylene, 1,4-cyclohexenylene, bicyclo[1.1.1]pentane-1,3-diyl, 4,4'-bicyclohexylene, bicyclo[2.2.2]octane-1,4-diyl, and spiro[3.3]heptane-2,6-diyl, in which one or more non-adjacent $CH_2$ groups may be replaced by —O— and/or —S— and in which one or more H atoms may be replaced by F or alkyl having 1 to 6 C atoms,
c) the group consisting of thiophene-2,5-diyl, thieno[3,2-b]thiophene-2,5-diyl, and selenophene-2,5-diyl, each of which may also be mono- or polysubstituted by $R^L$,
$R^L$ on each occurrence, identically or differently, denotes F, Cl, CN, SCN, $SF_5$ or straight-chain having 1 to 12 C atoms or branched having 3 to 12 C atoms, in each case optionally fluorinated, alkyl, alkoxy, alkylcarbonyl, alkoxycarbonyl, alkylcarbonyloxy or alkoxycarbonyloxy, and
n is 0, 1 or 2.

18. A process for the production of a compound of formula I, comprising converting a compound of formula N:

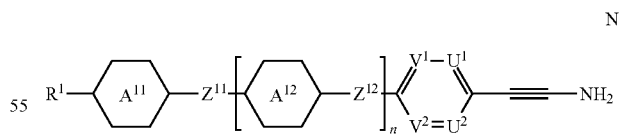

into a compound of formula I:

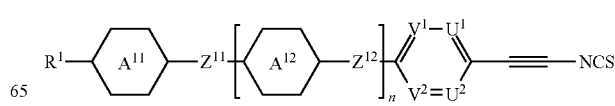

in which:

$R^1$ denotes H, straight chain alkyl having 1 to 12 C atoms, alkenyl having 2 to 12 C atoms, or branched alkyl having 3 to 12 C atoms, in which one or more $CH_2$-groups may be replaced by

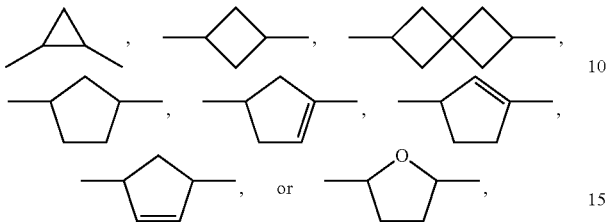

where one or more non adjacent $CH_2$-groups may be replaced by O and/or S, and where one or more H atoms may be replaced by F; or denotes a group $R^P$, $R^P$ denotes halogen, CN, NCS, $R^F$, $R^F$—O— or $R^F$—S—, wherein $R^F$ denotes fluorinated alkyl having 1 to 9 C atoms or fluorinated alkenyl having 2 to 9 C atoms, $Z^{11}$, $Z^{12}$ identically or differently, denote —CH=CH—, —CF=CF—, —CH=CF—, —CF=CH—, —C≡C—, —C≡C—C≡C— or a single bond, $U^1$, $U^2$, $V^1$ and $V^2$ identically or differently, denote —N= or —CR°=, $R°$ denotes H, Cl, F, $CF_3$, $CHF_2$, or alkyl or alkyoxy each having 1 to 6 C atoms,

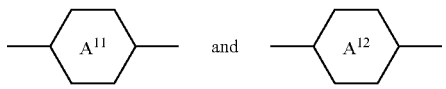

denote a radical selected from the following groups:
a) the group consisting of 1,4-phenylene, 1,4-naphthylene, 2,6-naphthylene, tetralin-5,8-diyl, and tetralin-2,6-diyl, in which one or two CH groups may be replaced by N and in which one or more H atoms may be replaced by $R^L$,
b) the group consisting of trans-1,4-cyclohexylene, 1,4-cyclohexenylene, bicyclo[1.1.1]pentane-1,3-diyl, 4,4'-bicyclohexylene, bicyclo[2.2.2]octane-1,4-diyl, and spiro[3.3]heptane-2,6-diyl, in which one or more non-adjacent $CH_2$ groups may be replaced by —O— and/or —S— and in which one or more H atoms may be replaced by F or alkyl having 1 to 6 C atoms,
c) the group consisting of thiophene-2,5-diyl, thieno[3,2-b]thiophene-2,5-diyl, and selenophene-2,5-diyl, each of which may also be mono- or polysubstituted by $R^L$, $R^L$ on each occurrence, identically or differently, denotes F, Cl, CN, SCN, $SF_5$ or straight-chain having 1 to 12 C atoms or branched having 3 to 12 C atoms, in each case optionally fluorinated, alkyl, alkoxy, alkylcarbonyl, alkoxycarbonyl, alkylcarbonyloxy or alkoxycarbonyloxy, and n is 0, 1 or 2.

* * * * *